United States Patent [19]
Maes et al.

[11] Patent Number: 5,563,988
[45] Date of Patent: Oct. 8, 1996

[54] METHOD AND SYSTEM FOR FACILITATING WIRELESS, FULL-BODY, REAL-TIME USER INTERACTION WITH A DIGITALLY REPRESENTED VISUAL ENVIRONMENT

[75] Inventors: Pattie E. Maes, Somerville; Bruce M. Blumberg, Pepperell; Trevor J. Darrell, Cambridge; Thad E. Starner, Somerville; Michael P. Johnson, Cambridge; Kenneth B. Russell, Boston; Alex P. Pentland, Cambridge, all of Mass.

[73] Assignee: Massachusetts Institute of Technology, Cambridge, Mass.

[21] Appl. No.: 284,038

[22] Filed: Aug. 1, 1994

[51] Int. Cl.⁶ .................................................. G06T 15/40
[52] U.S. Cl. ............................................ 395/121; 395/152
[58] Field of Search ................................. 395/121, 152

[56] References Cited

U.S. PATENT DOCUMENTS

| | | | |
|---|---|---|---|
| 4,343,037 | 8/1982 | Bolton | 395/130 |
| 4,677,576 | 6/1987 | Berlin, Jr. et al. | 395/120 |
| 4,682,160 | 7/1987 | Beckwith, Jr. et al. | 395/121 |
| 4,821,212 | 4/1989 | Heartz | 395/126 |
| 4,843,568 | 6/1989 | Krueger et al. | 382/100 |
| 4,853,863 | 8/1989 | Cohen et al. | 364/460 |
| 4,940,972 | 7/1990 | Mouchot et al. | 395/121 |
| 4,958,224 | 9/1990 | Lepore et al. | 348/171 |
| 5,157,484 | 10/1992 | Pritchard et al. | 348/50 |
| 5,261,041 | 11/1993 | Susman | 395/152 |
| 5,319,747 | 6/1994 | Gerrissen et al. | 395/155 |
| 5,322,441 | 6/1994 | Lewis et al. | 434/307 R |
| 5,345,313 | 9/1994 | Blank | 348/598 |
| 5,347,306 | 9/1994 | Nitta | 348/15 |
| 5,388,990 | 2/1995 | Beckman | 434/38 |
| 5,423,554 | 6/1995 | Davis | 273/437 |

OTHER PUBLICATIONS

Tate et al.; *Depth Map Constructon from Range–Guided Multiresolution Stereo Matching*; pp. 134–144.
Deering, Michael F.; *Explorations of Display Interfaces for Virtual Reality*; pp. 141–147.
Darrell et al.; *Segmentation by Minimal Description*; 1990; pp. 112–116.
Azarbayejani et al.; *Visually Controlled Graphics*; 1993; pp. 602–605.
Excerpt from M. Krueger, *Artificial Reality II*, (1991), pp. 2–65.
*Mandala VR News*, Fall/Winter 1993.
Vincent, "Mandala: Virtual Village," *Proceedings of ACM SIGGRAPH 1993* AT 207–208 (1993).
Stanfel, "Mandela: Virtual Cities," *Proceedings of ACM SIGGRAPH 1993* AT 207–208 (1993).
Darrel & Pentland, "Space–Time Gestures," *Proceedings of IEEE Conference on Vision and Pattern Recognition* (Jun. 1993), pp. 335–340.

Primary Examiner—Mark K. Zimmerman
Attorney, Agent, or Firm—Cesari and McKenna

[57] ABSTRACT

An electronic system for integrating a user's moving image into a computer-generated pictorial environment, and allowing the user to interact with the environment and objects therein. The environment is rendered on a screen display in a manner that simulates three dimensions, including respect for occlusion relationships among the user and objects in the environment. The resulting image, which changes as the user gestures and interacts with the environment, is projected onto a large screen that the user faces. The environment includes a series of mobile entities, or "agents," which respond to one or more of the user's changing position, gestures and voice, exhibiting context-dependent behavior that appears semi-intelligent.

49 Claims, 3 Drawing Sheets

METHOD AND SYSTEM FOR FACILITATING WIRELESS, FULL-BODY, REAL-TIME USER INTERACTION WITH A DIGITALLY REPRESENTED VISUAL ENVIRONMENT

This invention was made with government support under Grant Number NSF-9205668-IRI awarded by the National Science Foundation. The government has certain rights in the invention.

This application is filed with an appendix containing source-code listings.

BACKGROUND OF THE INVENTION

1. Field of the Invention

The present invention relates to interactive computer systems, and in particular to method and apparatus for facilitating wireless, full-body interaction between a human participant and a computer-generated graphical environment.

2. Description of the Related Art

So-called "virtual reality" ("VR") systems enable users to experience computer-generated environments instead of merely interacting with them over a display screen. Such systems typically require the user to don goggles, through which s/he perceives the virtual environment, as well as sensors that encode the user's gestures as electrical signals. The user reacts naturally to the changing virtual environment, generating signals that the computer interprets to determine the state and progress of the presented environment.

In order to encode a sufficiently broad spectrum of gestures to facilitate natural interaction, VR systems ordinarily require the user to wear, in addition to the goggles, at least one "data glove" to detect hand and finger movements, and possibly a helmet to detect head movements. Full-body systems, which encode movements from numerous anatomical sites to develop a complete computational representation of the user's overall body action, require many more sensors; however, such systems, would be capable of projecting the user fully into the virtual environment, providing him or her with greater control and a heightened sense of participation ideally suited to interactive simulations.

Unfortunately, numerous practical difficulties limit the capacity of current VR systems to achieve this goal. The nature of the interaction currently offered, even with full-body sensor arrays, is usually rather limited. The computational demands placed on a system receiving signals from many sensors can easily overwhelm even large computers, resulting in erratic "jumps" in the visual presentation that reflect processing delays. Moreover, no matter how many sensors surround the user, they cannot "see" the user, and therefore cannot integrate the user's true visual image into the virtual environment.

Economic and convenience factors also limit sensor-type VR systems. As the capabilities of VR systems increase, so do the cost, awkwardness and inconvenience of the sensor array. The sensors add weight and heft, impeding the very motions they are intended to detect. They must also ordinarily be connected, by means of wires, directly to the computer, further limiting the user's movement and complicating equipment arrangements.

In order to overcome the limitations associated with sensor-based VR systems, researchers have devised techniques to introduce the user's recorded image into a virtual environment. The resulting composite image is projected in a manner visually accessible to the user, enabling the user to observe his or her appearance in and interaction with the virtual environment.

Two such approaches include the VideoPlace system (see, e.g., M. Krueger, *Artificial Reality II* (1991) and U.S. Pat. No. 4,843,568) and the Mandala system (see, e.g., Mandala *VR News*, Fall/Winter 1993; Vincent, "Mandala: Virtual Village" and Stanfel, "Mandala: Virtual Cities," *Proceedings of ACM SIGGRAPH* 1993 at 207–208 (1993)). Unfortunately, these systems exhibit various limitations. For example, Krueger's VideoPlace requires a special background and ultraviolet lamps, and extracts and represents only the user's silhouette. The Mandala system can integrate the user's full image within the virtual environment it creates, but requires a a chroma-key blue background. Both systems are limited to two-dimensional VR representations (i.e., the user can only navigate up-down and left-right in the virtual world, and represented objects cannot be located in front of or behind the user). Both the VideoPlace and Mandala systems can process only a limited range of gestural information.

DESCRIPTION OF THE INVENTION

Objects of the Invention

Accordingly, it is an object of the present invention to provide a system capable of creating a virtual environment without the need for elaborate sensor arrays and associated wiring requirements.

It is another object of the invention to integrate the user's visual image directly into a virtual environment.

It is still another object of the invention to enable the user to interact with the virtual environment using his or her full body.

Yet another object of the invention is to facilitate full-body VR interaction in a computationally manageable fashion.

It is yet another object of the present invention to provide a wireless VR system that interprets a wide range of user gestures.

Still another object of the invention is to support a three-dimensional VR environment.

It is still another object of the invention to integrate the user's complete visual image into a three-dimensional VR environment.

It is yet a further object of the invention to enable the user to interact with computer-generated, visually represented autonomous agents that can entertain the user, train and teach the user, and guide the user through the virtual environment.

Other objects will, in part, be obvious and will, in part, appear hereinafter. The invention accordingly comprises an article of manufacture possessing the features and properties exemplified in the constructions described herein and the several steps and the relation of one or more of such steps with respect to the others and the apparatus embodying the features of construction, combination of elements and the arrangement of parts that are adapted to effect such steps, all as exemplified in the following summary and detailed description, and the scope of the invention will be indicated in the claims.

Brief Summary of the Invention

In accordance with the invention, an electronic (e.g., charge-coupled device, or "CCD") camera records the user's image, which an associated computer system composites into a three-dimensional virtual environment. The resulting image, which changes as the user gestures and interacts with the environment, is projected onto a large screen that the user faces. This enables the user to observe his or her appearance in and interaction with the virtual environment.

The invention acquires gestural and three-dimensional location information from the user's electronic representation through real-time analysis of the recorded image. In one embodiment, an analysis module surrounds the user's image with a rectangular bounding box. Gestures, as well as the locations of telltale body parts (such as hands and feet), are associated with characteristic changes along specific regions of the bounding box, and the analysis module contains a series of templates corresponding to a repertoire of recognized gestures. Specific gestures are recognized through pattern matching. In a second, preferred embodiment, a contour rather than a bounding box surrounds the user's image. Characteristic spatial and temporal cues (e.g., changes in curvature and distance from the contour center) are detected and used to infer gesture. These techniques are more robust than those of the prior art, and offer particular advantage over sensor-based systems in eliminating concerns over sensor capability and mechanical constraint.

The compositing and interpretive components of the invention can be straightforwardly adapted to a wide variety of VR environments, including those now controlled by sensors. In the preferred embodiment, however, our basic system configuration invention is used in conjunction with a virtual environment that features autonomous "agents," i.e., graphically depicted, mobile entities that interact with and respond to the user in real-time, exhibiting context-dependent behavior that appears semi-intelligent to the user. For example, the reaction elicited by a particular gesture can vary with the situation, a capability that fosters complex interactions even if the repertoire of recognized gestures is relatively limited. The user's location and hand and body gestures affect the behavior of the agents, which is expressed to the user visually and, desirably, aurally as well.

The invention includes means allowing a designer to define agents, their ranges of activity, and data attributes that confer apparent sensory characteristics and motivations. Once configured by the designer, an agent responds to its surrounding virtual environment (which includes the real-time user) with a relevant activity on every time step, based on its attributes and past history. Agents can be configured to select activities in a manner that avoids both vacillation among multiple activities and excessive persistence in a single activity; they can also be configured to interrupt a current activity in response to environmental cues and opportunities (based on designer-designated priorities). Agents can be pictorially represented as fanciful animated characters, graphical entities, or pictorial renderings of animals or humans as desired by the designer.

The invention permits the designer to create interactive virtual worlds that provide entertainment (e.g., storytelling applications in which the user plays one of the characters in the story, the remainder played by autonomous agents); teach physical skills by allowing the user to watch his or her own performance of the task being taught, as well as providing the user with real-time evaluations of that performance based on analysis of gestures and body positions; or function as so-called "interface agents," i.e., personal digital assistants that interact with the user in the performance of everyday tasks. Furthermore, the techniques described herein for integrating a user's image within a digitally represented environment can be applied to numerous applications besides VR simulations, such as teleconferencing, collaborative design facilities, kiosks in public spaces, and so-called information spaces through which the user navigates in order to obtain or analyze information.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Basic System Configuration

Figure 1:
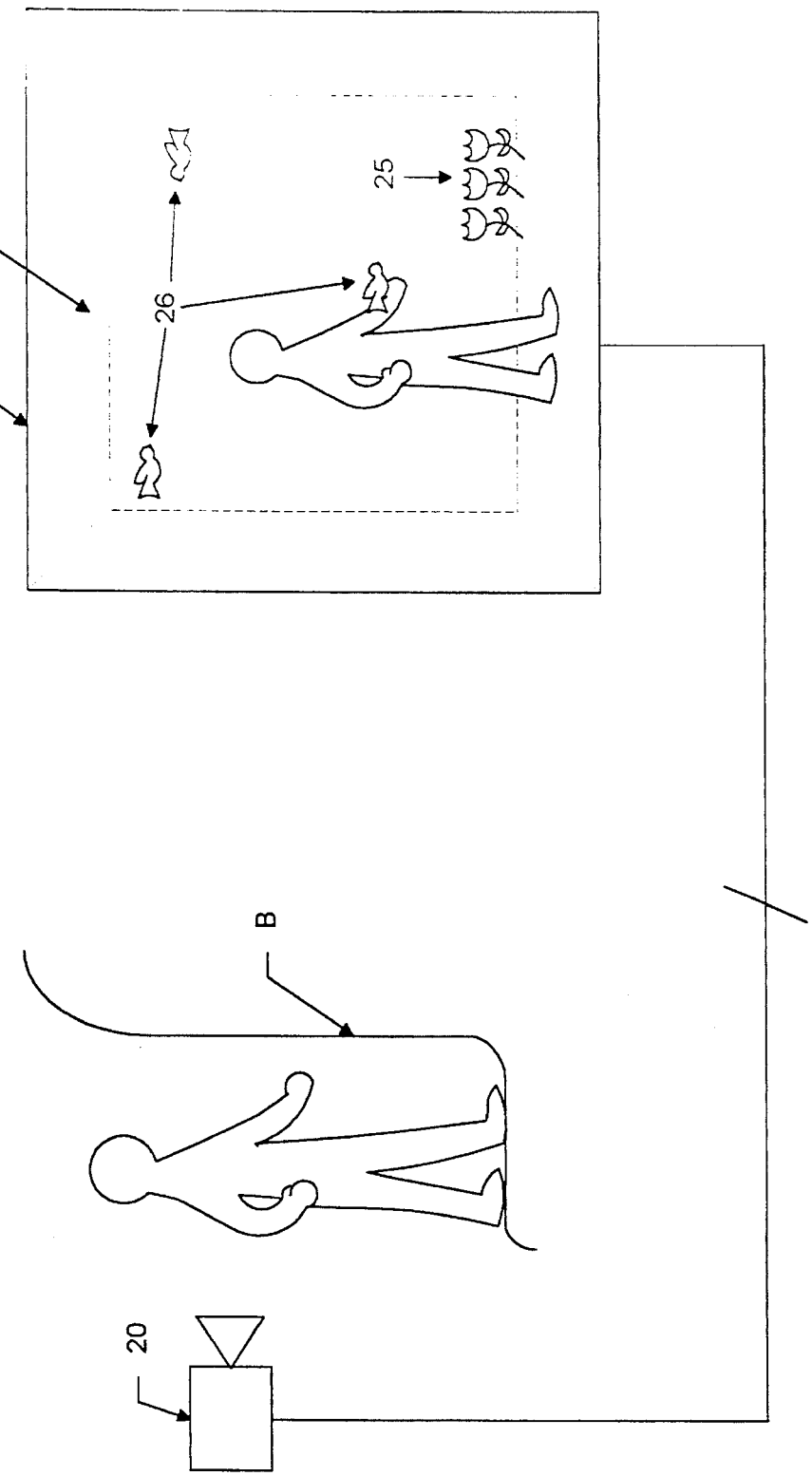
FIG. 1 diagrammatically illustrates the invention's basic mode of operation.

Refer first to FIG. 1, which illustrates the overall manner in which the present invention functions. A digital (e.g., CCD) camera 20, operating at speeds sufficient to convey smooth motion when its output is projected, repetitively records images of the user. The image is recorded as an array of picture elements, or "pixels," each of which specifies a numerically designated color and a quantized brightness value. The user's image is isolated, as discussed below, and integrated within a virtual environment 22 appearing on a VR display device 24. Preferably, that device is a large-screen monitor or a digital projection device. Virtual environment 22, although in actuality a two-dimensional array of pixels, is rendered in a manner that conveys an illusion of depth. As discussed below, the system maintains awareness of the user's spatial location as well as spatial locations assigned to background and foreground objects (such as the flowers shown at reference numeral 25) and the various agents 26 with which the user interacts, so that proper occlusion relationships—a key visual depth cue—can be continually maintained as the scene is updated.

Figure 2:
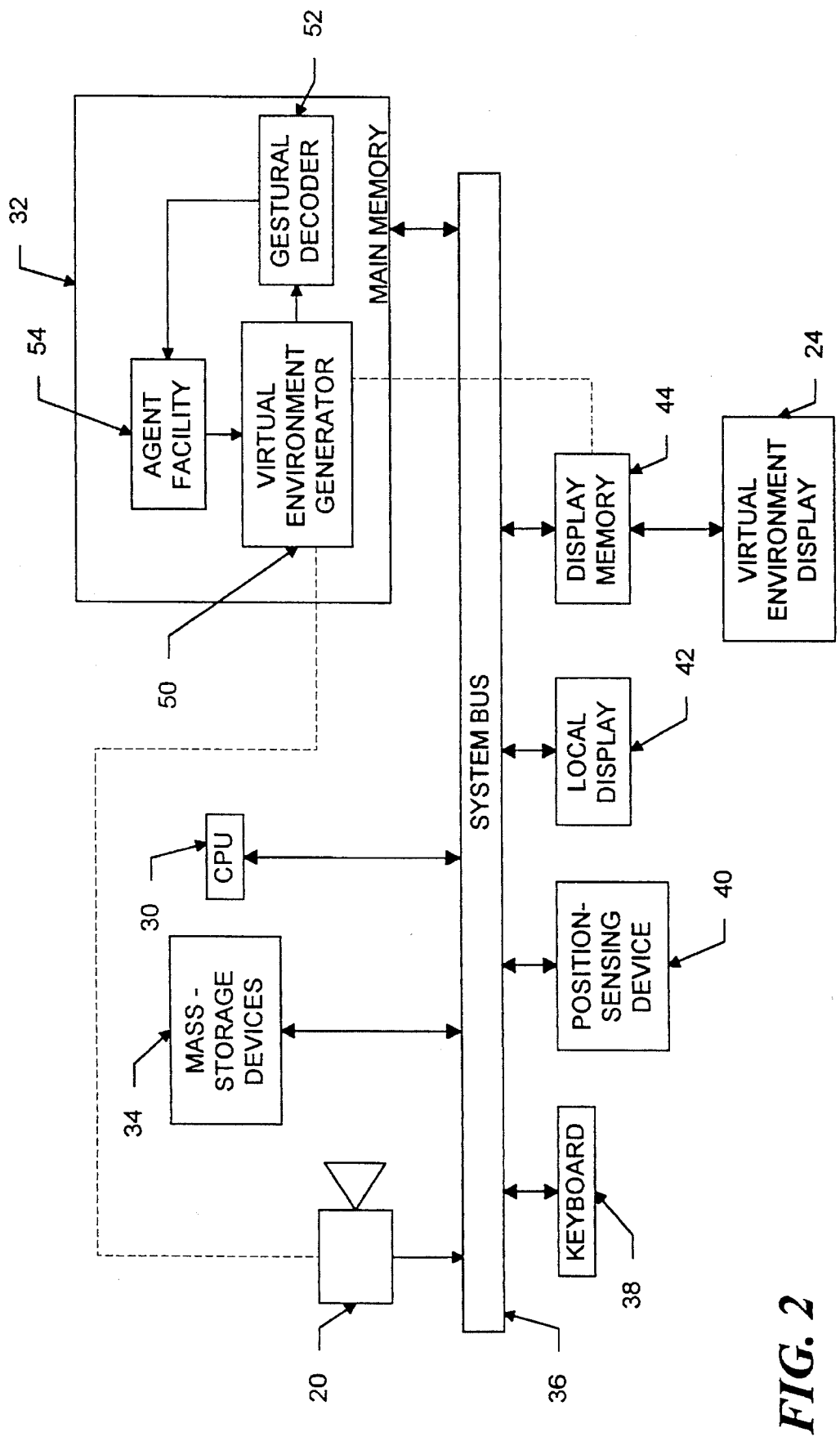
FIG. 2 is a block diagram of a digital electronic system incorporating the present invention.

The basic operating components of the inventive apparatus are shown in FIG. 2. The depicted system includes a central-processing unit (CPU) 30, which performs operations on and interacts with a main system memory 32 and components thereof (described in greater detail below). System memory 32 typically includes volatile or random-access memory (RAM) for temporary storage of information, operative modules and hardware drivers; system files, which enable CPU 30 to control basic hardware functions (such as interpreting keyboard signals); and portions of the operating system. System memory 32 typically also includes read-only memory (ROM) for permanent storage of the computer's configuration and basic operating commands, such as additional portions of the operating system. The system further includes at least one mass storage device 34 (e.g., a hard disk), which contains permanent files of information, including the operative system modules. All components of the system communicate over a bidirectional system bus 36.

Before operating the system, the designer, who creates or modifies the VR world that the user experiences, configures the system (i.e., sets parameters, establishes the visual appearance of virtual environment 22 and determines the nature and behavior of agents 26) using a keyboard 36 and a position-sensing device (e.g., a mouse) 40. These forms of interaction between the designer and the system, as distinguished from system user interaction over VR display 24, appear on a local display 42 (preferably a standard computer monitor). The contents of VR display 24 are specified by a pixel array, or "pixelmap," stored in a display memory 44; in other words, the contents of display memory 44 instantaneously determine what is presented on VR display 24. Virtual environment 22 can be quite simple, e.g., a faithful recording of the user and his or her surroundings, to which only autonomous agents are added; or an elaborate VR graphical and/or image-based environment stored and displayed digitally.

During system operation, main memory 32 contains a series of modules, loaded from mass-storage devices 34, that directly implement the various functions of the invention or control external hardware devices that perform such functions. Viewed generally, the invention includes a virtual environment generator 50, which receives the user's image from camera 20 and creates and updates the final output that appears on VR display 24; a gestural decoder 52, which analyzes the user's image for gestural cues and the coordinate positions of body parts; and an agent facility 54, which controls the movements and activities of the various agents 26 and renders them for presentation on VR display 24.

2. User Integration into Virtual Environment

Figure 3:
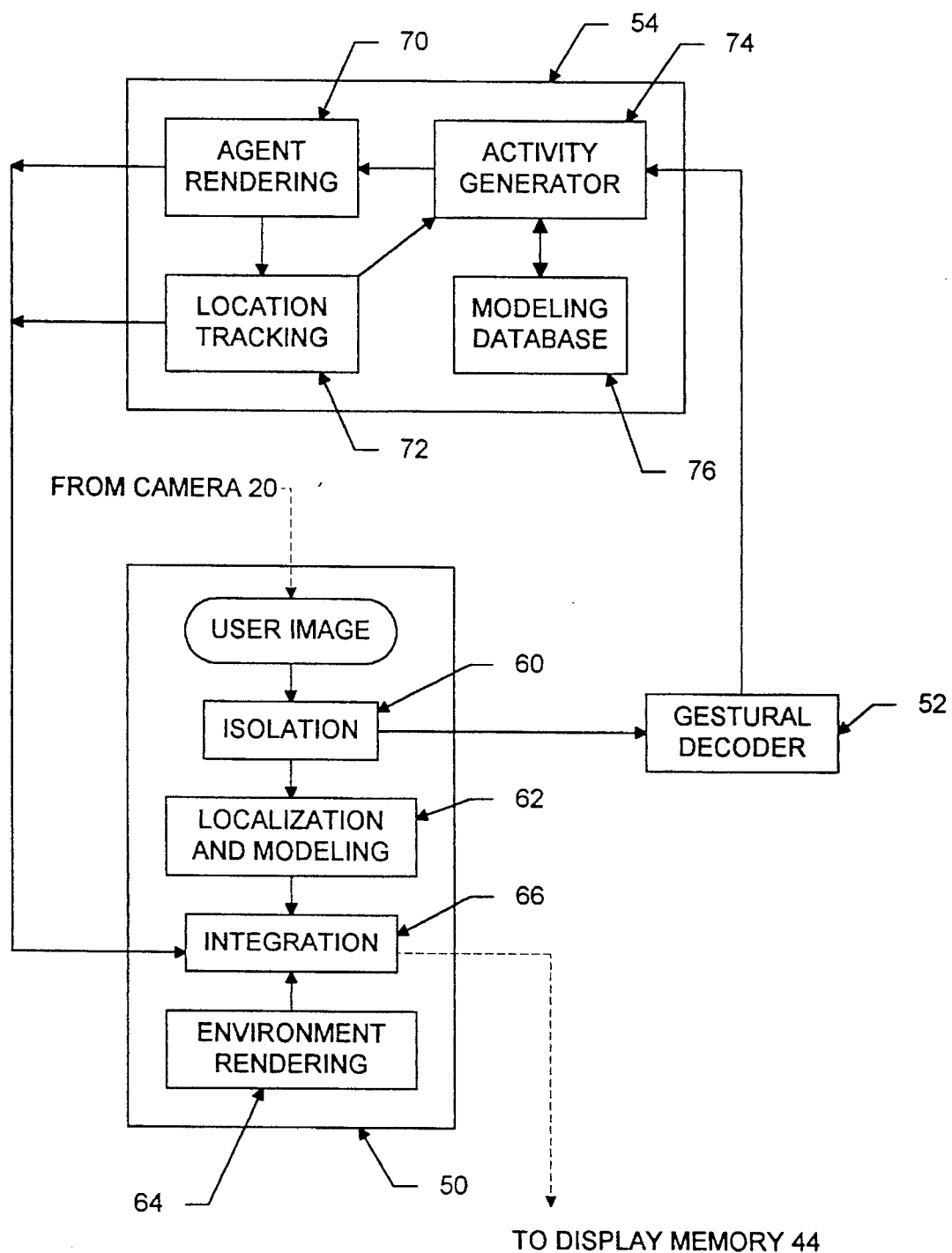
FIG. 3 is a more detailed block diagram of the primary functional features that implement the invention.

Images of the user are recorded by camera 20 and encoded as pixelmap data at a rate of at least 6 Hz. These are provided, via system bus 36, to virtual environment generator 50 (as indicated by the dotted figure line). As shown in FIG. 3, generator 50 comprises a series of modules, some of which, for greatest efficiency, are preferably implemented as software programs, while others optimally include both hardware and software components. However, it should be understood that electronic circuitry of well-known construction can be substituted for software components if desired. Furthermore, although this discussion assumes the presence of a single user, the invention is capable of simultaneously supporting multiple users. These users can occupy the same space before the same camera 20, or their images can instead by recorded by separate cameras at physically disparate locations. In the latter case, remote image data reaches the invention by means of suitable network connections, and the invention sends picture signals to the user's remote monitor over the same facility. In this way, all users interact in the same virtual world. Similarly, it is possible to utilize more than one camera for a single space to track three-dimensional position, pose and gesture more precisely; for example, supplementing a frontal view of the user with a a top or side view allows us to track the user's hands over a broader set of locations.

Incoming pixelmap data is first processed by an isolator 60, which extracts pixels representing the image of each user from extraneous image components, such as background. Isolator 60 operates by detecting differences in scene based on color or motion cues. In one embodiment, a user moves in front of a blue background B, and a chroma-keying system (such as, for example, the ULTIMATTE-300 compositing device marketed by Ultimatte, Chatsworth, Calif.) subtracts the background, isolating the user's image.

In a second, preferred embodiment, which does not impose any environmental restriction on the user, vision-based background subtraction is used instead of chroma-keying. In this embodiment, the user is separated from the video scene through the use of a bitmap mask which, when overlaid on the video image, allows only the user to be seen. To accomplish this, several images of the environment without the user present are recorded and analyzed to identify the mean and standard deviation in the red, green and blue channels for each pixel in the images. These background values are stored and used for comparison with subsequent images (which may be subsampled for greater speed). Specifically, subsequent images are each scanned to locate a pixel whose value differs significantly from the mean background value; these "seed" pixels are considered foreground, (i.e., the user), and their positions are reserved in the resultant image.

The test to determine whether a pixel differs significantly from the background comprises several steps. First, the pixel's luminance value (herein defined as the sum of the red, green and blue channels) is assessed against the stored mean luminance. If the luminance is smaller than the mean, each channel is multiplied by the mean luminance divided by the current luminance. The resulting values are then compared to the mean red, green and blue values. If any of these values differ from the mean by more than a specified number of standard deviations (i.e., the chroma threshold), then the pixel is considered foreground. This technique, which analyzes color differences, is designed to ignore the shadows cast by the user. Occasionally chroma-based comparisons will not work (e.g., if the user's clothing matches the color of the background). To accommodate the possibility of error, a pixel is also considered foreground if the pixel's overall luminance exceeds the average luminance by a specified number of deviations (i.e., the luma threshold). Appropriate chroma and luma threshold values are straightforwardly determined by those skilled in the art based on lighting, the overall distribution of color, etc.

Once an initial seed pixel is identified, eight nearest neighboring pixels are examined to determine if they also qualify as foreground. Any neighboring pixel meeting the foreground criteria is added to the list of seed pixels, while the original seed pixel is removed from this list and added to a "used" list. This process is iterated for all pixels not on the used list but which are neighbors to the pixels on the seed list, until the seed list becomes empty. Every pixel that is examined—even those whose values fail to exceed the foreground thresholds—is treated as foreground, and a resultant bitmap, containing all foreground pixels and defining the user's silhouette, is generated. Because the user's position ordinarily does not change significantly from frame to frame, the center of the foreground silhouette, calculated in the process of creating it, can be tested as the next video frame's seed.

A running history of the resultant bitmaps generated in accordance with the foregoing technique can be used to adapt the luma and chroma thresholds to a particular user. For example, if a bounding box surrounding the user's silhouette (discussed in greater detail below) fluctuates more than 25% of its average width or height, the foreground thresholds may be lowered so as not to ignore a user's arms or feet (which might otherwise flicker in and out of the resultant bitmaps). Higher-level analysis may also be employed to adapt these thresholds depending on the amount of precision necessary for a particular action or gesture.

After the resultant silhouette bitmap is generated, its perimeter is surrounded with a bounding box or, preferably, defined as a contour to facilitate spatial localization and movement modeling (for gestural decoding, as discussed below). A contour is recovered by starting at an edge, preferably directly under the centroid, and stepping around the silhouette in a clockwise fashion, and is preferably stored locally in chain code. The edge below the centroid usually corresponds to a point between the user's feet, a starting point useful for gesture recognition, as described below.

As the contour is defined, appropriately sized (for hands, feet and head) extrema of curvature are recovered by sliding a fixed-length window along the contour. If the direction of motion at the beginning of the window is 180° from the direction of motion at the end of the window, then the area contained in the window is labeled an extrema and the coordinate x,y values of the pixels contained in that window are averaged to find the centroid of the extrema. Analysis over the full window area ensures that small turns, which frequently arise due to noise, are ignored. The identified extrema are used in gestural recognition.

These edge-definition operations are performed by a localization and modeling module 62. This module also identifies the centroid of the bitmap; assuming that a person's image is of roughly constant density, the centroid corresponds to the person's approximate center of mass. Module 62 also derives a mathematical specification of the user's three-dimensional location with respect to camera 20 through analysis of surrounding box or contour based on the known camera calibration. Specifically, module 62 is provided with an image of the ground plane as recorded by camera 20 and a mathematical function, based on the camera calibration, that relates the recorded ground plane to the actual two-dimensional surface; this facilitates transformation between a point on the recorded image and its location on the actual surface. Suitable techniques for modeling camera geometry in this manner are well known in the art; see, e.g., D. Ballard and C. Brown, *Computer Vision* (1982) and B. Horn, *Robot Vision* (1991). Module 62 obtains the depth coordinate of the user (i.e., the camera-to-user distance) by mathematically projecting a ray from the known camera location into the bottom of the bounding box or contour, which is assumed to lie on the ground plane; the location of the intersection point on the recorded ground-plane image is then transformed into a two-dimensional coordinate on the actual ground plane, thereby specifying depth.

The user's distance from the camera provides a spatial location that is employed in rendering the user within virtual environment 22. The non-moving features of that environment are rendered (i.e., generated in a digitized pixel format suitable to drive VR display 24) by an environment-rendering engine 64. Each rendered item is preferably represented computationally as a separate "object" having an associated depth parameter, which determines its occlusion relationship to other rendered objects. The graphics and image-processing hardware and techniques for creating VR environments are well-characterized in the art; we have achieved success, for example, using a single Silicon Graphics, Inc. Onyx Reality Engine equipped with a Sirius video board.

An integrator 66 repetitively combines the VR environment, the isolated user image from isolator 60, and renderings of autonomous agents from agent facility 54 (described in greater detail below) into final images that are transferred to display memory 44. Preferably, integrator 66 operates by means of video blending, combining graphical imagery from the rendering engines with the background-subtracted video image of the user in a manner that respects the established occlusion relationships. For example, the alpha-blending facility of the Sirius video board allows the user to combine video and graphical images, specifying that certain pixels of the graphics image are to occlude or be occluded by the video image. Using such a facility as integrator 66, we first process the graphical renderings of agents and the virtual environment 22 to implement the occlusion relationships therebetween, using the depth parameters associated with the various graphical objects to modify boundaries as appropriate. We then integrate the user's video image, once again treating it as an object and designating as transparent those pixels which, based on the user's depth and the depth of overlapping (in a two-dimensional sense) graphical objects, should be occluded by such graphical objects. This process is repeated each time VR display 24 is updated.

3. Gestural Acquisition and Decoding

The isolated image of the user is provided to gestural decoder 52, which analyzes the bounding box or contour for characteristic spatiotemporal patterns. Gestures are interpreted through localization of key points on the user's image, followed by matching with pre-established spatiotemporal template patterns; as discussed below, recognized gestures are further analyzed by agent facility 54, which considers the context in which a gesture is observed in order to select an appropriate agent activity.

In the bounding-box embodiment, gestural decoder 52 first determines the user's overall pose by first obtaining an average user height and width over several frames, and then analyzing the size of the bounding box, its aspect ratio and the user's depth; this, in turn, enables localization of the user's hands and feet, which provide the most salient gestural cues. Thus, gestural decoder 52 determines whether the user is sitting or standing by determining the height of the current bounding box and dividing this by the average user height; a ratio of 0.95 to 1.05 suggests standing; a ratio of 0.55 to 0.75 suggests bending; and ratios less than 0.55 suggest a sitting posture. The average widths are used to determine whether the user's arm is pointing outward, providing a straightforward estimate of the location of the hand. These conclusions regarding the user's posture are employed to define rectangular search areas within the bounding box. Gestural decoder 52 then performs normalized correlation searches on pixels within the search areas to find characteristics indicative of hands and feet (e.g., strong horizontal edges).

In a second, preferred embodiment, instead of (or in addition to) drawing a bounding box, gestural decoder 52 analyzes the extrema identified during contour definition. Ordinarily the five most pronounced extrema correspond to the head, hands and feet. Moreover, by beginning contour definition at a point that is likely (unless the user is off balance or background subtraction did not produce a good approximation of the user's shape) to be between the user's feet, the user's extremities will appear around the contour in a predictable order (left foot, left hand, head, right hand, right foot). More specific classification of the extrema is accomplished through analysis of extrema position. In particular, it is assumed that the feet will be located in the lower 40% of a bounding box on the left and right sides; the hands will be located in the upper 66% of the bounding box and more than 6 inches from the center of mass; and the head will be above the center of mass and within 5 inches to its left or right. If these conditions persist over time, the confidence value of the tentative classification is increased and gestural decoder 52 performs localized tracking of the extrema. The latter procedure follows the position of the centroid over a series of video frames, thereby dispensing with the need for continued analysis until the centroid can no longer be found (e.g., if the user's hand enters the silhouette).

Finally, gestural decoder 52 analyzes the movements, over several image frames, of pixels identified as corresponding to hands, feet, head and center of mass for patterns characteristic of particular gestures. Gesture identification (for both the bounding-box and contour implementations) can be accomplished in a number of different ways. In one embodiment, we employ normalized correlation searching. The localized hand or foot image is matched against a series of learned "view models," each based on one or more example images from which mean and variance statistics have been computed for each image pixel. The view models capture the reliable portions of a particular view of an object, and exclude pattern details that vary across learning trials. See, e.g., Darrell & Pentland, "Space-Time Gestures," *Proceedings of IEEE Conference on Vision and Pattern Recognition* (June 1993) (incorporated herein by reference).

In a second, preferred embodiment, gestural decoder 52 includes a set of feature buffers and computer instructions implementing gesture recognition. Each feature buffer is a partition of main memory 22 capable of storing a portion of a digitized image frame recorded by camera 20, the three-dimensional coordinates of identified body features, and confidence levels associated with the identifications. The appropriate portions are identified based on the feature-identification procedures discussed above, and are isolated from the remainder of an image frame for storage in the feature buffer. This process is repeated for each recorded image frame. A set of n feature buffers is defined for each tracked feature; each set is logically organized as a ring, which collectively stores the most recent n frames. In operation, the first frame containing image information representing a tracked feature is loaded into the first corresponding feature buffer, the next one in the second buffer and so on until a frame has been loaded into the last buffer. The next frame is loaded into the first buffer to overwrite the frame previously contained therein, and the one after that is loaded into the second buffer.

As each new frame is stored, gestural decoder 52 calculates a movement derivative that expresses the degree of frame-to-frame deviation in the identified feature. Preferably, these derivatives are based on the actual time difference between frames (rather than assuming a constant time difference) in order to accommodate varying frame rates. Gestural decoder 52 identifies gestures based on the movement derivative and the tracked feature to which it relates. More specifically, gestural decoder 52 searches for conformity to a feature-specific movement pattern characteristic of a particular gesture and, based on the degree of matching, identifies the most likely gesture.

Important recognized gestures generally include pointing, waving and kicking, although, obviously, different applications may stress different gestures; we discuss these three useful examples for illustrative purposes and not in a limiting sense. Each of the noted gestures is defined in terms of a characteristic movement of the user's body features occurring or repeating over a specific time range. Pointing requires a particular relative hand location (an extended arm, modeled as a normalized distance of the hand from the center of mass) and a steady position over time. Waving requires a predominantly side-to-side hand motion, modeled as a characteristic x-axis variation of pixels corresponding to the hand, which is typically located a normalized distance above the center of mass; in addition, a waving user is typically otherwise stationary. Kicking requires a sideways movement of the foot. The specific modeling parameters used to identify these (as well as other) gestures are straightforwardly determined without undue experimentation.

4. Generation and Control of Autonomous Agents

Agents are represented in the system by graphical or image data, which is used to render the pictorial representations of agents on VR display 24, and a series of data attributes that determine apparent behavior patterns. To simplify processing, the user is preferably represented, for purposes of agent localization and tracking, as another agent. The position and pose of the "user agent" is drawn from localization and modeling module 62 to ensure accuracy; however, this does not affect the manner in which the user's image is integrated into the final display. This is accomplished as discussed earlier; the user is not rendered, as are agents.

Agent facility 54 integrates an agent into virtual environment 22 in two ways: visually, by continuously rendering and updating the agent's pictorial representation for incorporation, by integrator 66, into the pixelmap; and behaviorally, by providing the agent with the means to "sense" nearby objects (including the object representing the user) and to interpret gestures. Rendering is accomplished by a rendering engine 70, similar in operation to rendering engine 64; indeed, the same image-processing hardware and/or software can be used to perform the functions of both conceptually distinct components. Suitable image-processing systems, which are well-characterized in the art, utilize a basic animation template and a set of commands for selectively rendering and modifying the template on the pixelmap of VR display 24. For example, the template may be divided into a set of graphical "objects," such as body and limbs. A typical animation package includes commands for moving the entire agent or individual components thereof; the package executes the commands by modifying the agent's rendering in timewise steps so that the requested movement appears to take place over a visually appropriate time scale.

A location-tracking module 72 stores the instantaneous screen coordinate location of each agent on VR display 24, as well as a parameter corresponding to the depth of the agent within virtual environment 22. This parameter is utilized by integrator 66 to maintain the illusion of three-dimensionality through consistent occlusion relationships among all rendered objects. The agent's location also provides one element processed by an activity generator 74, which determines the agents' behaviors and movements based on parameters stored in a modeling database 76. The designer sets these parameters, as discussed previously, through interaction with CPU 30. Location-tracking module 72 also stores the straight-line distance of the agent from other agents, the user, and, if appropriate, objects within virtual environment 22.

Activity generator 74 selects actions for each agent based on a computationally implemented model of desired behavior, as well as the location of the user and gestures recognized by gestural decoder 52. The observed behavior or actions of the agent represents the final choice among numerous potential activities competing for control of the agent. The activities compete on the basis of the value of a given activity to the agent at a particular instant within virtual environment 22, given the agent's surroundings, internal needs and recent history.

Modeling database 76 contains parameters specifying a sensory system that allows agents to perceive their surroundings within virtual environment 22; an optional set of internal needs; a repertoire of activities; a motor system that specifies a range of permitted movement (as rendered by rendering engine 70); and an activity-selection system. Each of these components will be described in turn.

The preferred "virtual sensor" arrangement utilized in location-tracking module 72 operates by mathematically projecting rays from the central pixel of the agent across an arc of specified angle in the two-dimensional plane of virtual environment 22. Location module 72 records, for each ray, the closest point of intersection with pixels corresponding to another rendered object (which may be an inanimate object, another agent or the user) and the identity of that object. Location module 72 then compares the location parameters of the agent (including depth) with those of the intercepted object, deriving a three-dimensional distance to the object trigonometrically. However, other suitable sensor arrangements can also be employed. For example, it is possible to render the scene from the agent's point of view, then analyze it using vision algorithms to identify and locate surrounding objects.

Agent motivations or internal needs are modeled as variables that may vary over time. For example, a "dog" agent may have an internal need to receive attention from the user. Whenever the user pats the dog (as detected by location-tracking module 72, which records user proximity, and gestural decoder 52, which interprets the gesture), this variable will temporarily decrease in value; as a result, the agent will be less motivated to seek human attention.

The rendering commands associated with an activity are not fixed, but instead depend on agent location and surrounding objects as recorded by location-tracking module 72. These are implemented on display 24 by suitable image-based commands, using, for example, the Open Inventor object-oriented toolkit for creating interactive three-dimensional graphics applications, supplied by Silicon Graphics, Inc., Mountainview, Calif.

For purposes of activity selection, time is represented as discrete time-steps, where a time step is some small fraction of a second, and activity selection is performed on each time step. Activity generator 74 determines which its repertoire of activities the agent should engage in given its current environment, internal needs and recent history of activities. In one exemplary embodiment, defined activities are organized in loose overlapping hierarchies with more general activities at the top and more specific activities at the leaves. Activities correspond to nodes in a tree, and a node can have zero or more children (i.e., activities associated with a given node). Children activities are mutually inhibiting; only one can be active at a time. If the active activity is a leaf node, rendering commands are issued to rendering engine 70; otherwise, its children compete for control, and the process is repeated until a leaf node is reached. An activity is selected based on the maximum value, which itself depends on activity-specific fatigue, releasing mechanisms and endogenous variables. The fatigue function prevents an activity from persisting excessively, thereby causing the agent to miss opportunities or ignore other goals. Releasing mechanisms identify significant events and objects in virtual environment 22 from sensory input. Endogenous variables model the value of an activity to explicitly defined internal needs.

Based on these concepts, the value $V_{it}$ of an activity i at time t is given by:

$$V_{it} = \text{Max}[[(1-f_{it}) * [\text{Comb}(\Sigma r_{kt}, \Sigma e_{it}] - \Sigma(I_{ji} * V_{jt})], 0]$$

where $f_{it}$=level of fatigue of the activity i at time t; the operation Comb(r,e)→if (e<0) return e else return e+r; $r_{kt}$=value of releasing mechanism k at time t where k ranges over the releasing mechanisms relevant to activity i; and $e_{lt}$=value of endogenous factor l at time t. l ranges over endogenous factors relevant to activity i. Within a collection of mutually inhibiting activities, the system iterates until a stable solution is found in which one activity has a positive value and the value of remaining activities are within a specified tolerance of zero.

Activity-specific fatigue is modeled as follows:

$$f_{it} = \text{clamp}((1+f_{wi}) * f_{i(t-1)} + (V_{i(t-1)} * kf_i) - f_{ai}, 0, 1)$$

where the operation clamp(a, min, max)→clamp a to between min and max; $f_{wi}$=value-dependent rate of increase in fatigue for activity i; $kf_i$=fatigue gain for activity i; $V_{i(t-1)}$=value of activity i at time t−1; and $f_{ai}$=autonomous decrease in fatigue for activity i. Thus, as noted above, a dog agent may associate a high value V with obtaining attention from the user; as the user interacts with the agent, however, the fatigue factor increases over time, decreasing the value of this activity relative to other activities.

Releasing mechanisms are modeled as follows:

$$r_{kt} = \text{clamp}(f_k(r_{k(t-1)}, s_{kt}), \text{min } k, \text{max } k)$$

where $s_{kt}$=sensory input at time t relevant to releasing mechanism k at time t; $f_k(r_{k(t-1)}, s_{kt})$=arbitrarily complex function of current sensor input and, optionally, previous values of releasing mechanism k; and min k, max k=min and max of allowed range for releasing mechanism k. Releasing mechanisms allow the agent to respond to user gestures identified by gestural decoder 52, the significance of which may be determined by the proximity to the agent of the user (as indicated by location-tracking module 72) and fatigue factors, as well as past history and context-dependent cues. For example, a releasing mechanism for a dog agent can be defined to respond negatively to gestures such as kicking, and to associate the negative response with a range of other, visually related gestures encountered in the future.

Endogenous variables can be used to represent complicated internal systems, as in ethological modeling, and may therefore result from an arbitrarily complex calculation. In the default case they are modeled as follows:

$$e_{it} = e_{i(t-1)} + ea_i - \Sigma(V_{h(t-1)} * ke_h) + f_i()$$

where $ea_i$=autonomous change in $e_i$; h ranges over activities that affect $e_i$; $V_{h(t-1)}$=value of activity h at t−1; $ke_h$=endogenous gain associated with activity h; and $f_i()$ represents an arbitrary function of other factors. An activity can depend on any number of endogenous variables and releasing mechanisms, and these, in turn, can be shared by any number of activities.

Appropriate values, ranges and function characteristics for the above-described parameters are straightforwardly determined in accordance with the desired agent behavior and response characteristics. In an exemplary implementation, this approach was used to model a world that includes hamsters and predators. The hamster's repertoire of top-level activities (or behavior systems) includes: Foraging (finding food and carrying back to the hoard), Feeding (finding food and eating it), Drinking (finding water and drinking it), Cleaning, Anti-Predator (avoiding and fleeing from predators), Sleeping (finding the nest and sleeping), and Death (which occurs if the hamster is eaten by a predator or if specified internal state variables exceed a given range of acceptability). Activities are organized in a loose hierarchy. For example, Feeding is a top-level activity with three children: Chewing, Preparing-to-Eat, and Searching-for-Food. Searching-for-Food, in turn, has three children: Wander, Avoid-Obstacles, and Move-to-Food. The predator's repertoire is modeled similarly. The full set of activities, releasing mechanisms, endogenous variables and motor commands associated with this representative implementation appear in the program-listing appendix.

It should be emphasized that the foregoing model of agent behavior is exemplary only. Agent behavior can be successfully implemented using any suitable model that (a) specifies the agent's sensors and attaching meaning to their outputs; (b) specifies the agent's goals and motivations, and how these change in value over time; (c) specifies other internal state variables of the agent; (d) specifies a repertoire of actions; (e) provides a mechanism for action selection that determines which action is most appropriate at a particular time, given factors (a) through (d); specifies how an action is implemented in terms of motor commands and changes in the visual representation, as well as how implemented actions affect factors (b) and (c).

The present invention can also support sound input and output (including speech between the user and agents). Sound produced by the user is captured using a microphone or other transducer and provided to gesture decoder 52, which analyzes the incoming signal for significance as in the case of a visual gesture. Aural output is produced by a conventional sound board, driven by activity generator 74 and/or an environment sound module (not shown) that adds acoustic output to the visual rendering of VR environment 22 by rendering engine 64.

It will therefore be seen that the foregoing represents a highly versatile and conveniently practiced approach to visual compositing and interaction based on gesture recognition. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

PROGRAM-LISTING APPENDIX

Activity.c++

```
#include "Activity.h"
#include "ActivityCollection.h"
#include "Genome.h"
#include <iostream.h>
include <fstream.h>
#include <stdlib.h>
#include <string.h>
#include <stdio.h>
#include <stdlib.h>
#include <math.h>
#include "../nexttypes.h"
#include "State.h"
#include "Statistics.h"
#include "FileHandler.h"

#define THRESHOLD .40
static int nas = 0;
static int nrs = 0;
static int nes = 0;

void Activity::initActivity(void *whichState,int atag,char *aname,float fr,float e,void *releaser)
{
  int i;
  Interest *f;

for(i=0;i<MAXINHIBITORS;i++){
    inhibitedBy[i]=0;
    gains[i] = 1;
  }
  value = previousValue = 0;
  count = 0;
  active = 0;
  statistics = 0;
  stimulus = 0;
  tag = atag;
  active = 0;
  pname = aname;
  interestRate = fr;
  effect = e;
  activityCollection = NULL;
  multiplicative = 0;
  endogenousVariables = new List;
  releasers = new List;
  if(releaser)
    addReleaser((Releaser *)releaser);
  f = new Interest;
  f->init(whichState,1,0,this);
  addEndogenousVariable(f);
  consumatoryActivity = this;
  state = (State *)whichState;
  recommender = 0;
  statistics = new Statistics;
  if(statistics)
    statistics->init(this);
//    printf("num act => %d\n", ++nas);
} void Activity::setRecommender(int yn)
{
  recommender = yn;
} void Activity::setRateFromDuration(float dur)
```

Activity.c++

```
{
  effect = log(1.0/THRESHOLD)/dur;
} void Activity::addReleaser(Releaser *rel)
{
//   printf("num rel => %d\n", ++nrs);
   releasers->add((void *)rel);
} void Activity::addEndogenousVariable(Endogenous *endo)
{
   if(endo->typeTag == 2){
     interest = endo;
   }
   else{
     endogenousVariables->add((void *)endo);
//     printf("num endo => %d\n", ++nes);
   }
//  endo->addAffectedBy((void *)this);
} void Activity::setConsumatoryActivity(Activity  *act)
{
   consumatoryActivity = act;
} void Activity::dispatchActivityAt(int t)
{
   if(active && activityCollection){
      ((ActivityCollection *)activityCollection)->stepAt(t);
   }
} void Activity::updateAndSumReleasersAt(int t)
{
   Link *node;
   Releaser  *rel;

if(releasers->head){
     stimulus  = 0;
     for(node = releasers->head;node;node = node->next){
        rel = (Releaser *)node->object;
        stimulus  += rel->updateStateAt(t);
     }
   }
} void Activity::sumEndogenousVariables()
{
   Link *node;
   Endogenous *endo;

endogenousFactor = 0;
   for(node = endogenousVariables->head;node;node = node->next){
     endo = (Endogenous *)node->object;
     endogenousFactor += endo->value;
   }
} void Activity::addInhibitorAt(Activity *sub,int which)
{
   if(inhibitedBy[which] != sub){
      inhibitedBy[which] = sub;
```

Activity.c++

```
    count++;
  }
} void Activity::adjustEndogenousVariableUsing(Endogenous *endo, float *whichEffect)
{
  if((endo->typeTag ==1)&&(consumatoryActivity->active))
    endo->endoAffectorEffects += (*whichEffect)*value;
  else if((endo->typeTag == 2) && (consumatoryActivity->active)){
    endo->endoAffectorEffects += interestRate*value*.01;
  }
} void Activity::setGainAt(float k,int at)
{
  gains[at] = k;
} void Activity::setUniformGain(float k)
{
  int i;
  for(i=0;i<MAXINHIBITORS;i++)
    gains[i] = k;
} void Activity::calcDirectFactorsAt(int t)
{
  directFactors = (multiplicative)?
    (endogenousFactor*stimulus):(endogenousFactor + stimulus);
/*
  directFactors = (endogenousFactor<0)?
        endogenousFactor : endogenousFactor + stimulus;
*/
  if(interest){
    value = (interest)?interest->value*directFactors:directFactors;
  }
  else
    value = directFactors;
  value = MAX(value,0); .
} void Activity::calcInhibitionAt(int t)
{
  int i;

for(i=0,inhibition = 0;i<count;i++){
    if(inhibitedBy[i]&&(inhibitedBy[i] != this))
      inhibition += inhibitedBy[i]->inhibitionFor(tag);
  }
} float Activity::inhibitionFor(int guy)
{
  return gains[guy]*previousValue;
} void Activity::calcValueAt(int t)
{
  value -= inhibition;
  value = MAX(value,0);
} void Activity::iterateAt(int t)
```

Activity.c++

```
{
  calcInhibitionAt(t);
  calcDirectFactorsAt(t);
  calcValueAt(t);
} void Activity::prepareForUpdateAt(int t)
{
  previousValue = value;
} void Activity::updateAt(int t)
{
  updateAndSumReleasersAt(t);
  sumEndogenousVariables();
  calcInhibitionAt(t);
  calcDirectFactorsAt(t);
  calcValueAt (t);
} void Activity::setActive(int yn)
{
  if(activityCollection && active && !yn)
    ((ActivityCollection *)activityCollection)->clearActive();
  if(yn){
    active++;
  }
  else
    active = yn;
  if(statistics)
    statistics->update();
} void Activity::reportStateAt(int t)
{
  printf("%s st  %f  ef: %f inh: %f value: %f\n",
         pname,
         stimulus,
         directFactors,
         inhibition,
         value);
} void Activity::makeRecommendationAt(int t)
{
}

Genome *Activity::writeToGenome(int level)
{
    ActivityGenome *ag = new ActivityGenome(pname);
    ActivityCollection *ac = (ActivityCollection *)activityCollection;
    ag->level = level;
    ag->writeToGenome(this);
    if(ac)
        ac->writeToGenome(ag, level);

return ag;
}

Genome *Activity::readGenomeFromFile(FILE *fn)
{
    ActivityGenome *ag = new ActivityGenome(pname);
    ActivityCollection *ac = (ActivityCollection *)activityCollection;
    ag->initFromFile(fn);
```

Activity.c++

```
    if(ac)
        ac->readGenomeFromFile(ag, fn);

return ag;
} void Activity::readFromGenome(void *g)
{
    ActivityGenome *ag = (ActivityGenome *)g;
    ActivityCollection *ac = (ActivityCollection *)activityCollection;

ag->readFromGenome(this);
    if(ac)
        ac->readFromGenome(ag);

return;
} char *Activity::readInstance(ifstream *inFile, void *state, int flag)
{
    char inBuffer[MAX_LINES], *name;
    int i, activityNum;
    /* interestRate, effect, value, interestAR, interestIR, uniform Gain */
    float values[11];

if(flag)
       (*inFile).get(inBuffer, MAX_LINES, '(');
    else
       inFile->get(inBuffer, MAX_LINES, '\n');

char *line = inBuffer;
    name = (char*)malloc(sizeof(char)* MAX_CHARS);

line = GetNextWord( line, 0);
    sscanf(line, " %i", &activityNum);
    line = GetNextWord( line, 1);
    sscanf(line, " %s", name);

/*
     * modified by bruce to allow for 6 separate inhibitory gains
     */
    for( i = 0; i < 11; i++) {
      line  = GetNextWord( line, 1  );
      sscanf(line, " %f", &(values[i]));
    }
    line = GetNextWord(line, 1);
#ifdef SLOTS
    printf("Creating Activity with name %s:\nlevel: %d, IR = %f, effect = %f, IAR = %f, IIR
= %f, gain = %f\n", name, activityNum, values[0], values[1], values[2], values[3], values
[4]);
#endif
    // initActivity(state, activityNum, name, values[0],values[1], NULL);

customInitialization(line, state,activityNum, name, values[0],values[1] );
     interest->setRates(values[2], values[3], values[4]);
    for(i=0;i<6;i++){
        setGainAt(values[5+i], i);
    }
    return( line );
} void Activity::customInitialization(char *line, void *state, int activityNum, char *name,
    float v1, float v2)
{
```

Activity.c++

```
    initActivity(state, activityNum, name, v1,v2, NULL);
    return;
}
Activity *returnActivity(ifstream *inFile, State *whichState, Sensor *s1 )
{
  Activity *act = new Activity;
  act->readInstance( inFile, whichState, 0 );
  return( act );
}
```

ActivityCollection.c++

```cpp
#include "ActivityCollection.h"
#include "Activity.h"
#include "Action.h"
#include "Endogenous.h"
#include "State.h"
#include "Statistics.h"
#include "../Profile.h"
#include "../Brio.h"
#include "Genome.h"
#include "FileHandler.h"
#include <iostream.h>
include <fstream.h>
#include <string.h>
#include <math.h>
#include <stdio.h>
extern Brio *globalBrio;
extern FILE *logfile;

ActivityCollection::ActivityCollection()
{
  c = 0;
  showState = 0;
  activeActivity = 0;
}

Activity *ActivityCollection::addActivity(Activity *act)
{
  if(c<MAXACTIVITY){
    system[c++] = act;
    return act;
  }
  else{
    printf("WARNING: TOO MANY ACTIVITIES FOR Collection\n");
    return NULL;
  }
} void ActivityCollection::initInhibitionLinks()
{
  int i,j;

for(i=0;i<c;i++)
    for(j=0;j<c;j++)
      system[i]->addInhibitorAt(system[j],j);
} int ActivityCollection::setActiveAt(int t)
{
  int i;
  float max = -1e6;
  int maxIndex = -1;

for(i=0;i<c;i++)
    if(system[i]->value>max){
      max = system[i]->value;
      maxIndex = i;
    }
  for(i=0;i<c;i++){
    system[i]->setActive((i==maxIndex)?1:0);
    if(system[i]->recommender && (i != maxIndex))
      system[i]->makeRecommendationAt(t);
    //system[i]->setActive((system[i]->value>0));
  }
```

ActivityCollection.c++

```cpp
  return maxIndex;
} void ActivityCollection::checkSwitch(int newActivity,int nt,int show)
{
  static int t,i;
  static int oldActivity=0;

if(oldActivity != newActivity){
    printf("Switching activities at: %d from %s to %s duration %d \n",
           nt,system[oldActivity]->pname,
           system[newActivity]->pname,nt-t);
    oldActivity = newActivity;
    t = nt;
    if(show){
      for(i=0;i<c;i++)
        system[i]->reportStateAt(t);
    }
  }
  return;
} void ActivityCollection::ps(int t)
{
  for(int i=0;i<c;i++)
    system[i]->reportStateAt(t);
} void ActivityCollection::jiggle(int t)
{
  float maxdf = -1e6,df;
  int maxi = -1;

for(int i=0;i<c;i++){
    df = (system[i]->interest)?
      system[i]->directFactors*system[i]->interest->value
      : system[i]->directFactors;
    if(df > maxdf){
      maxdf = df;
      maxi = i;
    }
  }
  system[maxi]->value = system[maxi]->previousValue = maxdf;
} void ActivityCollection::iterateToEquilibrium(int t, int count)
{
  int i, iters = 0;
  float err,lasterr=1e6;

while(count--){
    err = 0;
    for(i=0;i<c;i++){
      err += fabs( system[i]->previousValue -  system[i]->value);
      system[i]->previousValue = system[i]->value;
    }
    if(err<.1){
    //   printf("at t %d iteration %d err -> %f\n",t,count,err);
      return;
    }
    else{
      if(lasterr==err){
//        if(iters>4){
//          printf("NOT CONVERGING 1\n");
```

ActivityCollection.c++

```
//        // ps(t);
//      }
        jiggle(t);
        //ps(t);
      }
/*
      else if((iters>4)&&(err>lasterr)){
        printf("NOT CONVERGING 2\n");
        jiggle(t);
        ps(t);
      }
*/
      lasterr = err;
    }
    for(i=0;i<c;i++)
      system[i]->iterateAt(t);
    iters++;
  }
  printf("WARNING DID NOT CONVERGE -> %f \n",err);
  ps(t);
} void ActivityCollection::stepAt(int t)
{
  int i;
  static int show=1;

for(i=0;i<c;i++)
    system[i]->prepareForUpdateAt(t);
  for(i=0;i<c;i++)
    system[i]->updateAt(t);

iterateToEquilibrium(t,20);

activeActivity = setActiveAt(t);
  if(showState)
    for(i=0;i<c;i++){
      system[i]->reportStateAt(t);
    }
  for(i=0;i<c;i++){
    system[i]->dispatchActivityAt(t);
  }
 // checkSwitch(activeActivity,t,show);
}

Activity *ActivityCollection::getActiveActivity()
{
    return system[activeActivity];
} void ActivityCollection::printStatisticsAt(int t, int interval)
{
    int i;
    if(logfile)
        fprintf(logfile, "Cumulative Statistics at %d\n", t);
    else
        printf("Cumulative Statistics at %d\n", t);
    ps(t);
    for(i=0;i<c;i++){
        if(system[i]->statistics)
            system[i]->statistics->updateAndPrintAt(t, interval);
//      if(system[i]->active && Brio::showActivityProfile)
//          globalBrio->activityProfiler->addNewBar(i, system[i]->value);
    }
```

```
ActivityCollection.c++

//      if(Brio::showEndogenousProfile){
//          float e1, e2;
//          Profile *profiler = globalBrio->endogenousProfiler;
//          e1 = system[0]->state->findVariableWithTag(ENERGYTAG)->value;
//          e2 = system[0]->state->findVariableWithTag(WATERTAG)->value;
//          profiler->addNewBar(0, e1);
//          profiler->addNewBar(1, e2);
//          profiler->updateSeriesCount();
//      }
} void ActivityCollection::clearActive()
{
    system[activeActivity]->setActive(0);
}

Genome *ActivityCollection::writeToGenome(Genome *genome, int level)
{
    int i;
    for(i=0;i<c;i++){
        genome->addChild(system[i]->writeToGenome(level+1));
    }
    return genome;
}

Genome *ActivityCollection::readGenomeFromFile(Genome *genome, FILE *fn)
{
    int i;
    for(i=0;i<c;i++){
        genome->addChild(system[i]->readGenomeFromFile(fn));
    }
    return genome;
} void *ActivityCollection::readFromGenome(Genome *genome)
{
    int i;
    for(i=0;i<c;i++){
        system[i]->readFromGenome(genome->children[i]);
    }
    return this;
} void ActivityCollection::getMutualInhibition(int act1, int act2, float *i1, float *i2)
{
    *i1 = system[act1]->gains[act2];
    *i2 = system[act2]->gains[act1];
} void ActivityCollection::readInstance( ifstream *inFile )
{
    char name[MAX_CHARS], inBuffer[MAX_LINES];
    (*inFile).get(inBuffer, MAX_LINES, '(');
    char *line = inBuffer;

line = GetNextWord( line, 0 );
    sscanf( line, " %s", name);
}

ActivityCollection *returnAnchor(ifstream* inFile, State *whichState, Sensor *s1)
{
    ActivityCollection *ac = new ActivityCollection;
    ac->readInstance( inFile );
    return( ac );
```

ActivityCollection.c++

}

EndoAffector.c++

```
#include "EndoAffector.h"
#include "Endogenous.h"
include <stdio.h> void EndoAffector::adjustEndogenousVariableUsing(Endogenous *endo,
        float *customEffect)
{
    endo->endoAffectorEffects += ((*customEffect)*value);
    printf("adjustEndogenousVariable called %f %f %f \n",
        *customEffect, value, ((*customEffect)*value));
}
```

Endogenous.c++

```cpp
#include "Endogenous.h"
#include <iostream.h>
include <fstream.h>
#include <string.h>
#include <stdlib.h>
include <stdio.h>
#include "Activity.h"
#include "State.h"
#include <math.h>
#include "../nexttypes.h"
#include "EndoAffector.h"
#include "FileHandler.h"

#define TIMESTEPSPERDAY 5000
define MAXVALUE 50.0 extern FILE *logfile;

EndoAffectorBlock::EndoAffectorBlock(EndoAffector *whichGuy, float *customEffectPtr)
{
    who = whichGuy;
    effectPtr = customEffectPtr;
    effect = 0.0;
}

EndoAffectorBlock::EndoAffectorBlock(EndoAffector *whichGuy, float customEffect)
{
    who = whichGuy;
    effectPtr = &effect;
    effect = customEffect;
}

Endogenous::Endogenous()
{
  pname = NULL;
} void Endogenous::init(void *whichState,float v,float ar,void *act)
{
  value = 0;
  typeTag = 0;
  value = v;
  autonomousRate = ar;
  valueDependentRate = 0;
  endoAffectorEffects = 0;
  affectedBy = new List;
  state = whichState;
  mn = 1.0E6;
  mx = -1.0E6;
  cv = avg = 0;
  collectStat = NO;
  clampToPositive = 1;
  if(act)
    addAffectedBy(act, (&((Activity *)act)->effect));
  ((State *)state)->addVariable(this);
} void Endogenous::updateStatistics()
{
    mn = MIN(mn, value);
    mx = MAX(mx, value);
    cv += value;
}
```

Endogenous.c++

```cpp
void Endogenous::reportStatistics(int interval)
{
    if(collectStat){
        avg = cv/(float)interval;
        if(logfile)
            fprintf(logfile, "name %s avg %f min %f max %f\n",
                pname, avg, mn, mx);
        else
            printf("name %s avg %f min %f max %f\n",
                pname, avg, mn, mx);
        mn = 1.0E6;
        mx = -1.0E6;
        avg = cv = 0;
    }
} void Endogenous::setRates(float v,float ar,float vdr)
{
  value = v;
  autonomousRate = ar;
  valueDependentRate = vdr;
  endoAffectorEffects = 0;
} void Endogenous::setAutonomousRateFromFreq(float freq)
{
  autonomousRate = MAXVALUE/(TIMESTEPSPERDAY/freq);
} int Endogenous::changeEffectGainFor(EndoAffector *who, float effect)
{
  Link *l;
  EndoAffectorBlock *eab;

for(l=affectedBy->head;l;l=l->next){
    eab = (EndoAffectorBlock *)l->object;
    if(eab->who == who){
        eab->effect = effect;
        eab->effectPtr = &effect;
        return 1;
    }
  }
  return 0;
} float Endogenous::updateStateAt(int t)
{
  Link *l;
  EndoAffectorBlock *eab;

endoAffectorEffects = 0;

for(l=affectedBy->head;l;l=l->next){
    eab = (EndoAffectorBlock *)l->object;
    eab->who->adjustEndogenousVariableUsing(this, eab->effectPtr);
  }
  value += autonomousRate - valueDependentRate*value - endoAffectorEffects;
  if(clampToPositive)
    value = MAX(value, 0.0);
  if(collectStat){
    updateStatistics();
  }
  return value;
```

Endogenous.c++

```cpp
} void Endogenous::addAffectedBy(void *act, float *effectPtr)
{
  affectedBy->add(new EndoAffectorBlock((EndoAffector *)act, effectPtr));
} void Endogenous::addAffectedBy(void *act, float effect)
{
  affectedBy->add(new EndoAffectorBlock((EndoAffector *)act, effect));
} void Endogenous::reportStateAt(int t)
{
  printf("name => { %s } type => %d value => %f\n",
         (pname)?pname :"?",tag,value);
}

Homeostasis::Homeostasis()
{
  pname = NULL;
} void Homeostasis::init(void *whichState,float v,float ar,void *act)
{
  Endogenous::init(whichState,v,ar,act);
  typeTag = 1;
}

Interest::Interest()
{
  pname = NULL;
} void Interest::init(void *whichState,float v,float ar,void *act)
{
  Endogenous::init(whichState,v,ar,act);
  typeTag = 2;
} float Interest::updateStateAt(int t)
{
  Endogenous::updateStateAt(t);
  value = MAX(value, 0);
  if(collectStat){
    updateStatistics();
  }
  return value;
} char *Endogenous::readInstance(ifstream *inFile, void *state)
{
  char *name, inBuffer[MAX_LINES];
  int tag, i;
  float values[2];

name = (char*)malloc(sizeof(char)*MAX_CHARS);

/* name, tag, initial state, autonomus rate */

(*inFile).get(inBuffer, MAX_LINES, '\n');
//  printf("inbuffer=%s",inBuffer);
  char *line = inBuffer;
```

Endogenous.c++

```
  line = GetNextWord( line, 0 );
  sscanf( line, " %s", name);
  line = GetNextWord( line, 1 );
  sscanf( line, " %d", &tag );
  for( i = 0; i < 2; ++i ) {
    line = GetNextWord( line, 1 );
    sscanf( line, " %f", &(values[i]) );
  } ifdef SLOTS
  printf("Creating EV with name %s\ntag = %d. initState = %f, AR = %f\n", name, tag, values[0], values[1]);
#endif
  init( state, values[0], values[1], NULL );
  tag = tag;
  pname = name;
  collectStat = 1;
  return(line);
}

Homeostasis *returnEV(ifstream* inFile, State *whichState, Sensor *sl)
{
  Homeostasis *ev = new Homeostasis;
  ev->readInstance( inFile, whichState );
  return( ev );
}
```

FileHandler.c++

```cpp
#include <iostream.h>
include <fstream.h>
#include <stdlib.h>
include <stdio.h>
#include <unistd.h>
#include <fcntl.h>
#include <ctype.h>
include <string.h> include "FileHandler.h"
include "Activity.h"
#include "ActivityCollection.h"
#include "Endogenous.h"
#include "State.h"
#include "../Sensor.h"

extern int showState;

// Open and reads the file and return an activity collection of all the top
// level activities ActivityCollection *collectActivities(char *filename, State *whichState, void *mc, Sensor
*sensor, ParseTable parse_table, int entries)

{
  Homeostasis *arrayEV[ MAX_EV ];
  int index;
  ActivityCollection *ac = new ActivityCollection;

/* open <filename> for input */ ifstream inFile(filename, ios::in);
  cerr << "running test \n";
    if( !inFile ) {    /* open failed */
      cerr << "cannot open file for input\n";
      exit( -1 );
    } while( !inFile.eof() ) {
    ActivityCollection *arrayAC[1000];
    Activity *arrayACT[1000];

index = readFile(parse_table, entries, &inFile, whichState, mc, sensor,
                    arrayACT, arrayAC, arrayEV);
    ac->addActivity( arrayACT[ index ]);
    ac->showState = showState;
    eatReturnSpaceTab( &inFile );
  }
  return ( ac );
} void eatReturnSpaceTab(ifstream *inFile)
{
  char ch;
  inFile->get( ch );

while ( (ch == '\n' || isspace(ch) || (ch == '/t')) &&
           !(inFile->eof() ) ) {
      inFile->get( ch );
    }
    if( !( ch  == '\n') || !isspace(ch) || !(ch == '\t') )
      inFile->putback(ch);
}
```

FileHandler.c++

```cpp
char *GetNextWord(char *str, int flag)
{
  /* eat leading whitespace */
  if( !flag )
    while(*str && (isspace(*str) || (*str == '\n') || (*str == '\t') )) str++;

if( flag ) {
    /* eat word, number or punctuation */
    while(*str && (isgraph( *str ) && ((*str != '\n') || (*str != '\t')) )) str++;

/*eat leading whitespace */
    while(*str && ( isspace(*str) || (*str == '\n') || (*str == '\t'))) str++;
  } if (*str == NULL)
    return NULL;
  else
    return str;
}

//looks through the parser table, when there is a string match it calls the
//corresponding function void *returnObject(ParseTable table, int entries, char *inputLine,  ifstream *inFile, Stat
e *whichState, Sensor *sensor)
{
  int i, length;

for( i = 0; i < entries; i++) {
    char *command = table[i].command;
    length = strlen(inputLine);

// checking for a string match if( !strncmp(command, inputLine, length) ) {
        return( (* ( table[i].func))( inFile, whichState, sensor ));
      }
  }
  printf("Error: no match found in parse table\n");
  exit( 1 );
}

// Place all the created Activities and ActivityCollection in an array
// The function returns the index in which the top level activity is in
// How this works:
//             first  it peeks at the next character in the file
//             if the character is an open parenthese, it obtain the
//             next word which is a "command". Depending on the given
//             command, it calls a function that create the apprpriate
//             object and the readFile saves the object into the appropriate
//             stack.  A close parenthese is encounter signals popping the
//             current activity or activityCollection of the stack and saving
//             it into another stack. A different function is called when
//             the parser encouters a leafactivity(see handle leaf activity)

int readFile(ParseTable parse_tab, int entries, ifstream *inFile,
              State *whichState, void *mc, Sensor *sensor,
               Activity *savedACTarray[], ActivityCollection *savedACarray[],
              Homeostasis *arrayEV[])
{
  Activity *arrayACT[1000];
  ActivityCollection *arrayAC[1000];

int EVindex = 0, ACTindex = 0, ACindex = 0, savedACindex = 0,
```

FileHandler.c++

```
      savedACTindex = 0, finalizeAnchor = 1, finalizeActivity = 0, length,
      init = 0;
  char ch, line[MAX_CHARS];

//  while( !inFile->eof() ) {
  while (ACTindex != 0 || init == 0) {
    eatReturnSpaceTab( inFile );
    ch = inFile->peek();

if( ch == '{' ) {
      inFile->get(ch);
    }
    char *inputLine;
    if( ch != '}' ) {

// obtains the command and place it in inputLine inFile->get( line , MAX_CHARS, ' ' );
//  printf("line =%s\n",line);
  inputLine = GetNextWord( line, 0 );
  if(!inputLine)
        continue;
      else {
        length = strlen( inputLine );
      }
    }
    else
      inFile->get( ch );
    if( ch == '}' ) {
      if( finalizeAnchor ) {

// popping the ActivityCollection and saving it in the saved ACarray (arrayAC[ ACindex - 1])->initInhibitionLinks();
        (arrayAC[ ACindex - 1])->showState = showState;
        savedACarray[ savedACindex++ ] = arrayAC[--ACindex];
        savedACarray[ savedACindex - 1]->showState = showState;
        finalizeAnchor = 0;
        finalizeActivity = 1;
      }
      else if( finalizeActivity ) {

// popping the current Activity and saving it in the saved ACTarray savedACTarray[ savedACTindex++ ] = arrayACT[ --ACTindex];
        printf("Popping %s\n",arrayACT[ACTindex]->pname);
        finalizeAnchor = 1;
        finalizeActivity = 0;
        printf("ACT = %i\nSACT = %i\n",ACTindex, savedACTindex);

}
      eatReturnSpaceTab( inFile );
    }
    else
      if (!strncmp( inputLine, "EndogenousVariable", length) ) {
        Homeostasis *EV = (Homeostasis *)returnObject( parse_tab, entries, inputLine, inFile, whichState, sensor );
        arrayEV[ EVindex ] = EV;
        EVindex++;
      }
      else
        if( !strncmp( inputLine, "Activity", length )) {
          Activity *ACT = (Activity *)returnObject( parse_tab, entries, inputLine, inFile, whichState, sensor );
```

FileHandler.c++

```
        if(init) {
        (arrayAC[ ACindex   - 1])->addActivity( ACT );
      }
        arrayACT[ ACTindex++] = ACT;
        printf("Pushing %s to stack\n", arrayACT[ACTindex-1]->pname);
      }
      else
        if( !strncmp( inputLine, "ActivityAnchor",length )) {
          ActivityCollection *AC = (ActivityCollection *)returnObject( parse_tab, entries, inputLine, inFile, whichState, sensor);
          arrayAC[ ACindex++ ] = AC;
          (arrayACT[ ACTindex - 1])->activityCollection =
              (ActivityCollection *) arrayAC[ ACindex - 1 ];
          init = 1;
        }
        else
          if ( !strncmp( inputLine, "Releaser", length )) {
            inFile->get( ch );
            inFile->get( line , MAX_CHARS, ' ' );
            Releaser *rel = (Releaser *)returnObject( parse_tab, entries, line, inFile, whichState, sensor);
            arrayACT[ ACTindex - 1]->addReleaser( rel );
          }
          else
            if( !strncmp( inputLine, "addEV", length )) {
              eatReturnSpaceTab( inFile );
              inFile->get( line , MAX_CHARS, '{' );
              char EVname[MAX_CHARS];
              sscanf(line, " %s", EVname);
              int index = findEV( EVname, arrayEV, EVindex);
              arrayACT[ ACTindex - 1 ]->addEndogenousVariable( arrayEV[index] );
            }
            else
              if( !strncmp( inputLine, "ReleaserAffect", length )) {
                eatReturnSpaceTab( inFile );
                inFile->get( line , MAX_CHARS, '{' );
                char EVname[MAX_CHARS];
                sscanf(line, " %s", EVname);
                float effect;
                inputLine = GetNextWord( line, 1 );
                sscanf(inputLine, " %f", &effect);
                int index = findEV( EVname, arrayEV, EVindex);
                Homeostasis *current_ev = arrayEV[index];
                Releaser *rel = (Releaser *)arrayACT[ ACTindex - 1 ]->releasers->tail->object;
                current_ev->addAffectedBy(rel,effect);
              }
              else {
                Activity *act =
                  handlePrimitiveActivity( parse_tab, inFile, inputLine, whichState, sensor, mc, arrayEV, EVindex, entries);
                arrayAC[ ACindex - 1]->addActivity( act );
                savedACTarray[ savedACTindex++ ] = act;
              }
  }
  int i;
  for (i=0; i< savedACTindex; ++i)
    printf( "%s\n", savedACTarray[i]->pname);

return(savedACTindex - 1 );
} int findEV( char *evName, Homeostasis *arrayEV[], int EVindex )
{
```

FileHandler.c++

```
  int i, length;
  length = strlen( evName );
  for( i = 0; i <= EVindex; ++i ) {
    char *name = arrayEV[i]->pname;
    if( !strncmp( evName, name, length ))
      return ( i );
  }
  printf("Error: no match found in endogenous variables.");
  exit( 2 );
} void printActivities(ActivityCollection *ac)
{
  int i;
  for(i = 0; i < ac->c; ++i) {
    printf("%s ", ac->system[i]->pname);
  }
  printf("\n");
}

Activity *handlePrimitiveActivity( ParseTable parse_tab, ifstream *inFile, char *command,
State *whichState, Sensor *sensor, void *mc, Homeostasis *arrayEV[], int EVindex, int entr
ies)
{
  //int entries = sizeof(parse_tab)/sizeof(parse_tab[0]);
   Activity *act = (Activity *)returnObject( parse_tab, entries, command,
                                      inFile, whichState, sensor);
  act->activityCollection = (void *) mc;

char ch;
  eatReturnSpaceTab( inFile );
  ch = inFile->peek();
  if( ch != '}' ) {
    inFile->get( ch );
    ch = inFile->peek();
  } while( ch == 'R' || ch == 'a') {
    char line[MAX_CHARS];
    inFile->get(line, MAX_CHARS , ' ');

if( !strncmp(line, "Releaser", 8 )) {
      inFile->get( ch );
      inFile->get( line , MAX_CHARS, ' ' );
      Releaser *rel = (Releaser *)returnObject( parse_tab, entries, line, inFile, whichSta
te, sensor);
      act->addReleaser( rel );
    }
    else {
      eatReturnSpaceTab( inFile );
      inFile->get( line , MAX_CHARS, ')' );
      char EVname[MAX_CHARS];
      sscanf(line, " %s", EVname);
      float effect;
      char *inputLine = GetNextWord( line, 1 );
      sscanf(inputLine, " %f", &effect);
      int index = findEV( EVname, arrayEV, EVindex);
      arrayEV[ index ]->addAffectedBy( act , effect);
      inFile->get(ch);
    }
    eatReturnSpaceTab( inFile );
    inFile->get( ch );
    if( ch == '{' )
```

FileHandler.c++

```
      ch = inFile->peek();
   }
   return( act );
}
```

```
Genome.c++ include "Genome.h"
include <Inventor/SbPList.h>
#include "Activity.h"
#include <string.h>

Genome::Genome(char *pn, int len)
{
    count = len;
    pname = pn;
    values = new float[count];
} void Genome::print(int all)
{
    int i=0;
    Genome *child;
    printf("%s\n", pname);
    printf("%d\n",level);
    printf("%f \n", values[0]);
    printf("%f %f %f \n", values[1],values[2], values[3] );
    for(i = 4;i<count;i++)
        printf("%f \n", values[i]);
    if(all){
        for(i=0;i<children.getLength();i++){
            child = (Genome *)children[i];
            child->print(all);
        }
    }
} void Genome::addChild(Genome *achild)
{
    children.append(achild);
} void Genome::writeToGenome(void *from)
{
    printf("Virtual Function \n");
} void Genome::readFromGenome(void *destActivity)
{
    printf("Virtual Function \n");
}

ActivityGenome::ActivityGenome(char *pn)
    : Genome(pn, 12)
{

} void Genome::initFromFile(FILE *f)
{
    int i;
    char buff[32];
    fscanf(f, "%s \n", &buff[0]);
    pname = new char[strlen(buff)+1];
    strcpy(pname, buff);
    fscanf(f, "%d \n", &level);
    fscanf(f, "%f \n", &values[0]);
    fscanf(f, "%f %f %f \n", &values[1],&values[2], &values[3] );

for(i=4;i<count;i++)
        fscanf(f, "%f \n", &values[i]);
```

Genome.c++

```
} void ActivityGenome::writeToGenome(void *fr)
{
    Activity *act = (Activity *)fr;
    int i=0, j;

/* effect */
    values[i++] = act->effect;

/* interest */
    values[i++] = act->interestRate;
    values[i++] = act->interest->autonomousRate;
    values[i++] = act->interest->valueDependentRate;

/* inhibition */
    for(j=0;j<8;j++)
        values[i++] = act->gains[j];
} void ActivityGenome::readFromGenome(void *destActivity)
{
    Activity *act = (Activity *)destActivity;
    int i=0, j;

/* effect */
    act->effect = values[i++];

/* interest */
    act->interestRate = values[i++];
    act->interest->autonomousRate = values[i++];
    act->interest->valueDependentRate = values[i++];

/* inhibition */
    for(j=0;j<8;j++)
        act->gains[j] = values[i++];
}
```

Recco.c++

```cpp
#include "Recco.h"
#include <math.h>

RecArray::RecArray(int c)
{
  int i;
  for(i=0;i<c;i++){
    recs[i].timeMade = -1;
    recs[i].value = -1;
  }
  count =32;
}

Recommendation *RecArray::getRecommendationFor(int i)
{
  return &recs[i];
} int RecArray::setRecommendation(int i,Recommendation r)
{
  if((recs[i].timeMade != r.timeMade)||
      (fabs(r.value)>= fabs(recs[i].value))){
    recs[i] = r;
    return 1;
  }
  else
    return 0;
} void Recommender::init(Activity *p)
{
  parent = p;
} void Recommender::makeRecommendationAt(int t)
{

} void AvoidRecommender::makeRecommendationAt(int t)
{

}
```

Releaser.c++

```
#include "Releaser.h"
#include <iostream.h>
include <fstream.h>
#include <string.h>
#include <stdlib.h>
include <stdio.h>
#include "Activity.h"
#include "../Sensor.h"
#include "FileHandler.h"

Releaser::Releaser()
{
  pname = NULL;
  sensor = NULL;
  minValue = 0;
  maxValue = 1e6;
} void Releaser::init(void *aSensor,float mv)
{
  pname = 0;
  value = 0;
  minValue = 0;
  maxValue = mv;
  tag = 0;
  sensor = (Sensor *)aSensor;
} void Releaser::adjustEndogenousVariableUsing(Endogenous *endo,
        float *customEffect)
{
    endo->endoAffectorEffects += (*customEffect)*value;
//    printf("Releaser-> %s adjustEndogenousVariable called %f %f %f \n",
//        pname, *customEffect, value, ((*customEffect)*value));
} void Releaser::clamp()
{
  if(value<minValue)
    value = minValue;
  else if(value>maxValue)
    value = maxValue;
} float Releaser::updateStateAt(int t)
{
  clamp();
  return value;
} void Releaser::reportStateAt(int t)
{
  printf("name => ( %s ) type => %d value => %f\n",
        (pname)?pname :"?",tag,value);
} char *Releaser::readInstance( ifstream *inFile )
{
  float maxVal;
  char inBuffer[MAX_LINES];
  eatReturnSpaceTab( inFile );
  inFile->get( inBuffer, MAX_LINES, '}' );
  sscanf( inBuffer, " %f", &maxVal );
  maxValue = maxVal;
```

Releaser.c++

```
  inFile->get();
  char *line = inBuffer;
  line = GetNextWord(line, 1);
  return(line);
}
```

State.c++

```
#include "State.h"
#include <stdlib.h>
include <stdio.h> extern FILE *logfile;

State::State()
{
  varCount = 0;
  recs = new RecArray(24);
} void State::addVariable(Endogenous *e)
{
  stateArray[varCount++] = e;
}

Endogenous *State::findVariableWithTag(int tag)
{
  int i;
  for(i=0;i<varCount;i++)
    if(stateArray[i]->tag == tag)
      return stateArray[i];
  return NULL;
} void State::updateStateAt(int t)
{
  int i;
  for(i=0;i<varCount;i++)
    stateArray[i]->updateStateAt(t);
} void State::reportStateAt(int t)
{
  int i;

if(logfile)
    fprintf(logfile, "At time %d state => \n",t);
  else
    printf("At time %d state => \n",t);
  for(i=0;i<varCount;i++)
    stateArray[i]->reportStateAt(t);
} void State::reportStatisticsAt(int t, int interval)
{
    int i;
    if(logfile)
        fprintf(logfile, "statistics at %d\n", t);
    else
        printf("statistics at %d \n", t);
    for(i=0;i<varCount;i++)
        stateArray[i]->reportStatistics(interval);
}
```

Statistics.c++

```cpp
#include "Statistics.h"
#include "../nexttypes.h"
#include "Activity.h"
#include "stdio.h"
#include "State.h"
#include "../Creature.h"

extern FILE *logfile;

void Statistics::init(Activity *theOwner)
{
    reset();
    avgLifetime = 0;
    timesActive = 0;
    owner = theOwner;
    kineticEnergy = 0;
} void Statistics::reset()
{
    min = 1.0e6;
    max = -1.0e6;
    avgThisPeriod = 0;
} void Statistics::update()
{
    if(owner){
        min = MIN(owner->directFactors, min);
        max = MAX(owner->directFactors, max);
        avgThisPeriod += owner->directFactors;
        if(owner->active){
            timesActive++;
            kineticEnergy += owner->state->creature->ke;
        }
    }
    return;
} void Statistics::updateAndPrintAt(int t, int interval)
{
    avgThisPeriod /= (float)interval;
    if(t<=interval)
        avgLifetime = avgThisPeriod;
    else
        avgLifetime = ((float)interval/(float)t)*avgThisPeriod +
            ((float)(t - interval)/(float)t)*avgLifetime;
    if(logfile)
        fprintf(logfile, "%s min: %f max: %f avg: %f cumAvg: %f percentActive: %f ke expended: %f \n",
        owner->pname,
        min,
        max,
        avgThisPeriod,
        avgLifetime,
        (float)timesActive/(float)t,
        kineticEnergy);

else
        printf("%s min: %f max: %f avg: %f cumAvg: %f percentActive: %f ke expended: %f \n",
        owner->pname,
        min,
        max,
```

Statistics.c++

```
        avgThisPeriod,
        avgLifetime,
        (float)timesActive/(float)t,
        kineticEnergy);
    reset();
}
```

```
funcs.c++ include <iostream.h>
include <fstream.h> include "../ActivityLib/Activity.h"
include "../ActivityLib/Endogenous.h"
#include "../ActivityLib/ActivityCollection.h"
#include "../ActivityLib/Releaser.h"
#include "Funcs.h"
#include "../ActivityLib/State.h"

// Template for returning an Activity

Activity *returnActivity( ifstream *inFile, State *whichState, void
                          *jm, Sensor *s1 )
{
  Activity *act = new Activity;
  act->readInstance( inFile, whichState, 0 );
  return( act );
}

Homeostasis *returnEV( ifstream* inFile, State *whichState, void *jm,
                       Sensor *s1 )
{
  Homeostasis *ev = new Homeostasis;
  ev->readInstance( inFile, whichState );
  return( ev );
}

ActivityCollection *returnAnchor( ifstream* inFile, State *whichState,
                                  void *jm, Sensor *s1)
{
  ActivityCollection *ac = new ActivityCollection;
  ac->readInstance( inFile );
  return( ac );
}
/*
//----------------------------------------------------------------------

WanderActivity *returnWanderActivity(ifstream *inFile, State *whichState,
                                     void *jm, Sensor *s1)
{
  WanderActivity *wa = new WanderActivity;
  wa->readInstance(inFile);
  return(wa);
}

AvoidActivity *returnAvoidActivity(ifstream *inFile, State *whichState,
                                   void *jm, Sensor *s1)
{
  AvoidActivity *aa = new AvoidActivity;
  aa->readInstance(inFile);
  return(aa);
}

SearchActivity *returnSearchActivity(ifstream *inFile, State *whichState,
                                     void *jm, Sensor *s1)
{
  SearchActivity *sa = new SearchActivity(s1, 0.0, 0, 0)
  sa->readInstance(inFile);
  return(sa);
}

WanderReleaser *returnWanderReleaser(ifstream *inFile, State *whichState,
                                     void *jm, Sensor *s1)
``` funcs.c++

```
{
  WanderReleaser *wr = new WanderReleaser(s1, 0.0);
  wr->readInstance(inFile);
  return(wr);
}

AvoidReleaser *returnAvoidReleaser(ifstream *inFile, State *whichState,
                                   void *jm, Sensor *s1)
{
  AvoidReleaser *ar = new AvoidReleaser(s1, 0.0);
  ar->readInstance(inFile);
  return(ar);
}

*/
```

Action.h

```
#ifndef ACT
define ACT include "../List.h"
include "Endogenous.h"

class Action{
 public:
  int active;
  int tag;
  virtual void init();
  virtual void performActionAt(int state,float value,int t);
};

#endif
```

Activity.h

```
#ifndef ACTIVITY
define ACTIVITY include "../List.h"
include "Endogenous.h"
#include "EndoAffector.h"
#include "Releaser.h"
#include "Recco.h"
include <stdio.h> define MAXINHIBITORS 8 class Activity;
class State;
class Statistics;
class Genome;
class ifstream;
class Sensors;

class Activity:public EndoAffector{
 public:
   int tag;
   char *pname;
   Activity *inhibitedBy[MAXINHIBITORS];
   int count;
   float gains[MAXINHIBITORS];
   float endogenousFactor;
   float previousValue;
   float stimulus;
   float directFactors;
   float inhibition;
   float interestRate;
   float effect;         // warning may not be used
   int   active;
   int multiplicative;
   Endogenous *interest;
   List *endogenousVariables;
   List *releasers;
   void *activityCollection;
   Activity  *consumatoryActivity;
   State *state;
   int recommender;
   Statistics *statistics;

void initActivity(void *whichState,int atag,char *aname,float fr,float e,
                     void *releaser);
   void updateAt(int t);
   void addEndogenousVariable(Endogenous *endo);
   void addReleaser(Releaser *rel);
   void setRecommender(int yn);
   void setConsumatoryActivity(Activity *act);
   virtual void dispatchActivityAt(int t);
   void setRateFromDuration(float duration);
   void sumEndogenousVariables();
   void updateAndSumReleasersAt(int t);
   void iterateAt(int t);
   void prepareForUpdateAt(int t);
   void addInhibitorAt(Activity *sub,int which);
   void setGainAt(float k,int at);
   void setUniformGain(float k);
   void calcInhibitionAt(int t);
   void calcDirectFactorsAt(int t);
   void calcValueAt(int t);
   float inhibitionFor(int guy);
```

Activity.h

```
    virtual void adjustEndogenousVariableUsing(Endogenous *e, float *whichEffect);
    void reportStateAt(int t);
    virtual void setActive(int yn);
    virtual void makeRecommendationAt(int t);
    virtual Genome *writeToGenome(int level);
    virtual void readFromGenome(void *g);
    virtual Genome *readGenomeFromFile(FILE *tn);

/* this is virtual, but override at your own risk !!!!! */
    virtual char* readInstance(ifstream *inFile, void *state, int flag);

/* override this to read in additional data for an activity */
    virtual void customInitialization(char *line, void *state, int activityNum, char *name,
       float v1, float v2);
};

Activity *returnActivity( ifstream *inFile, State *whichState, Sensor *s1 );

#endif
```

ActivityCollection.h

```
#ifndef ACTIVITYMODULE
#define ACTIVITYMODULE
#define MAXACTIVITY 8
#include "Activity.h"

class ifstream;
class Sensor;
class State;

class ActivityCollection {
 public:
  Activity *system[MAXACTIVITY];
  int c;
  int showState;
  int activeActivity;
  ActivityCollection();
  void initInhibitionLinks();
  Activity *addActivity(Activity *act);
  int setActiveAt(int t);
  void ps(int t);
  void jiggle(int t);
  void iterateToEquilibrium(int t,int count);
  void checkSwitch(int newActivity,int nt,int show);
  void ActivityCollection::printStatisticsAt(int t, int interval);
  void stepAt(int t);
  void clearActive();
  Activity *getActiveActivity();
  Genome *writeToGenome(Genome *genome, int level);
  Genome *readGenomeFromFile(Genome *genome, FILE *fn);
  void *readFromGenome(Genome *genome);
  void getMutualInhibition(int act1, int act2, float *i1, float *i2);
  virtual void readInstance(ifstream *inFile);
};

ActivityCollection *returnAnchor(ifstream* inFile, State *whichState,Sensor *s1);
#endif
```

ActivityLib.h

```
#ifndef ACTIVITYLIB
define ACTIVITYLIB include "ActivityLib/State.h"
include "ActivityLib/Activity.h"
#include "ActivityLib/ActivityCollection.h"
#include "ActivityLib/Endogenous.h"
#include "ActivityLib/Recco.h"
#include "ActivityLib/Statistics.h"
#include "ActivityLib/Releaser.h"

#endif
```

EndoAffector.h

```
#ifndef ENDOAFFECTOR
define ENDOAFFECTOR class Endogenous;

class EndoAffector {
    public:
    float value;
    virtual void adjustEndogenousVariableUsing(Endogenous *e,
        float *customEffect);
};

#endif
```

Endogenous.h

```
#ifndef ENDO
define ENDO include "../List.h"
define TEST
class EndoAffector;
class ifstream;
class State;
class Sensor;

/* this is an internal class used by Endogenous */ class EndoAffectorBlock {
    public:
    EndoAffector *who; // may be a releaser or an activity
    float *effectPtr; // points to the effect gain to use
    float effect; // used if effect gain is passed by value // This constructor is used if an effect gain is passed by reference
    EndoAffectorBlock(EndoAffector *whichGuy, float *customEffectPtr);

// This constructor is used if an effect gain is passed by value
    EndoAffectorBlock(EndoAffector *whichGuy, float customEffect);

};

class Endogenous {
 public:
  int typeTag;
  int tag;
  void *state;
  char *pname;
  float value;
  float autonomousRate;
  float valueDependentRate;
  float endoAffectorEffects;
  float mn, mx, avg, cv;
  int clampToPositive;
  int collectStat;
  List *affectedBy;
  changeEffectGainFor(EndoAffector *who, float effect);
  Endogenous();
  virtual void init(void *whichState,float v,float ar,void *act);

// autonomous rate can be negative or positive,
  // valuedr can be negative (acts as accelerator) or positive (acts as damper)
  void setRates(float val,float autor,float valuedr);

void setAutonomousRateFromFreq(float freq);

// call this if specifying effect gain by reference
  void addAffectedBy(void *act, float *effect);

// call this is specifying effect gain by value
  void addAffectedBy(void *act, float effect);

virtual float updateStateAt(int t);
  void reportStateAt(int t);
  void updateStatistics();
  void reportStatistics(int interval);
  virtual char *readInstance(ifstream *inFile, void *state);
};

class Interest:public Endogenous{
```

Endogenous.h

```
 public:
   Interest();
   void init(void *whichState,float v,float ar,void *act);
   float updateStateAt(int t);
};

class Homeostasis:public Endogenous {
   public:
   Homeostasis();
   void init(void *whichState,float v,float ar,void *act);
};

Homeostasis *returnEV( ifstream* inFile, State *whichState,sensor *s) ;

#endif
```

FileHandler.h

```
#ifndef __PARSER_H__
define __PARSER_H__ define MAX_LINES 2048
define MAX_CHARS 80
define MAX_EV 50 class Activity;
class Homeostasis;
class State;
class ActivityCollection;
class ifstream;
class Sensor;

typedef void *(*CommandCallback)(ifstream *file, State *whichState,Sensor *sensor);

typedef struct {
  char *command;
  CommandCallback func;
} CommandEntry;

typedef CommandEntry *ParseTable;
void *returnObject(ParseTable table, int entries, ifstream *inFile,
            State *whichState, Sensor *sensor);
char *GetNextWord(char *str, int flag);
int readFile(ParseTable parse_table, int entries, ifstream *inFile,
            State *whichState, void *mc, Sensor *sensor, Activity *arrayACT[],
            ActivityCollection *arrayAC[], Homeostasis *arrayEV[]);

int findEV( char *evName, Homeostasis *arrayEV[], int EVindex );
void eatReturnSpaceTab(ifstream* inFile);
void printActivities(ActivityCollection *ac);
ActivityCollection *collectActivities(char *filename, State *whichState,
                                      void *mc, Sensor *sensor, ParseTable
                                      parse_tab, int entries);
Activity *handlePrimitiveActivity( ParseTable parse_tab, ifstream *inFile, char *command,
State *whichState, Sensor *s1, void *mc, Homeostasis *arrayEV[], int EVindex, int entries)
;

#endif // __PARSER_H__
```

Genome.h

```
/*
 * Genome data structure for Hamsterdam
 */ ifndef GENOME define GENOME include <Inventor/SbPList.h>
include <stdio.h> class Genome {
    public:
    char *pname;
    int count;
    int level;
    float *values;
    SbPList children;
    Genome(char *pn,  int len);
    virtual void writeToGenome(void *from);
    virtual void readFromGenome(void *destActivity);
    virtual void initFromFile(FILE *f);
    void addChild(Genome *achild);
    void print(int all);
};

class ActivityGenome : public Genome {
    public:
    ActivityGenome(char *pn);
    virtual void writeToGenome(void *from);
    virtual void readFromGenome(void *destActivity);

};

#endif
```

Recco.h

```
#ifndef RECCO
define RECCO class Activity;

class Recommendation{
 public:
  int intensity;
  float value;
  int timeMade;
};

class RecArray{
 public:
  int count;
  Recommendation recs[32];
  RecArray(int c);
  Recommendation *getRecommendationFor(int i);
  int setRecommendation(int i,Recommendation r);
};

class Recommender {
 public:
 Activity *parent;
 virtual void init(Activity *p);
 virtual void makeRecommendationAt(int t);
};

class AvoidRecommender : public Recommender {
    void makeRecommendationAt(int t);
};

#endif
```

Releaser.h

```
#ifndef RELEASER
#define RELEASER
#include "EndoAffector.h"

class Sensor;
class ifstream;

class Releaser: public EndoAffector {
 public:
   int tag;
   char *pname;
   float minValue;
   float maxValue;
   Sensor  *sensor;
   Releaser();
   virtual void init(void *aSensor,float mv);
   virtual float updateStateAt(int t);
   void reportStateAt(int t);
   void clamp();
   virtual void adjustEndogenousVariableUsing(Endogenous *e, float *customEffect);
   virtual char* readInstance( ifstream *inFile );
};

#endif
```

State.h

```
#ifndef STATE
#define STATE
#include "Endogenous.h"
#include "Recco.h"

#define ENERGYTAG -1
#define WATERTAG  -2
#define CLEANINGTAG -3
#define SLEEPINGTAG -4
#define FORAGINGTAG -5
define ANTIPREDTAG -6 class Creature;

class State {
 public:
   Endogenous *stateArray[128];
   int varCount;
   RecArray *recs;
   Creature *creature;
   State();
   void addVariable(Endogenous *e);
   Endogenous *findVariableWithTag(int tag);
   void updateStateAt(int t);
   void reportStateAt(int t);
   void reportStatisticsAt(int t, int interval);
};

#endif
```

Statistics.h

```
#ifndef STATS
define STATS class Activity;

class Statistics {
    public:
    float min;
    float max;
    float avgLifetime;
    float avgThisPeriod;
    int timesActive;
    float kineticEnergy;
    Activity *owner;
    void init(Activity *theOwner);
    void reset();
    void update();
    void updateAndPrintAt(int t,int interval);
};

#endif
```

PrimitiveActivity.c++

```c++
#include "PrimitiveActivity.h"
#include "TemporalReleasers.h"
#include "MotorController.h"
#include "JointMotor.h"
#include "SpatialLib.h"
#include "nexttypes.h"
#include "MiscReleasers.h"
#include "Tree.h"
#include "Statistics.h"
#include "Hamster.h"
#include "CarryTool.h"
#include "Recco.h"
#include "Brio.h"

int traceActions = 0;

Genome *PrimitiveActivity::writeToGenome(int level)
{
    Genome *ag = new ActivityGenome(pname);
    ag->level = level;
    ag->writeToGenome(this);

return ag;
} void PrimitiveActivity::readFromGenome(void *g)
{
    ActivityGenome *ag = (ActivityGenome *)g;

ag->readFromGenome(this);

return;
} void PrimitiveActivity::dispatchActivityAt(int t)
{
  if(active){
    intensity = 1;
    nextAction = DONTCARE;
    if(Brio::traceActions && (Brio::creatureToTrace == state->creature))
        printf("%s active at %d\n", pname, t);
    determineActionAt(t);
    if(nextAction != DONTCARE){
      makeBid(nextAction,intensity);
    }
  }
} void PrimitiveActivity::makeBid(int na, float strength)
{
   actionBid *nb = ((MotorController *)activityCollection)->getNextBid();

nb->action = na;
   nb->bid = value;
   nb->intensity = strength;
   nb->who = this;
   if(Brio::traceActions && (Brio::creatureToTrace == state->creature))
        printf("action -> %d intensity -> %f \n", na, strength);
} int PrimitiveActivity::readyToMove(void *pp,int getReady)
{
   int omm = 1;
```

PrimitiveActivity.c++

```
  Creature *p = (Creature *)pp;

if(p->jointMotors[NECK].theta < p->jointMotors[NECK].fullRightOrUp){
    if(getReady)
       makeBid(HEADUP,1);
    omm = 1;
  }
  if(fabs(p->jointMotors[ROLL].theta)>1e-4){
    if(getReady)
      makeBid(ROLLCENTER,.10);
    omm = 0;
  }
  if(fabs(p->jointMotors[PITCH].theta)>1e-4){
    if(getReady)
      makeBid(PITCHCENTER,.10);
    omm = 0;
  }
  if(fabs(p->jointMotors[HEAD].theta)>1e-4){
    if(getReady)
      makeBid(HEADCENTER,.10);
    omm = 1;
  }
  if(p->tag==100){
    if(fabs(p->jointMotors[TAIL].theta)>1e-4){
      if(getReady)
        makeBid((p->jointMotors[TAIL].theta<0)?TAILRGT : TAILLFT,1);
    }
  }
  return omm;
} void PrimitiveActivity::dropFoodIfAny(Creature *p)
{
    if(p->tag == 100){
        Hamster *h = (Hamster *)p;
        if(h->mouth->carryingSomething())
          makeBid(PUTDOWN, 1);
    }
} int PrimitiveActivity::checkDetour(Sensor *s, float threshold, float b,  int t)
{
    Recommendation *r = state->recs->getRecommendationFor(nextAction);
    Recommendation *r1;
    int proposedAction;

if(r->timeMade == t /* && randOverThreshold(.1) */
          && r->value< -threshold){
/*
        printf("avoid recommending against %d with  %f \n",
             nextAction, r->value);
*/
        /* make a proposal */
        if(nextAction == RGT){
           proposedAction =  GOSTRAIGHT;
        }
        else if(nextAction == LFT){
           proposedAction = GOSTRAIGHT;
        }
        else if(nextAction == GOSTRAIGHT){
           if((s->bearing<1.5714)&&(s->bearing>-1.5714))
              proposedAction = LFT;
           else
              proposedAction = RGT;
```

PrimitiveActivity.c++

```
    }
    /* check to see if proposal is better or worse than
     * original choice
     */
    r1 = state->recs->getRecommendationFor(proposedAction);
    if(r1->timeMade != t)
       /* proposed action is safe */
       nextAction = proposedAction;
    else {
        /* proposed action is also recommended against
         * check if small enough to ignore
         */
        if((r1->value < r->value)&&(r1->value > -10))
           nextAction = proposedAction;
        else {
            /* proposed action, worse than original */
            if((nextAction ==LFT || nextAction == RGT) &&
               proposedAction == GOSTRAIGHT){
               /*
                * initial action was a turn,proposal was gs,
                * pick opposite turn
                */
               nextAction = (nextAction == LFT)?RGT:LFT;
            }
            else {
               /* initial action was gs, proposal was a turn,
                * pick opposite turn
                */
               nextAction = (proposedAction == LFT)?RGT:LFT;
            }
        }
      }
      intensity = 1;
      return nextAction;
    }
    return 0;
} void PrimitiveActivity::determineActionAt(int t)
{
   nextAction = 6;
} void PrimitiveActivity::setActive(int yn)
{
   if(yn){
      active++;
   }
   else
      active = yn;
   if(statistics)
      statistics->update();
} void WanderActivity::initWander(void *whichState,int atag,char *aname,
                                float fr,float e,void *rel)
{
   initActivity(whichState,atag,aname,fr,e,rel);
   changeActionCounter = 0;
   randomAction = 0;
} void WanderActivity::determineActionAt(int t)
{
```

PrimitiveActivity.c++

```
    Sensor *s = (Sensor *)((Releaser *)(releasers->head->object))->sensor;
    Creature *p = (Creature *)s->parent;
    if(readyToMove(p, 1)){
       if((!changeActionCounter++ % 30))
          randomAction = randIntInInterval(0,5);
       if(randomAction== 0)
          nextAction = RGT;
       else if(randomAction == 1)
          nextAction = LFT;
       else
          nextAction = GOSTRAIGHT;

moveTowardOpen(t);

if(s->range<randFloatInInterval(2.0, 2.75))
          checkDetour(s, 0, M_PI/2.0,  t);
       }

}
}
/*
 * logic behind moveTowardOpen.
 * The purpose of this guy is to keep you aligned to the closest object if
 * there is one within 6 units,  and to exploit any openings that it finds
 * to go through the opening. The essence of the algorithm is to treat ray[0]
 * as the base of a right triangle,  and ray[2] as the hypotenuse (assuming
 * closest guy is on the right side,  otherwise it uses the leftmost ray and
 * 2 away from it). If the guy is aligned to object,then the range[0]/range[2]
 * should equal the cos of (bearing[2]-bearing[0]). If it is less than cos,
 * you are pointing away from the wall,  so you need to turn right. Otherwise,
 * you are pointing toward the wall and need to turn left.
 */ int WanderActivity::moveTowardOpen(int t)
{
  float ccos=-1.0,cbear;
  Sensor *s = (Sensor *)((Releaser *)(releasers->head->object))->sensor;
  int whichSide = -1;
  float r1, r2;

if(s->range<3.0){
       if((s->rayTargets[0].range<s->maxRange)||
           (s->rayTargets[s->rayCount-1].range <=s->maxRange)){
          cbear =  cos(s->rayTargets[2].bearing - s->rayTargets[0].bearing);
          if(s->rayTargets[0].range < s->rayTargets[s->rayCount-1].range){
              r1 =  s->rayTargets[0].range;
              r2 = s->rayTargets[2].range;
              ccos = r1/r2;
              whichSide = 0;
              nextAction = (ccos > cbear)?LFT :RGT;
          }
          else {
              whichSide = 1;
              r1 = s->rayTargets[s->rayCount-1].range;
              r2 = s->rayTargets[s->rayCount-3].range;
              ccos=r1/r2;
              nextAction =(ccos > cbear)? RGT: LFT;
          }
          int closestCorner;
          float rangeToCorner;
          closestCorner = s->mapCorner(rangeToCorner);
          if(closestCorner && (rangeToCorner<2)){
            // nextAction =(closestCorner<7)?RGT:LFT;
```

PrimitiveActivity.c++

```
            nextAction =(closestCorner<7)?LFT:RGT;
//          printf("moving out of corner \n");
        }
        else if((ccos >.90)&&(ccos<1.10)){
            nextAction = GOSTRAIGHT;
            SbLine cl(SbVec3f(r1, 0, 0), SbVec3f(cbear*r2, sqrt(1-cbear*cbear)*r2, 0));
            SbVec3f dir = cl.getDirection();
            float dn = dir.normalize();
            float corr = acos(dir.dot(SbVec3f(0, 1,0)));
            corr = (whichSide)?((Creature *)s->parent)->theta+corr*57.3:
                ((Creature *)s->parent)->theta-corr*57.3;
            //printf("%f \n", corr);

}
        else if (ccos<.3){
            ((MotorController *)activityCollection)->doActionAt(7,.5,t);

}
      }
   }
   return nextAction;
} void AvoidActivity::initAvoid(void *whichState,int atag,char *aname,
                              float fr,float e,void *rel,void *joint)
{
  initActivity(whichState,atag,aname,fr,e,rel);
  lastTimeCalled = 0;
  lastAction = 6;
  jm = joint;
}

/*
 * Weight is used by the density calculations. Basically,  delta between
 * the range along ray i and some minimum min is used to form a weight. The
 * value is clamped by the (max range of the sensor * bias) on 1 end and .001 on
 * the other end. The resulting weight is the max range of the sensor/value
 * squared. The bias is used to bias the results toward cases where there
 * is an empty ray.
 */
float AvoidActivity::weight(int i,float min, float bias)
{

Sensor *sensor = (Sensor *)((Releaser *)(releasers->head->object))->sensor;
  float smr = ((Sensor *)sensor)->maxRange;
  float weight;

weight = MIN(((Sensor *)sensor)->rayTargets[i].range-min,smr*bias);
  weight = MAX(weight,.001);
  return smr/(weight*weight);
}

/*
 * calcDensity is used to determine the "density" surrounding the
 * sensor,  where closer objects result in higher density. The sensor field
 * is split into 3 subfields and the average density in each is
 * determined.
 */ void AvoidActivity::calcDensity(Sensor *sensor, int side, float *d)
{
   int i;
   float smr = sensor->maxRange;
```

PrimitiveActivity.c++

```
  d[0] = d[1] = d[2] = 0;

for(i=0;i<side;i++)
      d[0] += weight(i,.5, 1);
    d[0] /= (float)side;

for(i=side;i<sensor->rayCount-side;i++)
      d[1] += weight(i,.5, 1);
    d[1] /= (float)(sensor->rayCount - 2*side);

for(i=sensor->rayCount-side;i<sensor->rayCount;i++)
      d[2] += weight(i,.5, 1);
    d[2] /=(float)side;

} void AvoidActivity::determineActionAt(int t)
{
  int i;
  Sensor *sensor = (Sensor *)((Releaser *)(releasers->head->object))->sensor;
  float smr = ((Sensor *)sensor)->maxRange;
  float d[3];
  Spv vel;
  Creature *p = (Creature *)((Sensor *)sensor)->parent;
  int isInCorner = sensor->isInCorner();
  static int lastInCorner = -10;
  static int lastCornerAction;

if(readyToMove(p,1))
  { if(isInCorner ||(t-lastInCorner <4)){
        //printf("is in corner %d \n", isInCorner);
        ((MotorController *)activityCollection)->doActionAt(7,.5,t);

if((t-lastInCorner <4))
            nextAction = lastCornerAction;
        else {
            nextAction = (isInCorner<7)?LFT:RGT;
            lastInCorner = t;
            lastCornerAction = nextAction;
        }
    }
/*
    if(isInCorner ){
        printf("is in corner %d \n", isInCorner);
        ((MotorController *)activityCollection)->doActionAt(7,.5,t);

nextAction = (isInCorner<7)?LFT:RGT;
    }
*/
    else {
        calcDensity(sensor, 6, &d[0]);

if((d[1]<d[0])&&(d[1]<d[2]))
          nextAction = GOSTRAIGHT;
        else {
          if((d[2]<d[0]))
            nextAction = LFT;
          else
            nextAction = RGT;
        }
```

PrimitiveActivity.c++

```c++
        if((nextAction == RGT)||(nextAction == LFT)){
        if((t-lastTimeCalled == 1)&&((lastAction == RGT)||
                                     (lastAction == LFT))
                                 && (MIN(d[2], d[0])>3))
            nextAction = lastAction;

float minD;
        if(nextAction == RGT)
           minD = sensor->getClosestRangeBetween(0, sensor->rayCount-6);
        else
           minD = sensor->getClosestRangeBetween(6, sensor->rayCount);
        if(minD > 2.2)
           ((MotorController *)activityCollection)->doActionAt(0,1,t);
        else if(d[1]>3)
           ((MotorController *)activityCollection)->doActionAt(7,1.5,t);
        if((nextAction == RGT)&&(d[0]<2))
           intensity = 1.2;
        else if((nextAction == LFT)&&(d[2]<2))
           intensity = 1.2;
      }
      else{
        p->getVelocity(vel);
        if(vel.v0[2]>.50)
            ((MotorController *)activityCollection)->doActionAt(7,1,t);
      }
   } lastAction = nextAction;
   }
   lastTimeCalled = t;
   return;
} void AvoidActivity::makeRecommendationAt(int t)
{
  int i,na, lowest;
  Sensor *sensor = (Sensor *)((Releaser *)(releasers->head->object))->sensor;
  float smr = ((Sensor *)sensor)->maxRange;
  float d[3];
  Spv vel;
  Creature *p = (Creature *)((Sensor *)sensor)->parent;
  d[0] = d[1] = d[2] = 0.0;
  int isInCorner = (sensor->isInCorner() && sensor->closestCornerDistance<1.5);

if(readyToMove(p,1))
  {
     calcDensity(sensor, 6, &d[0]);

if(isInCorner){
         if(isInCorner<7)
             lowest = 2;
         else
             lowest = 0;
     }
     else{
     /* find lowest (best direction ) */
     if(d[0]<=d[1] && d[0]<=d[2])
         lowest = 0;
     else if(d[1]<=d[2] && d[1]<=d[0])
         lowest = 1;
     else
        lowest = 2;
     }
     /* make recommendations against going in other 2 directions */
```

PrimitiveActivity.c++

```
   Recommendation r;
   for(i=0;i<3;i++){
       if(i!= lowest){
           r.value = -d[i];
           r.intensity = (int)intensity;
           r.timeMade = t;
           switch(i){
               case 0:na = RGT;break;
               case 1:na = GOSTRAIGHT; break;
               case 2:na = LFT;break;
           }
           state->recs->setRecommendation(na,r);
       }
    }
  }
  return;
} void PreenActivity::initPreenActivity(void *whichState,int atag,
                                char *aname,float fr,float e,
                                void *rel,void *joint)
{
  initActivity(whichState,atag,aname,fr,e,rel);
  jm = joint;
  visitedBoth = 0;
} void PrepPreen::initPrepPreen(void *whichState,int atag,
                                char *aname,float fr,float e,
                                void *rel,void *joint)
{
  initActivity(whichState,atag,aname,fr,e,rel);
  jm = joint;
} void PrepPreen::determineActionAt(int t)
{
  dropFoodIfAny(((JointMotor *)jm)->parent);
  makeBid(STOP,1);
  makeBid(ROLLCENTER,.1);
} void PreenActivity::determineActionAt(int t)
{
  JointMotor *jmm = (JointMotor *)jm;
  Creature *p = (Creature *)jmm->parent;

makeBid(STOP,1);
  if(active){
    jmm[NECK].fullLeftOrDown = -1.20;
    makeBid(PITCHUP,1);
    makeBid(HEADDWN,1);
    if(active == 1)
      nextAction = HEADLFT;
    else if(jmm[HEAD].theta == jmm[HEAD].fullLeftOrDown)
      nextAction = HEADRGT;
    else if(jmm[HEAD].theta == jmm[HEAD].fullRightOrUp)
      nextAction = HEADLFT;
    else nextAction = (jmm[HEAD].prevValue<0)?HEADLFT:HEADRGT;
  }
  else {
    makeBid(PITCHDWN,.75);
    makeBid(HEADUP,.75);
    nextAction = HEADCENTER;
```

PrimitiveActivity.c++

```
    jmm[NECK].fullLeftOrDown = -1.2;
  }
  intensity = .75;
} void AntiPredatorActivity::initAntiPredator(void *whichState,int atag,
                                            char *aname,float fr,float e,
                                            void *rel,void *joint)
{
  initActivity(whichState,atag,aname,fr,e,rel);
  jm = joint;
  visitedBoth = 0;
} void AntiPredatorActivity::determineActionAt(int t)
{
  JointMotor *jmm = (JointMotor *)jm;

makeBid(STOP,1);
  makeBid(PITCHDWN,1);
  if(jmm[PITCH].theta>.01)
    makeBid(HEADDWN,1);
  else
    makeBid(HEADUP,1);
  if(active == 1){
    lastAction = nextAction = HEADLFT;
    visitedBoth = 0;
  }
  if((jmm[HEAD].theta == jmm[HEAD].fullRightOrUp)||
     (jmm[HEAD].theta == jmm[HEAD].fullLeftOrDown)){
    nextAction = (jmm[HEAD].theta == jmm[HEAD].fullLeftOrDown)?HEADRGT:HEADLFT;
    visitedBoth++;
  }
  else if(visitedBoth>1 && (fabs(jmm[HEAD].theta)<.15)){
    nextAction = HEADCENTER;
  }
  else
    nextAction = lastAction;
  lastAction = nextAction;
  //printf("tag -> %d time -> %d \n", state->creature->tag, t);
} void ProbeActivity::initProbe(void *whichState,int atag,char *aname,
                              float fr,float e,void *rel,void *joint)
{
  initActivity(whichState,atag,aname,fr,e,rel);
  jm = joint;
  feedingNeckAngle = -1.57;
  feedingBodyAngle = 0.0;
} void ProbeActivity::determineActionAt(int t)
{
  Sensor *sensor = (Sensor *)((Releaser *)(releasers->head->object))->sensor;
  Spv vel;
  Creature *p = (Creature *)sensor->parent;
  JointMotor *jmm = &p->jointMotors[PITCH];
  JointMotor *jm = &p->jointMotors[NECK];
  int typeTag = ((ProbeReleaser *)(releasers->head->object))->typeTag;
  targetInfo *food = sensor->getBestTargetWithTag(typeTag);

/* specific check for person */
  if(!food)
```

PrimitiveActivity.c++

```
    food = sensor->getBestTargetWithTag(900);

sensor->focusOfAttention = food->who;
  sensor->focusPt = food->rayPoint;

dropFoodIfAny(p);
  if(jm->theta>=feedingNeckAngle)
    jm->fullLeftOrDown = feedingNeckAngle;
  jmm->fullLeftOrDown = feedingBodyAngle;
  if(fabs(jmm->theta) >1e-4)
    makeBid(PITCHDWN,.5);
  makeBid(HEADCENTER,.5);

p->getVelocity(vel);
  if(((vel.v0[2])>.4)||(fabs(vel.v[1])>.2)){
    nextAction = STOP;
    intensity = 1.0;
  }
  else{
      if((food->range<.05)){
        nextAction = REV;
        intensity = .4;
      }
      else if(food->range>.2){
        //targetInfo *target = sensor->getClosestTarget();
        moveTowardPtInWorld(&food->who->bXa.r, sensor, p);
        intensity = .4;
      }
      else{
        nextAction = STOP;
        intensity = 1.0;
      }
  }
  if((sensor->range<.60)&& (jmm->theta<1e-4)&&
     ((JointMotor *)jm)->theta >feedingNeckAngle)
    makeBid(HEADDWN,1);
  else
    makeBid(HEADUP,1);

} void ChewActivity::determineActionAt(int t)
{
  Sensor *sensor = (Sensor *)((Releaser *)(releasers->head->object))->sensor;
  targetInfo *food = sensor->getClosestTarget();
  Creature *p = (Creature *)sensor->parent;
  JointMotor *jmm  = &p->jointMotors[0];

// printf("CHEW...CHEW...CHEW %f %d\n",sensor->range,food->who->tag);
  if((food->who->tag == 300)||(food->who->tag==200)||
     (food->who->tag == 100)){
    ((Food *)food->who)->consumedAt(effect*value,t);
  }
  makeBid(STOP, 1);
  if(p->tag == 100){
    if(active == 1)
      makeBid(TAILLFT,1);
    else if(jmm[TAIL].theta == jmm[TAIL].fullLeftOrDown)
      makeBid(TAILRGT,1);
    else if(jmm[TAIL].theta == jmm[TAIL].fullRightOrUp)
      makeBid(TAILLFT,1);
    else makeBid(((jmm[TAIL].prevValue<0)?TAILLFT:TAILRGT),1);
  }
  intensity = 1;
```

PrimitiveActivity.c++

```cpp
} void PickupActivity::determineActionAt(int t)
{
    Sensor *sensor = (Sensor *)((Releaser *)(releasers->head->object))->sensor;
    targetInfo *food = sensor->getClosestTarget();
    Creature *p = (Creature *)sensor->parent;

sensor->focusOfAttention = food->who;
    sensor->focusPt = food->rayPoint;

/* pick up the food */
    Hamster *pp = (Hamster *)p;
    makeBid(PICKUP, 1);
    intensity = 1;

nextAction = STOP;
} void PutdownActivity::determineActionAt(int t)
{
    Sensor *sensor = (Sensor *)((Releaser *)(releasers->head->object))->sensor;
    targetInfo *food = sensor->getClosestTarget();
    Creature *p = (Creature *)sensor->parent;
    JointMotor *jmm = &p->jointMotors[0];

Hamster *pp = (Hamster *)p;
    if(pp->mouth->carryingSomething()){
        makeBid(PUTDOWN, 1);
        intensity = 1;
        nextAction = REV;
    }
} void SearchActivity::moveTowardPtInWorld(SbVec3f *pt, Sensor *s, Creature *p)
{
  SbVec3f f1;
  Spv vel;
  p->getVelocity(vel);
  f1 = *pt;

p->vecToBody(&f1);
  s->bXa.multVec(&f1);
  range = sqrt(f1[0]*f1[0]+f1[2]*f1[2]);
  f1[0] /= range;
  f1[2] /= range;
  bearing = atan2(f1[2],-f1[0]);
  /*
  if(range<1 && (bearing<0))
    nextAction = REV;
  else
  */
  if((bearing<1.4)&&(bearing>-1.5714))
    nextAction = RGT;
  else if((bearing>1.7)||(bearing< -1.5714))
    nextAction = LFT;
  else
    nextAction = GOSTRAIGHT;
  if(range<.2 || range<3 && (fabs(vel.v0[2])>.2 || fabs(vel.v[1])>.2))
    nextAction = STOP;
  return;
}
```

PrimitiveActivity.c++

```cpp
void SearchActivity::orientTowardPtInWorld(SbVec3f *pt, Sensor *s, Creature *p)
{
  SbVec3f f1;
  Spv vel;

f1 = *pt;

p->vecToBody(&f1);
  s->bXa.multVec(&f1);
  range = sqrt(f1[0]*f1[0]+f1[2]*f1[2]);
  f1[0] /= range;
  f1[2] /= range;
  bearing = atan2(f1[2],-f1[0]);

if((bearing<1.4)&&(bearing>-1.5714))
     nextAction = RGT;
  else if((bearing>1.7)||(bearing< -1.5714))
     nextAction = LFT;
  else
     nextAction = STOP;
  return;
} void SearchActivity::determineActionAt(int t)
{
  Sensor *sensor = (Sensor *)((Releaser *)(releasers->head->object))->sensor;
  Creature *p = (Creature *)sensor->parent;
  int typeTag = ((SearchReleaser *)releasers->head->object)->typeTag;
  targetInfo *target = sensor->getBestTargetWithTag(typeTag);
  Spv vel;

if(!target && typeTag == 300)
     target = sensor->getBestTargetWithTag(900);

if(target){
     sensor->focusOfAttention = target->who;
     sensor->focusPt = target->rayPoint;
  }
  if(!readyToMove(p,1))
     return;

if(target){
     moveTowardPtInWorld(&target->who->bXa.r, sensor, p);

if((!(sensor->getClosestTarget() == target))&&
         sensor->range<=randFloatInInterval(2.0, 2.75)){
        checkDetour(sensor,0, bearing,  t);
     }
  }
  else
     nextAction = STOP;
} int FindOpeningActivity::locateOpening(int outside)
{
  int i,st=-1,et=-1;
  int opening = -1;
  Sensor *sensor = (Sensor *)((Releaser *)(releasers->head->object))->sensor;

for(i=0;i<sensor->rayCount;i++){
    if(sensor->rayTargets[i].color == !outside){
      if(st<0)
        st = i;
```

PrimitiveActivity.c++

```c++
    }
    else if((st> -1)&& (et<0))
       et = i;
  }
  if((st>-1)&& (et<0))
     et = sensor->rayCount-1;

opening  = (st+et)/2;

return (opening>-1)?opening:-1;
} void FindOpeningActivity::determineActionAt(int t)
{
    Sensor *sensor = (Sensor *)((Releaser *)(releasers->head->object))->sensor;
    FindOpeningReleaser *fr = (FindOpeningReleaser *)releasers->head->object;
    Creature *p = (Creature *)sensor->parent;
    int opening;
    int ang = 5;

if(!readyToMove(p, 1))
        return;

opening = fr->where;
    if(opening < ang)
        nextAction = RGT;
    else if(opening >sensor->rayCount-1-ang)
        nextAction = LFT;
    else
        nextAction = GOSTRAIGHT;

if(sensor->range<randFloatInInterval(2.0, 2.75)){
        checkDetour(sensor,0,M_PI/2.0, t);
    }
    if(nextAction == RGT || nextAction == LFT){
        ((MotorController *)activityCollection)->doActionAt(7,.2,t);
        intensity *= 2;
    }
} void GoHomeActivity::setActive(int yn)
{
/*
  MotorController *mc = (MotorController *)activityCollection;
  Creature *p = (Creature *)mc->parent;

if(p->tag == 100)
    mc->setMaxSpeed((yn)?8.0:4.0);
    */
    PrimitiveActivity::setActive(yn);
} void GoHomeActivity::determineActionAt(int t)
{
  Sensor *sensor = (Sensor *)((Releaser *)(releasers->head->object))->sensor;
  Creature *p = (Creature *)sensor->parent;
  SbVec3f f1,f2;
  Spv vel;

if(!readyToMove(p, 1))
     return;

p->getEntrance(&f1);
```

PrimitiveActivity.c++

```
  moveTowardPtInWorld(&f1, sensor, p);

if(sensor->range<randFloatInInterval(2.0, 2.75)){
    checkDetour(sensor, 0, bearing, t);
  }
  else if(nextAction == GOSTRAIGHT)
    intensity *= 1.5;
} void GoNestActivity::determineActionAt(int t)
{
  Sensor *sensor = (Sensor *)((Releaser *)(releasers->head->object))->sensor;
  Creature *p = (Creature *)sensor->parent;
  SbVec3f f1,f2;
  Spv vel;

if(!readyToMove(p, 1))
    return;

p->getEntrance(&f1);

f2 = (p->homeRect[1]+p->homeRect[0])*.5;
  f2[0] += -3.5;
  f1 = f2;

moveTowardPtInWorld(&f1, sensor, p);

if((sensor->range)<randFloatInInterval(2.0, 2.75)){
    checkDetour(sensor,0, bearing, t);
  }
  else
    intensity *= 1.5;
} void GoHoardActivity::determineActionAt(int t)
{
  Sensor *sensor = (Sensor *)((Releaser *)(releasers->head->object))->sensor;
  Creature *p = (Creature *)sensor->parent;
  JointMotor *jmm = &p->jointMotors[0];
  SbVec3f f1,f2;
  Spv vel;
  targetInfo *food = NULL;
  int typeTag = ((GoHoardReleaser *)(releasers->head->object))->typeTag;
  food = sensor->getBestTargetWithTag(typeTag);

if(food){
      sensor->focusOfAttention = food->who;
      sensor->focusPt = food->rayPoint;
      moveTowardPtInWorld(&food->rayPoint, sensor, p);
  }
  else {
     p->getEntrance(&f1);
     // f2 = (p->homeRect[1]+p->homeRect[0])*.5;
     // f2[0] -= 2.0; f2[2] += 1;
     // f1 = f2;
     f1[2] += .5;
     moveTowardPtInWorld(&f1, sensor, p);
  }
  if((range<.8)&&(jmm[NECK].theta>.5*jmm[NECK].fullLeftOrDown))
     makeBid(HEADDWN, 1);
  if((sensor->range<randFloatInInterval(2.0, 2.75) ) && sensor->getClosestTarget() != food
){
```

PrimitiveActivity.c++

```
    //((MotorController *)activityCollection)->doActionAt(7,.2,t);
    checkDetour(sensor, 0, bearing,  t);
  }
} void SleepActivity::determineActionAt(int t)
{

// printf("SNORE...SNORE...SNORE \n");
  state->creature->jointMotors[ROLL].fullLeftOrDown = -1.8;
  makeBid(PITCHDWN, 1);
  if(state->creature->jointMotors[PITCH].theta ==
    state->creature->jointMotors[PITCH].fullLeftOrDown)
    makeBid(ROLLLFT,1);
  if(lowerHead)
    makeBid(HEADDWN,1);
  intensity = .5;
  nextAction = STOP;
} void FleeActivity::moveAwayFromPtInWorld(SbVec3f *pt, Sensor *s, Creature *p)
{
  SbVec3f f1;
  float b1;

f1 = *pt;

p->vecToBody(&f1);
  s->bXa.multVec(&f1);
  range = sqrt(f1[0]*f1[0]+f1[2]*f1[2]);
  f1[0] /= range;
  f1[2] /= range;
  b1 = atan2(f1[2],-f1[0]);
  bearing = (b1>0)? b1 - M_PI : b1+ M_PI;
  if((bearing<1.4)&&(bearing>-1.5714))
    nextAction = RGT;
  else if((bearing>1.7)||(bearing< -1.5714))
    nextAction = LFT;
  else
    nextAction = GOSTRAIGHT;
  return;
} void FleeActivity::determineActionAt(int t)
{
  Sensor *sensor = (Sensor *)((Releaser *)(releasers->head->object))->sensor;
  Creature *p = (Creature *)sensor->parent;
  Creature *target = ((AntiPredatorReleaser *)(releasers->head->object))->
    closestPredator;
  Spv vel;
  int proposedAction, detourAction;

sensor->focusOfAttention = target;
  sensor->focusPt = target->bXa.r;

if(!readyToMove(p,1)||!target)
    return;

moveAwayFromPtInWorld(&target->bXa.r, sensor, p);
  proposedAction = nextAction;
  if(sensor->range<=randFloatInInterval(2.0, 2.75)){
    detourAction = checkDetour(sensor,0, bearing,  t);
    if((bearing<-.77) && (bearing > -2.3) && (nextAction == GOSTRAIGHT)){
      if(proposedAction==LFT && (sensor->getClosestRangeBetween(0, 5)>3))
```

PrimitiveActivity.c++

```
          nextAction = RGT;
       else if (proposedAction==RGT && (sensor->getClosestRangeBetween(15, 9)>3))
          nextAction = LFT;
    }
 }
 if((nextAction == GOSTRAIGHT)&&(sensor->getClosestRangeBetween(5, 9)>5.0))
    intensity = 1.2;
 else if ((nextAction == RGT)&&(sensor->getClosestRangeBetween(0, 4)>5.0))
    intensity = 1.2;
 else if ((nextAction == LFT)&&(sensor->getClosestRangeBetween(9, 15)>5.0))
    intensity = 1.2;
 if(Brio::traceActions && (Brio::creatureToTrace == state->creature))
       printf(" pa => %d da => %d na = %d \n", proposedAction, detourAction,
    nextAction);
}
```

PrimitiveActivity.h

```cpp
#ifndef PRIMACTIVITY
#define PRIMACTIVITY
#include "ActivityLib.h"
include <Inventor/SbLinear.h> class Sensor;
class Creature;
class SbVec3f;

class PrimitiveActivity:public Activity{
 public:
  int nextAction;
  float intensity;
  virtual void dispatchActivityAt(int t);
  virtual void determineActionAt(int t);
  void setActive(int yn);
  void makeBid(int action,float intensity);
  int readyToMove(void *p,int getReady);
  void dropFoodIfAny(Creature *p);
  int checkDetour(Sensor *s, float threshold, float bearing, int t);
  Genome *writeToGenome(int level);
  void readFromGenome(void *g);
};

class WanderActivity:public PrimitiveActivity{
 public:
   int changeActionCounter;
   int randomAction;
   void initWander(void *whichState,int atag,char *aname,float fr,float e,
                   void *rel);
   int moveTowardOpen(int t);
   void determineActionAt(int t);
};

class AvoidActivity:public PrimitiveActivity{
 public:
   int lastAction;
   int lastTimeCalled;
   void *jm;
   void initAvoid(void *whichState,int atag,char *aname,float fr,float e ,
                  void *rel,void *joint);
   void determineActionAt(int t);
   void calcDensity(Sensor *sensor, int side, float *d);
   float weight(int i,float min, float bias);
   void makeRecommendationAt(int t);
};

class PrepPreen:public PrimitiveActivity{
 public:
   void *jm;
   void initPrepPreen(void *whichState,int atag,char *aname,float fr,
                      float e,void *rel,void *joint);
   void determineActionAt(int t);
};

class PreenActivity:public PrimitiveActivity{
 public:
   void *jm;
   int lastAction;
   int visitedBoth;
   void initPreenActivity(void *whichState,int atag,char *aname,float fr,
                          float e,void *rel,void *joint);
   void determineActionAt(int t);
```

PrimitiveActivity.h

```cpp
};

class AntiPredatorActivity:public PrimitiveActivity{
 public:
   void *jm;
   int lastAction;
   int visitedBoth;
   void initAntiPredator(void *whichState,int atag,char *aname,float fr,
              float e,void *rel,void *joint);
   void determineActionAt(int t);
};

class ChewActivity:public PrimitiveActivity{
 public:
   void determineActionAt(int t);
};

class PickupActivity:public PrimitiveActivity{
 public:
   void determineActionAt(int t);
};

class PutdownActivity:public PrimitiveActivity{
 public:
   void determineActionAt(int t);
};

class FindOpeningActivity:public PrimitiveActivity{
   public:
   int locateOpening(int outside);
   void determineActionAt(int t);
};

class SearchActivity:public PrimitiveActivity{
 public:
   float range;
   float bearing;
   void moveTowardPtInWorld(SbVec3f *pt, Sensor *s, Creature *p);
   void orientTowardPtInWorld(SbVec3f *pt, Sensor *s, Creature *p);
   virtual void determineActionAt(int t);
};

class GoHomeActivity:public SearchActivity{
 public:
   void determineActionAt(int t);
   void setActive(int yn);
};

class GoNestActivity:public SearchActivity{
 public:
   void determineActionAt(int t);
};

class FleeActivity:public SearchActivity{
 public:
   void moveAwayFromPtInWorld(SbVec3f *pt, Sensor *s, Creature *p);
   void determineActionAt(int t);
};

class GoHoardActivity:public SearchActivity{
 public:
   void determineActionAt(int t);
};
```

PrimitiveActivity.h

```
class SleepActivity:public PrimitiveActivity{
 public:
   int lowerHead;
   void determineActionAt(int t);
};

class ProbeActivity:public SearchActivity{
 public:
   void *jm;
   float feedingNeckAngle;
   float feedingBodyAngle;
   void initProbe(void *whichState,int atag,char *aname,float fr,
                  float e,void *rel,void *joint);
   void determineActionAt(int t);
};

#endif
```

```
MiscReleasers.c++ include "MiscReleasers.h"
include "Sensor.h"
#include "Creature.h"
#include "Food.h"
#include "MotorController.h"
#include <stdlib.h>
#define FACTOR 1.0
DrinkReleaser::DrinkReleaser(void *aSensor,float mv)
{
   Releaser::init(aSensor,mv);
   tag = DRINKRELEASER;
   pname = "Drink";
} float DrinkReleaser::updateStateAt(int t)
{
   targetInfo *food = NULL;
   Food *tFood;

food = ((Sensor *)sensor)->getClosestTargetWithTag(200);
   if(food){
      tFood = ((Food *)food->who);
      value = (maxValue/food->range)*(tFood->foodValue/tFood->maxFoodValue);
   }
   else
      value = minValue;
   return Releaser::updateStateAt(t);
}

FeedReleaser::FeedReleaser(void *aSensor,float mv,int typetag)
{
   Releaser::init(aSensor,mv);
   tag = FEEDRELEASER;
   typeTag = typetag;
   pname = "Feed";
} float FeedReleaser::updateStateAt(int t)
{
   targetInfo *food = NULL;
   Food *tFood;

food = ((Sensor *)sensor)->getBestTargetWithTag(typeTag);
   if(food){
      tFood = ((Food *)food->who);
      value = (maxValue/food->range)*(tFood->foodValue/tFood->maxFoodValue);
      if(food->range<1.0)
         value = food->range*value;
   }
   else
      value = minValue;
   return Releaser::updateStateAt(t);
}

ChewReleaser::ChewReleaser(void *aSensor,void *joint,float mv,int tt)
{
   Releaser::init(aSensor,mv);
   jm = joint;
   pname = "chew";
   typeTag = tt;
   tag = CHEWRELEASER;
   minValue = -800.0;
}
```

MiscReleasers.c++

```
float ChewReleaser::updateStateAt(int t)
{
  targetInfo *food = NULL;
  Food *tFood;
  JointMotor *joint = (JointMotor *)jm;

food = ((Sensor *)sensor)->getClosestTargetWithTag(typeTag);
  if(food && food->range<.2 && fabs(joint[PITCH].theta)<1.0e-4 ){
    tFood = (Food *)food->who;
    value = fabs(joint->theta/joint->fullLeftOrDown)*maxValue;
    value *= (tFood->foodValue/tFood->maxFoodValue);
  }
  else
    value = minValue;
  return Releaser::updateStateAt(t);
}

ProbeFoodInHandReleaser::ProbeFoodInHandReleaser(void *aSensor,float mv,int tt)
{
  Releaser::init(aSensor,mv);
  tag = PROBERELEASER;
  typeTag = tt;
  pname = "probe";
} float ProbeFoodInHandReleaser::updateStateAt(int t)
{
  targetInfo *food = NULL;
  Food *tFood;
  Creature *p = (Creature *)sensor->parent;
  JointMotor *neck = &p->jointMotors[NECK];

food = ((Sensor *)sensor)->getBestTargetWithTag(typeTag);
  if(food && food->range<1.5){
    tFood = (Food *)food->who;
    value = (fabs(neck->fullLeftOrDown - neck->theta) /
             fabs(neck->fullLeftOrDown)) * maxValue +
             fabs(food->range-.25)*maxValue;
    value *= (tFood->foodValue/tFood->maxFoodValue);
  }
  else
    value = minValue;
  return Releaser::updateStateAt(t);
}

ProbeReleaser::ProbeReleaser(void *aSensor,float mv,int tt)
{
  Releaser::init(aSensor,mv);
  tag = PROBERELEASER;
  typeTag = tt;
  pname = "probe";
  minValue = -800.0;
} float ProbeReleaser::updateStateAt(int t)
{
  targetInfo *food = NULL;
  Food *tFood;
  Creature *p = (Creature *)sensor->parent;
  JointMotor *neck = &p->jointMotors[NECK];

food = ((Sensor *)sensor)->getBestTargetWithTag(typeTag);
  if(food && food->range<1.5){
```

MiscReleasers.c++

```
    tFood = (Food *)food->who;
    value = (fabs(neck->fullLeftOrDown - neck->theta) /
            fabs(neck->fullLeftOrDown)) * maxValue +
            fabs(food->range-.10)*maxValue;
    value *= (tFood->foodValue/tFood->maxFoodValue);
  }
  else
    value = minValue;
  return Releaser::updateStateAt(t);
}

WanderReleaser::WanderReleaser(void *aSensor,float mv)
{
  Releaser::init(aSensor,mv);
  tag = WANDERRELEASER;
  pname = "wander";
} float WanderReleaser::updateStateAt(int t)
{
  value = maxValue*.05;
  return Releaser::updateStateAt(t);
}

SearchReleaser::SearchReleaser(void *aSensor,float mv,int typetag, int ignore)
{
  Releaser::init(aSensor,mv);
  tag = SEARCHRELEASER;
  typeTag = typetag;
  pname = "search-food";
  ignoreFlag = ignore;
} float SearchReleaser::updateStateAt(int t)
{
  targetInfo *food = NULL;
  Food *tFood;
  int isHome = sensor->parent->isHome(0);

usingPerson = 0;
  food = ((Sensor *)sensor)->getBestTargetWithTag(typeTag);
  if(!food && typeTag == 300 && (ignoreFlag != IGNOREPERSON)){
    food = ((Sensor *)sensor)->getBestTargetWithTag(900);
    if(food)
        usingPerson = 1;
  }
  if(usingPerson || (food &&
    ((ignoreFlag == DONTCAREWHERE )||(ignoreFlag !=isHome )))){
    tFood = ((Food *)food->who);
    value = (maxValue/food->range)*(tFood->foodValue/tFood->maxFoodValue);
    if(food->range<1.5)
       value = food->range*maxValue;
  }
  else
    value = minValue;
  return Releaser::updateStateAt(t);
}

AvoidReleaser::AvoidReleaser(void *aSensor,float mv)
{
  Releaser::init(aSensor,mv);
  tag = AVOIDRELEASER;
  pname = "avoid";
}
```

MiscReleasers.c++

```
float AvoidReleaser::updateStateAt(int t)
{
  Sensor *s1 = (Sensor *)sensor;
  if(s1->detected && (s1->range<1.5*FACTOR)){
    value = maxValue/(s1->range+.5);
  }
  else
    value = 0;
  return Releaser::updateStateAt(t);
}

FindOpeningReleaser::FindOpeningReleaser(void *aSensor,float mv,int goout)
{
  Releaser::init(aSensor,mv);
  tag = FINDOPENRELEASER;
  pname = "find opening";
  goOut = goout;
} float FindOpeningReleaser::updateStateAt(int t)
{
  Creature *p = (Creature *)((Sensor *)sensor)->parent;
  where = -1;

if((!p->isHome(1))&& (goOut))
    where = -1;
  else
    if(p->isHome(1)&& goOut)
      where = locateOpening(0);
    else
        where = -1;
  value = (where>-1)?maxValue:minValue;
  return Releaser::updateStateAt(t);
} int FindOpeningReleaser::locateOpening(int outside)
{
  int i,st=-1,et=-1;
  int opening;
  Sensor *s = (Sensor *)sensor;

opening = -1;
  for(i=0;i<s->rayCount;i++){
    if(s->rayTargets[i].color == !outside){
      if(st<0)
        st = i;
    }
    else if((st> -1)&& (et<0))
      et = i;
  }
  if((st>-1)&& (et<0))
    et = s->rayCount-1;

opening = (st+et)/2;

return opening;
}

DeathReleaser::DeathReleaser(void *aSensor,float mv)
{
  Releaser::init(aSensor,mv);
```

MiscReleasers.c++

```cpp
  tag = SLEEPRELEASER;
  pname = "sleep";
} float DeathReleaser::updateStateAt(int t)
{
  Food *p = (Food *)sensor->parent;

if((p->foodValue/p->maxFoodValue)<.98)
    value = maxValue;
  else
    value = minValue;

/* check if out of bounds */
  if((fabs(p->bXa.r[0])>41.0)||(fabs(p->bXa.r[2])>41.0)){
    value = maxValue;
    printf("CAUSE OF DEATH => LEFT CAGE \n");
  }
  if(value == maxValue)
    printf("death at %d \n", t);
  return Releaser::updateStateAt(t);
}

SleepReleaser::SleepReleaser(void *aSensor,float mv)
{
  Releaser::init(aSensor,mv);
  tag = SLEEPRELEASER;
  pname = "sleep";
} float SleepReleaser::updateStateAt(int t)
{
  SbVec3f nest;
  float range;

Creature *p = (Creature *)((Sensor *)sensor)->parent;
  if(!p->isHome(1))
    value = minValue;
  else {
    SbVec3f ent;
    p->getEntrance(&ent);
    nest = .5*(p->homeRect[0] + p->homeRect[1]);
    nest[0] += -3.5;
    p->vecToBody(&nest);
    nest = sensor->bXa.r - nest;
    range = sqrt(nest[0]*nest[0] + nest[2]*nest[2]);
    value = (range<1)?maxValue : minValue;
  }
  return Releaser::updateStateAt(t);
}

GoHomeReleaser::GoHomeReleaser(void *aSensor,float mv)
{
  Releaser::init(aSensor,mv);
  tag = GOHOMERELEASER;
  pname = "go-home";
} float GoHomeReleaser::updateStateAt(int t)
{
  Creature *p = (Creature *)((Sensor *)sensor)->parent;
  SbVec3f entrance;
  float range;
```

MiscReleasers.c++

```
  if(!p->isHome(0)){
    p->getEntrance(&entrance);
    p->vecToBody(&entrance);
    entrance -= sensor->bXa.r;
    range = sqrt(entrance[0]*entrance[0] + entrance[2]*entrance[2]);
    value = range;

}
  else{
    value = minValue;
  }
  return Releaser::updateStateAt(t);
}

GoNestReleaser::GoNestReleaser(void *aSensor,float mv)
{
  Releaser::init(aSensor,mv);
  tag = GONESTRELEASER;
  pname = "go-to-nest";
} float GoNestReleaser::updateStateAt(int t)
{
  Creature *p = (Creature *)((Sensor *)sensor)->parent;
  SbVec3f entrance;
  float range;

if(!p->isHome(0)){
    value = minValue;
  }
  else{
    entrance = .5*(p->homeRect[0]+p->homeRect[1]);
    entrance[0] -= 3.5;
    p->vecToBody(&entrance);
    entrance -= sensor->bXa.r;
    range = sqrt(entrance[0]*entrance[0] + entrance[2]*entrance[2]);
    value = range;
  }
  return Releaser::updateStateAt(t);
}

GoHoardReleaser::GoHoardReleaser(void *aSensor,float mv, int tt)
{
  Releaser::init(aSensor,mv);
  tag = GOHOARDRELEASER;
  typeTag = tt;

pname = "go-to-hoard";
} float GoHoardReleaser::updateStateAt(int t)
{
  Creature *p = (Creature *)((Sensor *)sensor)->parent;
  SbVec3f entrance;
  SbVec3f sp;

float range;

if(!p->isHome(0)){
    value = minValue;
  }
  else{
```

MiscReleasers.c++

```
    /*
     * If there is already food in hoard use that as the goal, else
     * use some fixed point
     */
      targetInfo *food = NULL;
      food = sensor->getBestTargetWithTag(typeTag);
      if(food){
          if(food->range>.7)
              range = (.7/food->range)*maxValue;
          else{
              JointMotor *jmm  = &p->jointMotors[0];
              range = (jmm[NECK].theta<=.5*jmm[NECK].fullLeftOrDown)?
                  minValue:maxValue;
          }
      }else{
          p->getEntrance(&entrance);
          entrance[2] += .5;
/*
          entrance = .5*(p->homeRect[0]+p->homeRect[1]);
          entrance[0] -= 2;
          entrance[2] += 1;
*/
          p->vecToBody(&entrance);
          entrance -= sensor->bXa.r;
          range = sqrt(entrance[0]*entrance[0] + entrance[2]*entrance[2]);
      }
      value = range;
  }
  return Releaser::updateStateAt(t);
}

PredatorReleaser::PredatorReleaser(void *aSensor,float mv)
{
  Releaser::init(aSensor,mv);
  tag = PREDATORRELEASER;
  pname = "predator";
  lastSeenAt = -1;
} float PredatorReleaser::updateStateAt(int t)
{
    Creature *p = (Creature *)sensor->parent;
    value = (p->isHome(0))?minValue:maxValue;
    return Releaser::updateStateAt(t);
}

PrepPreenReleaser::PrepPreenReleaser(void *aSensor,float mv)
{
  Releaser::init(aSensor,mv);
  tag = PREPPREENRELEASER;
  pname = "prep-preen";
} float PrepPreenReleaser::updateStateAt(int t)
{
    Creature *p = (Creature *)sensor->parent;
    Spv vel;
    p->getVelocity(vel);

if((fabs(p->jointMotors[ROLL].theta)>1e-4)||vel.v0[2]>.5)
      value = maxValue;
    else
      value = minValue;
    return Releaser::updateStateAt(t);
```

MiscReleasers.c++

```
}

PreenReleaser::PreenReleaser(void *aSensor,float mv)
{
  Releaser::init(aSensor,mv);
  tag = PREENRELEASER;
  pname = "preen";
  lastTimeOnSide = 10;
} float PreenReleaser::updateStateAt(int t)
{
   Creature *p = (Creature *)sensor->parent;
   if(fabs(p->jointMotors[ROLL].theta)<1.0e-4)
     value = maxValue;
   else
     value = minValue;
   return Releaser::updateStateAt(t);
}
```

MiscReleasers.h

```
#ifndef MISCRELEASERS
define MISCRELEASERS include "Releaser.h"

define FEEDRELEASER 1
#define CHEWRELEASER 2
#define PROBERELEASER 3
#define SEARCHRELEASER 4
#define AVOIDRELEASER 5
#define FINDOPENRELEASER 6
#define WANDERRELEASER 7
#define DRINKRELEASER 8
#define SLEEPRELEASER 9
#define GOHOMERELEASER 10
#define PREDATORRELEASER 11
#define PREENRELEASER 12
#define PREPPREENRELEASER 13
#define GONESTRELEASER 14
define GOHOARDRELEASER 15 define IGNOREINSIDE 1
define IGNOREOUTSIDE 0
#define DONTCAREWHERE 2
define IGNOREPERSON 3 class FeedReleaser:public Releaser {
 public:
   FeedReleaser(void *aSensor,float mv,int typetag);
   int typeTag;
   float updateStateAt(int t);
};

class DrinkReleaser:public Releaser {
 public:
   DrinkReleaser(void *aSensor,float mv);
   float updateStateAt(int t);
};

class SearchReleaser:public Releaser {
 public:
   int typeTag;
   int ignoreFlag;
   int usingPerson;
   SearchReleaser(void *aSensor,float mv,int typetag, int ignore);
   float updateStateAt(int t);
};

class ChewReleaser:public Releaser {
 public:
   void *jm;
   int typeTag;
   ChewReleaser(void *aSensor,void *joint,float mv,int typetag);
   float updateStateAt(int t);
};

class ProbeReleaser:public Releaser {
 public:
   int typeTag;
   ProbeReleaser(void *aSensor,float mv,int tt);
   float updateStateAt(int t);
};

class ProbeFoodInHandReleaser:public Releaser {
```

MiscReleasers.h

```
 public:
   int typeTag;
   ProbeFoodInHandReleaser(void *aSensor,float mv,int tt);
   float updateStateAt(int t);
};

class AvoidReleaser:public Releaser {
 public:
   AvoidReleaser(void *aSensor,float mv);
   float updateStateAt(int t);
};

class WanderReleaser:public Releaser {
 public:
   WanderReleaser(void *aSensor,float mv);
   float updateStateAt(int t);
};

class FindOpeningReleaser:public Releaser {
 public:
   int where;
   int goOut;
   FindOpeningReleaser(void *aSensor,float mv,int goOut);
   float updateStateAt(int t);
   int locateOpening(int outside);
};

class SleepReleaser:public Releaser {
 public:
   SleepReleaser(void *aSensor,float mv);
   float updateStateAt(int t);
};

class DeathReleaser:public Releaser {
 public:
   DeathReleaser(void *aSensor,float mv);
   float updateStateAt(int t);
};

class GoHomeReleaser:public Releaser {
 public:
   GoHomeReleaser(void *aSensor,float mv);
   float updateStateAt(int t);
};

class GoNestReleaser:public Releaser {
 public:
   GoNestReleaser(void *aSensor,float mv);
   float updateStateAt(int t);
};

class GoHoardReleaser:public Releaser {
 public:
   int typeTag;
   GoHoardReleaser(void *aSensor,float mv, int tt);
   float updateStateAt(int t);
};

class PredatorReleaser:public Releaser {
 public:
```

MiscReleasers.h

```
  PredatorReleaser(void *aSensor,float mv);
  int lastSeenAt;
  float updateStateAt(int t);
};

class PrepPreenReleaser:public Releaser {
 public:
  PrepPreenReleaser(void *aSensor,float mv);
  float updateStateAt(int t);
};

class PreenReleaser:public Releaser {
 public:
  float lastTimeOnSide;
  PreenReleaser(void *aSensor,float mv);
  float updateStateAt(int t);
};

#endif
```

MoreActivities.c++

```cpp
#include "MoreActivities.h"
#include "TemporalReleasers.h"
#include "Creature.h"
#include "MotorController.h"
#include "State.h"
#include "Recco.h"

void AntiPredator::makeRecommendationAt(int t)
{
    Sensor *sensor = (Sensor *)((Releaser *)(releasers->head->object))->sensor;
    Creature *p = (Creature *)sensor->parent;
    Creature *target = ((AntiPredatorReleaser *)(releasers->head->object))->
    closestPredator;

if( target ){
        SbVec3f f1;
        float b1, range;
        int na;
        f1 = target->bXa.r;

p->vecToBody(&f1);
        sensor->bXa.multVec(&f1);
        range = sqrt(f1[0]*f1[0]+f1[2]*f1[2]);
        f1[0] /= range;
        f1[2] /= range;
        b1 = atan2(f1[2],-f1[0]);
        /* na represents the direction you don't want to move */
        if((b1<1.4)&&(b1>-1.5714))
            na = LFT;
        else if((b1>1.7)||(b1< -1.5714))
            na = RGT;
        else
            na = GOSTRAIGHT;

Recommendation r;
        r.value = -10;
        r.intensity = 1;
        r.timeMade = t;
        state->recs->setRecommendation(na,r);
    }
    return;

}
```

MoreActivities.h

```
#include "ActivityLib.h"

class AntiPredator: public Activity
{
    void makeRecommendationAt(int t);
};
```

ForagingReleasers.c++

```cpp
#include "ForagingReleasers.h"
#include "Sensor.h"
#include "Creature.h"
#include "Hamster.h"
#include "Food.h"
#include "MotorController.h"
#include "CarryTool.h"
#include "Person.h"
#include <stdlib.h>

ForageReleaser::ForageReleaser(void *aSensor,float mv,int typetag)
{
  Releaser::init(aSensor,mv);
  tag = FORAGERELEASER;
  typeTag = typetag;
  pname = "forage";
} float ForageReleaser::updateStateAt(int t)
{
  targetInfo *food = NULL;
  Food *tFood;

if( !sensor->parent->isHome(0) ){
      food = ((Sensor *)sensor)->getBestTargetWithTag(typeTag);
      if(food){
         tFood = ((Food *)food->who);
         value = (maxValue/food->range)*(tFood->foodValue/tFood->maxFoodValue);
         if(food->range<1.0)
            value = food->range*value;
      }
      else
         value = minValue;
  }
  else
    value = minValue;
  return Releaser::updateStateAt(t);
}

CarryReleaser::CarryReleaser(Sensor *aSensor,float mv,int cap)
{
  Releaser::init(aSensor,mv);
  tag = CARRYRELEASER;
  capacity = cap;
  pname = "Cheeks-full";
} float CarryReleaser::updateStateAt(int t)
{
  Hamster *ham = (Hamster *)sensor->parent;
  float howFull;

howFull = (float)ham->mouth->carryingSomething()/(float) capacity;
  value = minValue + howFull*(maxValue-minValue);
  return Releaser::updateStateAt(t);
}

PickupReleaser::PickupReleaser(void *aSensor,void *joint,float mv,int tt)
{
  Releaser::init(aSensor,mv);
  jm = (JointMotor *)joint;
  pname = "pickup";
  typeTag = tt;
  tag = PICKUPRELEASER;
```

ForagingReleasers.c++

```
} float PickupReleaser::updateStateAt(int t)
{
    targetInfo *food = NULL;
    Food *tFood;
    JointMotor *joint = (JointMotor *)jm;
    Creature *p = joint->parent;
    if(!p->isHome(0)){
        food = ((Sensor *)sensor)->getClosestTargetWithTag(typeTag);
        if(food && food->range<.3 && fabs(joint[PITCH].theta)<1.0e-4){
            tFood = (Food *)food->who;
            value = fabs(joint->theta/joint->fullLeftOrDown)*maxValue;
            value *= (tFood->foodValue/tFood->maxFoodValue);
        }
        else
            value = minValue;
    }
    else
        value = minValue;
    return Releaser::updateStateAt(t);
}

PutDownReleaser::PutDownReleaser(void *aSensor,float mv)
{
    Releaser::init(aSensor,mv);
    tag = PUTDOWNRELEASER;
    pname = "put-down";
} float PutDownReleaser::updateStateAt(int t)
{
    SbVec3f nest;
    float range;
    SbVec3f sp;

Creature *p = (Creature *)((Sensor *)sensor)->parent;
    if(!p->isHome(0))
        value = minValue;
    else {
        JointMotor *jmm = &p->jointMotors[0];
        value = (jmm[NECK].theta<=.5*jmm[NECK].fullLeftOrDown)?maxValue:minValue;
    }
    return Releaser::updateStateAt(t);
}

ForageProbeReleaser::ForageProbeReleaser(void *aSensor,float mv,int tt)
{
    Releaser::init(aSensor,mv);
    tag = FORAGEPROBERELEASER;
    typeTag = tt;
    pname = "forage-probe";
} float ForageProbeReleaser::updateStateAt(int t)
{
    targetInfo *food = NULL;
    Food *tFood;
    Creature *p = (Creature *)sensor->parent;
    JointMotor *neck = &p->jointMotors[NECK];
    int usingPerson=0;

food = ((Sensor *)sensor)->getBestTargetWithTag(typeTag);
```

ForagingReleasers.c++

```
  if(!food){
  //   food = ((Sensor *)sensor)->getBestTargetWithTag(900);
  //   if(food) usingPerson = 1;
  }
  if(usingPerson || !p->isHome(0)){
      if(food && food->range<1.5){
        tFood = (Food *)food->who;
        value = (fabs(neck->fullLeftOrDown - neck->theta) /
                 fabs(neck->fullLeftOrDown)) * maxValue +
                 fabs(food->range-.15)*maxValue;
        value *= (tFood->foodValue/tFood->maxFoodValue);
      }
      else
        value = minValue;
  }
  else
    value = minValue;
  if(p->isHome(1))
    value = minValue;
  return Releaser::updateStateAt(t);
}

ForageBegReleaser::ForageBegReleaser(void *aSensor,float mv,int tt)
{
  initTemporalReleaser(aSensor,mv,AVGINGRELEASER,10);
  //Releaser::init(aSensor,mv);
  tag = FORAGEPROBERELEASER;
  typeTag = tt;
  pname = "forage-beg";
} float ForageBegReleaser::updateStateAt(int t)
{
  targetInfo *food = NULL;
  Creature *p = (Creature *)sensor->parent;
  PersonPart *tFood;
  JointMotor *neck = &p->jointMotors[NECK];

food = ((Sensor *)sensor)->getBestTargetWithTag(typeTag);
  if(food && food->range<1.5 ){
     tFood = (PersonPart *)food->who;
     //value = fabs(food->range-.25)*maxValue;
     if(!tFood->isPatting()) {
     value = maxValue;
     value *= (tFood->foodValue/tFood->maxFoodValue);
     }
     else
        value = minValue;
  }
  else
     value = minValue;
  return TemporalReleaser::updateStateAt(t);
}

ForageScratchReleaser::ForageScratchReleaser(void *aSensor,float mv,int tt)
{
  initTemporalReleaser(aSensor,mv,AVGINGRELEASER,20);

// Releaser::init(aSensor,mv);
  tag = FORAGESCRATCHRELEASER;
  typeTag = tt;
  pname = "forage-scratch";
}
```

ForagingReleasers.c++

```cpp
float ForageScratchReleaser::updateStateAt(int t)
{
  targetInfo *food = NULL;
  Creature *p = (Creature *)sensor->parent;
  PersonPart *tFood;
  JointMotor *neck = &p->jointMotors[NECK];

food = ((Sensor *)sensor)->getBestTargetWithTag(typeTag);
  if(food && food->range<2.5){
    tFood = (PersonPart *)food->who;
    if(tFood->isPatting()&& (!tFood->carryingFood))
        value = maxValue;
    else
        value = minValue;
  }
  else
    value = minValue;
  return TemporalReleaser::updateStateAt(t);
}
```

ForagingReleasers.h

```
#ifndef FORAGERELEASERS
define FORAGERELEASERS include "Releaser.h"
include "TemporalReleasers.h"

#define FORAGERELEASER 100
#define CARRYRELEASER FORAGERELEASER+1
#define FORAGEPROBERELEASER FORAGERELEASER+3
#define PICKUPRELEASER FORAGERELEASER+4
#define PUTDOWNRELEASER FORAGERELEASER+5
#define FORAGEBEGRELEASER FORAGERELEASER+5
#define FORAGESCRATCHRELEASER FORAGERELEASER+6
class Sensor;
class JointMotor;

class ForageReleaser:public Releaser {
 public:
   ForageReleaser(void *aSensor,float mv,int typetag);
   int typeTag;
   float updateStateAt(int t);
};

class CarryReleaser:public Releaser {
 public:
   int capacity;
   CarryReleaser(Sensor *aSensor,float mv, int cap);
   float updateStateAt(int t);
};

class PutDownReleaser:public Releaser {
 public:
   PutDownReleaser(void *aSensor,float mv);
   float updateStateAt(int t);
};

class PickupReleaser:public Releaser {
 public:
   int typeTag;
   JointMotor *jm;
   PickupReleaser(void *aSensor,void *joint,float mv,int tt);
   float updateStateAt(int t);
};

class ForageProbeReleaser:public Releaser {
 public:
   int typeTag;
   ForageProbeReleaser(void *aSensor,float mv,int tt);
   float updateStateAt(int t);
};

class ForageBegReleaser:public TemporalReleaser {
 public:
   int typeTag;
   ForageBegReleaser(void *aSensor,float mv,int tt);
   float updateStateAt(int t);
};

class ForageScratchReleaser:public TemporalReleaser {
 public:
   int typeTag;
   ForageScratchReleaser(void *aSensor,float mv,int tt);
   float updateStateAt(int t);
};
```

ForagingReleasers.h

```
#endif
```

Hamster.c++

```cpp
#include <Inventor/nodes/SoTransform.h>
#include <Inventor/actions/SoGetMatrixAction.h>
#include <Inventor/actions/SoSearchAction.h>
#include <Inventor/nodes/SoCamera.h>
#include "Hamster.h"
#include "creature.h"
#include "MotorController.h"
#include "Motor.h"
#include "ml.h"
#include "CarryTool.h"
#include "Brio.h"
#include "Sensor.h"

extern Brio *globalBrio;

void initTestCase(State *state, ActivityCollection *am);

Hamster::Hamster(const SbVec3f &pos,const SbVec3f &size,float m, int ifDemo)
{
    isHorizontal = 0;
    theRbiMatrix = NULL;
    rbi = NULL;
    articulated = 1;
    initCreature(pos,size,m);
    initFood(100.0,SbColor(.7,0,0));
    tag = 100;
    isActive = ACTIVE;
    setTheta(0);
    addMotorUnit();
    MotorController *mc = (MotorController *)components[1];
    jointMotors[NECK].fullLeftOrDown = -1.2;
    jointMotors[NECK].fullRightOrUp = 0;

jointMotors[HEAD].defaultSpeed = .10;
    jointMotors[HEAD].fullLeftOrDown = -1.2;
    jointMotors[HEAD].fullRightOrUp = 1.2;

jointMotors[TAIL].defaultSpeed = .05;
    jointMotors[TAIL].fullLeftOrDown = -1.2;
    jointMotors[TAIL].fullRightOrUp = 1.2;

jointMotors[ROLL].defaultSpeed = .05;
    jointMotors[ROLL].fullLeftOrDown = -1.8;
    jointMotors[ROLL].fullRightOrUp = 0;

jointMotors[PITCH].defaultSpeed = .05;
    jointMotors[PITCH].fullLeftOrDown = 0;
    jointMotors[PITCH].fullRightOrUp = 1.57;

Sensor *s = (Sensor *)components[0];
    s->maxRange = 60.0;
    indexForCarrier = MOUTH;
    mouth = new CarryTool;
    mouth->init();
    jointMotors[indexForCarrier].helper = mouth;

state = new State;
    state->creature = this;
//      am = new ActivityCollection();
//      initTestCase(state, am);
//      am = setupLevel0(state,mc,mc->sensor1,&jointMotors[0]);
//      am = setupTest(state,mc,mc->sensor1,&jointMotors[0]);
```

Hamster.c++

```
    //  am = exploreOnly(state,mc,mc->sensor1,&jointMotors[0]);

if(ifDemo)
        am = setupPersonActivity(state,mc,mc->sensor1,&jointMotors[0]);
    else
        am = setupLevel0(state,mc,mc->sensor1,&jointMotors[0]);

} void Hamster::buildTheBody()
{
    body = buildBody(bodySize,jointMotors);
    isActive = ACTIVE;
} void Hamster::updateForces()
{
  Creature::updateForces();
} void Hamster::updateStateAt(float t)
{

Creature::updateStateAt(t);
    return;
} void Hamster::mouthTransform(SbMatrix *sbm1)
{
    SoSearchAction *sa = new SoSearchAction;
    sa->setNode(jointMotors[MOUTH].xf);
    sa->apply(globalBrio->selectionRoot);
    SoPath *pathToPart = sa->getPath();
    SoGetMatrixAction *smb = new SoGetMatrixAction(
        globalBrio->currentViewer->getViewportRegion());
    smb->apply(pathToPart);
    *sbm1 = smb->getMatrix();
    delete smb;
    delete sa;
    return;
} void Hamster::getEyeView(SoCamera *xf)
{
    SbRotation r = bodyTransform->rotation.getValue();
    SbRotation rr = r*SbRotation(SbVec3f(0, 1, 0), M_PI);
    SbVec3f x = bodyTransform->translation.getValue();
    x = x*2;
    x[1]+=4.0;
    xf->orientation.setValue(rr);
    xf->position.setValue(x);
}
```

Hamster.h

```
#include "Food.h"

class CarryTool;
class SbMatrix;
class SoCamera;

class Hamster: public Food
{
 public:
 CarryTool *mouth;
 SoPath *pathToMouth;
 Hamster(const SbVec3f &pos,const SbVec3f &size,float m, int ifDemo);
 virtual void buildTheBody();
 void mouthTransform(SbMatrix *sbml);
 void getEyeView(SoCamera *xf);
 void updateForces();
 void updateStateAt(float t);
};
``` m1.c++

```cpp
#include "m1.h"
#include "Activity.h"
#include "MoreActivities.h"
#include "ActivityCollection.h"
#include "Action.h"
#include "Endogenous.h"
#include "State.h"
#include "MotorController.h"
#include "JointMotor.h"
#include "PrimitiveActivity.h"
#include "MiscReleasers.h"
#include "ForagingReleasers.h"
#include "TemporalReleasers.h"
#include "misc.h"
#include "forage.h"
#include "Person.h"

#include <stdio.h>
#define MAXRELEASER 50
define MAXENDO 50 extern int showState;

AntiPredatorActivity *graa;

Activity *initEat(State *state,Activity *e,MotorController *mc,Sensor *s1,JointMotor *jm,i
nt foodType,int howHungry)
{
  /* do top level */

Homeostasis *h = new Homeostasis;

e->initActivity(state,0,"eat",.000,.01,new FeedReleaser(s1,MAXRELEASER,foodType));

h->init(state,howHungry,.001,NULL);
  h->tag = ENERGYTAG;

e->addEndogenousVariable(h);

e->interestRate = .002;
  e->interest->setRates(1, .0005, .0005);

e->value = howHungry;
  e->active = 1;
  e->setGainAt(2.0,1);
  e->setGainAt(2.1,2);
  e->setGainAt(2.1,3);
  e->setGainAt(2.0,4);
  e->setGainAt(2.0,5);

/* do next level */
  ActivityCollection *level1 = new ActivityCollection;
  e->activityCollection = level1;

/* probe */
  ProbeActivity *pa = (ProbeActivity *)level1->addActivity(new ProbeActivity);
  pa->initProbe(state,0,"probe",0,0,
                new ProbeReleaser(s1,MAXRELEASER,foodType),jm);
  pa->activityCollection = mc;
  pa->setUniformGain(2.0);
  pa->setGainAt(1,1);
  pa->setGainAt(4,2);
  pa->setGainAt(4,3);
``` m1.c++

```cpp
  /* chew */
  ChewActivity *ca = (ChewActivity *)level1->addActivity(new ChewActivity);
  ca->initActivity(state,1,"chew",0,.02,
                  new ChewReleaser(s1,jm,MAXRELEASER,foodType));
  ca->activityCollection = mc;
  //h->addAffectedBy(ca, &ca->effect);
  h->setAutonomousRateFromFreq(2.2);
  ca->setRateFromDuration(200.0);

float *caEffect = new float;
  *caEffect = ca->effect;
  h->addAffectedBy(ca, caEffect);

ca->setUniformGain(2.0);
  ca->setGainAt(4.0,2);

Activity *ee = new Activity();
  ActivityCollection *ac = new ActivityCollection;

ee->initActivity(state,2,"search or return",.000,.01,new WanderReleaser(s1,MAXRELEASER));
;
  ee->activityCollection = ac;

/* build generic search for food*/
  Activity *sa = ac->addActivity(buildSearchActivity
                                    (state, "search-for-food",
                                     foodType,mc,s1,jm,0, IGNOREPERSON));
  sa->addReleaser(new SearchReleaser(s1,MAXRELEASER,foodType, IGNOREPERSON));
  sa->tag = 0;

ac->initInhibitionLinks();
  level1->addActivity(ee);

level1->initInhibitionLinks();
  level1->showState =showState;

return e;
}

Activity *initDrink(State *state,Activity *e,MotorController *mc,Sensor *s1,JointMotor *jm
,int foodType)
{
  Homeostasis *h = new Homeostasis;

e->initActivity(state,1,"drink",0,.01,NULL /* new DrinkReleaser(s1,MAXRELEASER) */);
  h->init(state,MAXENDO/10,.001,NULL);
  h->tag = WATERTAG;

//  h->setAutonomousRateFromFreq(2.0);
//  e->setRateFromDuration(50.0);

//  e->addEndogenousVariable(h);

e->setGainAt(1.5,0);
  e->setGainAt(1.8,3);
  e->setGainAt(2.2,2);
  e->setGainAt(2.2,4);
  e->setGainAt(2.0,5);

e->interestRate = .00051;
  e->interest->setRates(1, .0001, .0001);

/* do next level */
``` m1.c++

```
   ActivityCollection *level1 = new ActivityCollection;
   e->activityCollection = level1;

/* probe */
   ProbeActivity *pa = (ProbeActivity *)level1->addActivity(new ProbeActivity);
   pa->initProbe(state,0,"probe-for-water",0,0,
               new ProbeReleaser(s1,MAXRELEASER,foodType),jm);
   pa->activityCollection = mc;
   pa->setUniformGain(2.0);
   pa->setGainAt(1,1);

/* chew */
   ChewActivity *ca = (ChewActivity *)level1->addActivity(new ChewActivity);
   ca->initActivity(state,1,"swallow water",0,.05,
               new ChewReleaser(s1,jm,MAXRELEASER,foodType));
   ca->activityCollection = mc;
// e->setConsumatoryActivity(ca);

h->addAffectedBy(ca, &ca->effect);
   h->setAutonomousRateFromFreq(2.2);
   ca->setRateFromDuration(40.0);

ca->setUniformGain(2.0);

/* Search -- build generic search */
   Activity *sa = level1->addActivity(buildSearchActivity
          (state, "search-for-water",foodType,mc,s1,jm,MAXRELEASER,DONTCAREWHERE));
   level1->showState = showState;
   level1->initInhibitionLinks();

return e;
}

Activity *initPreen(State *state,Activity *e,void *mc,
      Sensor *s1,void *jm)
{
   Homeostasis *h = new Homeostasis;

e->initActivity(state,4,"preen",.000,.01,NULL);

// h->init(state,5,0,e);
// h->setAutonomousRateFromFreq(.5);
// e->setRateFromDuration(64.0);
// e->addEndogenousVariable(h);

/* do next level */
   ActivityCollection *level1 = new ActivityCollection;
   e->activityCollection = level1;

PrepPreen *pp = (PrepPreen *)level1->addActivity(new PrepPreen);
   pp->initPrepPreen(state,0,"prep-preen",0,.0,
                 (new PrepPreenReleaser(s1,MAXRELEASER)),jm);
   pp->activityCollection = mc;

PreenActivity *pa = (PreenActivity *)level1->addActivity
       (new PreenActivity);
   pa->initPreenActivity(state,1,"prep",0,.0,
                 (new PreenReleaser(s1,MAXRELEASER)),jm);
   pa->activityCollection = mc;

h->init(state,5,0,pa);
``` m1.c++

```cpp
  h->setAutonomousRateFromFreq(2);
  pa->setRateFromDuration(200.0);
  e->addEndogenousVariable(h);

// e->interest->setRates(1,.005,0);
// e->interestRate = .0006;
// e->setConsumatoryActivity(pa);

e->setGainAt(1.5,3);
  e->setGainAt(2.0,2);
  e->setGainAt(2.1,0);
  e->setGainAt(2.2,1);
  e->setGainAt(2.0,5);
  return e;
}

Activity *initAntiPredator_extended(State *state, Activity *e,
                        void *mc,Sensor *s1,void *jm, int who, float factor)
{
  Homeostasis *h = new Homeostasis;
  AntiPredatorActivity *ar = new AntiPredatorActivity;
  ActivityCollection *level1 = new ActivityCollection;

/* do top level guy */
  AntiPredatorReleaser *mr = new AntiPredatorReleaser;
  mr->initAntiPredatorReleaser(s1,MAXRELEASER*factor, AVGINGRELEASER,10, who);
  e->initActivity(state,3,"look-around",0,.0,mr);
  e->setRecommender(1);
  e->interestRate = .0075;
  e->interest->setRates(1, .075, .075);

e->setRateFromDuration(32.0);
  e->activityCollection = level1;
  level1->showState = showState;

/* just as a test */
  h->pname = "ANTI-PRED TEST";
  h->tag = ANTIPREDTAG;
  h->init(state,0.0,0,NULL);
  float *mre = new float;
  h->addAffectedBy(mr, mre);
  *mre = -.001;
  h->setRates(0, -.01, .01);
  e->addEndogenousVariable(h);

/* look around */
  ar->initAntiPredator(state,0,"look-around",0,.0,NULL,jm);
  ar->setRateFromDuration(54.0);
  ar->activityCollection = mc;
  level1->addActivity(ar);

mr = new AntiPredatorReleaser;
  mr->initAntiPredatorReleaser(s1,MAXRELEASER*10, AVGINGRELEASER,20, who);

Activity *ac = buildFleeActivity(state, "flee-from-predator",
     (MotorController *)mc,(Sensor *)s1,(JointMotor *)jm,(Releaser *)mr);

ac->setGainAt(4.0, 0);
  level1->addActivity(ac);

level1->showState = showState;
  level1->initInhibitionLinks();
``` m1.c++

```
  e->setGainAt(3.0,2);
  e->setGainAt(3.1,1);
  e->setGainAt(3.0,0);
  e->setGainAt(4.0,4);
  e->setGainAt(3.0,5);
  return e;
}

Activity *initAntiPredator(State *state,AntiPredatorActivity *e,
                           void *mc,Sensor *s1,void *jm)
{
  Homeostasis *h = new Homeostasis;

MovementReleaser *mr = new MovementReleaser;
  mr->initTemporalReleaser(s1,MAXRELEASER*2,SUMMINGRELEASER,20);
  e->initAntiPredator(state,3,"look-around",0,.0,mr,jm);
  h->init(state,MAXRELEASER/3.0,0,e);
  e->addEndogenousVariable(h);
  h->setAutonomousRateFromFreq(10.0);
  e->setRateFromDuration(32.0);

e->activityCollection = mc;
  e->setGainAt(2.0,2);
  e->setGainAt(2.1,1);
  e->setGainAt(2.0,0);
  e->setGainAt(3.0,4);
  e->setGainAt(2.0,5);
  return e;
}

Activity *initAntiPredator_p(State *state,AntiPredatorActivity *e,
                             void *mc,Sensor *s1,void *jm)
{
  Homeostasis *h = new Homeostasis;

//  MovementReleaser *mr = new MovementReleaser;
//  mr->initTemporalReleaser(s1,MAXRELEASER,AVGINGRELEASER,50);
  e->initAntiPredator(state,3,"look-around",0,.0,NULL,jm);
  h->init(state,MAXRELEASER/3.0,0,e);
  e->addEndogenousVariable(h);
  h->setAutonomousRateFromFreq(10.0);
  e->setRateFromDuration(32.0);

//  e->interest->setRates(1,.005,0);
//  e->timeConstant = 48;
//  e->interestRate = .000;
//  e->value = 0;
  e->activityCollection = mc;
  e->setGainAt(2.0,2);
  e->setGainAt(2.1,1);
  e->setGainAt(2.0,0);
  e->setGainAt(3.0,4);
  e->setGainAt(2.0,5);
  return e;
}

Activity *initGoHome(State *state,Activity *e,MotorController *mc,Sensor *s1,JointMotor *jm,int lowerHead,float howSleepy)
{
    /* do top level */
```

```
m1.c++

Homeostasis *h = new Homeostasis;

e->initActivity(state,2,"sleep",.000,.01,NULL);

h->init(state,howSleepy,0,e);

//  e->addEndogenousVariable(h);

h->setAutonomousRateFromFreq(.5);
  e->setRateFromDuration(400.0);

e->setGainAt(2.0,0);
  e->setGainAt(2.1,1);
  e->setGainAt(8.0,3);
  e->setGainAt(8.0,4);
  e->setGainAt(8.0,5);

ActivityCollection *level1 = new ActivityCollection;

e->activityCollection = level1;
  e->interest->setRates(1,.005,.005);
  e->interestRate = .006;

/* Sleep */
  SleepActivity *sleepActivity = (SleepActivity *)
    level1->addActivity(new SleepActivity);
  sleepActivity->lowerHead = lowerHead;
  SleepReleaser *sr = new SleepReleaser(s1,MAXRELEASER);

sleepActivity->initActivity(state,0,"sleep",.000,.02, sr);
  e->setConsumatoryActivity(sleepActivity);
  sleepActivity->setUniformGain(1.0);
  sleepActivity->activityCollection = (void *)mc;

/* go home behavior */
  GoHomeReleaser *gra = new GoHomeReleaser(s1,10);
  Activity *gha = (Activity *)buildGoHomeActivity(state, "go-home-to-sleep",
    (MotorController *)mc,(Sensor *)s1,(JointMotor *)jm,(Releaser *)gra);
  gha->addReleaser(new GoNestReleaser(s1,MAXRELEASER));

GoNestActivity *gna = new GoNestActivity;
  gna->initActivity(state,((ActivityCollection *)gha->activityCollection)->c,
  "go to nest",.000,.01, new GoNestReleaser(s1,MAXRELEASER));
  gna->setUniformGain(1.0);
  gna->activityCollection = (void *)mc;
  ((ActivityCollection *)gha->activityCollection)->addActivity(gna);
  ((ActivityCollection *)gha->activityCollection)->initInhibitionLinks();

level1->addActivity(gha);

level1->showState = showState;
  level1->initInhibitionLinks();

return e;
}

Activity *initDeath(State *state,Activity *e,MotorController *mc,Sensor *s1,JointMotor *jm
)
{ e->initActivity(state,6,"DEATH",0,.01,new DeathReleaser(s1,MAXRELEASER*10));
  e->setUniformGain(10.0);
``` m1.c++

```
  e->activityCollection = mc;
  return e;
}

Activity *initForage(State *state,Activity *e,MotorController *mc,Sensor *s1,JointMotor *j
m,
    int foodType)
{

Homeostasis *h = new Homeostasis;

h->init(state,20,.05,NULL);

e->initActivity(state,0,"Forage",.0,.0,new ForageReleaser(s1,MAXRELEASER,foodType));
    e->setUniformGain(3.0);
    e->setGainAt(2.0, 3);

e->interestRate = .0005;
    e->interest->setRates(1, .002, .002);

e->addReleaser(new CarryReleaser(s1,MAXRELEASER,1));
    e->addEndogenousVariable(h);
    //Endogenous *eh =state->findVariableWithTag(ENERGYTAG);
    //e->addEndogenousVariable(eh);

/* do next level */
    ActivityCollection *sys = new ActivityCollection;
    Activity *goForaging = initGoForaging(state,new Activity,mc,s1,jm,300, h);
    Activity *returnFromForaging = initReturnFromForaging(state,new Activity,
        mc,s1,&jm[NECK],h);

e->activityCollection = sys;
    sys->addActivity(goForaging);
    sys->addActivity(returnFromForaging);
    //sys->showState = 1;
    sys->initInhibitionLinks();

return e;
}

Activity *initExplore(State *state,MotorController *mc,Sensor *s1,
                      JointMotor *jm)
{
  Activity *e = buildSearchActivity(state, "explore",-1,mc,s1,jm,
                                    MAXRELEASER*4,DONTCAREWHERE );
  e->tag = 1;
  e->effect = 0;
  e->setUniformGain(2.0);

e->interestRate = .0001;
  e->interest->setRates(1, .001, .001);

/* slowly building variable component
  Homeostasis *h = new Homeostasis;
  h->init(state,0,0,e);
  e->addEndogenousVariable(h);
  h->setAutonomousRateFromFreq(2);
  e->setRateFromDuration(100.0);
  */

/* constant low level desire to wander */
  Homeostasis *h = new Homeostasis;
  h->init(state,10,0,NULL);
  e->addEndogenousVariable(h);
``` m1.c++

```
    return e;
}
Activity *initExplore_pred(State *state,MotorController *mc,Sensor *s1,
                    JointMotor *jm)
{
    Activity *e = buildSearchActivity(state, "explore",-1,mc,s1,jm,
                                MAXRELEASER,DONTCAREWHERE );
    e->tag = 2;
    e->effect = 0;
    e->setUniformGain(2.0);

/* slowly building variable component
    Homeostasis *h = new Homeostasis;
    h->init(state,0,0,e);
    e->addEndogenousVariable(h);
    h->setAutonomousRateFromFreq(2);
    e->setRateFromDuration(100.0);
    */

/* constant low level desire to wander */
    Homeostasis *h = new Homeostasis;
    h->init(state,10,0,NULL);
    e->addEndogenousVariable(h);

return e;
}
ActivityCollection *setupLevel0(State *state,MotorController *mc,Sensor *s1,JointMotor *jm
)
{
    Activity *eat = initEat(state,new Activity,mc,s1,jm,300,(int)MAXENDO/4);
    Activity *drink = initDrink(state,new Activity,mc,s1,jm,200);
    Activity *goHome = initGoHome(state,new Activity,mc,s1,&jm[NECK],1,
                            MAXRELEASER/6.0);
    Activity *ap  = initAntiPredator_extended(state,new AntiPredator,
                                mc,s1,&jm[NECK], 700, 4.0);
    Activity *preen = initPreen(state,new Activity,mc,s1,&jm[NECK]);
    Activity *explore = initExplore(state,mc,s1,jm);
    Activity *death = initDeath(state,new SleepActivity,mc,s1,jm);
    Activity *forage = initForage(state,new Activity,mc,s1,jm, 300);

ActivityCollection  *sys = new ActivityCollection;

sys->addActivity(eat);
    sys->addActivity(drink);
    sys->addActivity(goHome);
    sys->addActivity(ap);
    sys->addActivity(preen);
    sys->addActivity(explore);
    sys->addActivity(death);
    sys->addActivity(forage);
    sys->showState = showState;
    sys->initInhibitionLinks();
    return sys;
}

ActivityCollection *setupLevel0_pred(State *state,MotorController *mc,Sensor *s1,JointMoto
r *jm)
{
    Activity *eat = initEat(state,new Activity,mc,s1,jm,100,(float)MAXRELEASER*2.0);
``` m1.c++

```
// Activity *drink = initDrink(state,new Activity,mc,s1,jm,200);
   Activity *ap  = initAntiPredator_extended(state,new Activity, mc,s1,&jm[NECK], 900, 5.0)
;
// Activity *preen = initPreen(state,new Activity,mc,s1,&jm[NECK]);
   Activity *explore = initExplore_pred(state,mc,s1,jm);

ActivityCollection  *sys = new ActivityCollection;

sys->addActivity(eat);
// sys->addActivity(drink);
// sys->addActivity(goHome);
   sys->addActivity(ap);
   ap->tag = 1;
   eat->interestRate *= .25;
// sys->addActivity(preen);
   sys->addActivity(explore);
   explore->tag = 2;
   sys->showState = showState;
   sys->initInhibitionLinks();
   return sys;
}

ActivityCollection *setupPersonActivity(State *state,MotorController *mc,Sensor *s1,JointM
otor *jm)
{
    ActivityCollection  *sys = new ActivityCollection;
    Activity *forage = initForage(state,new Activity,mc,s1,jm, 300);
    Activity *eat = initEat(state,new Activity,mc,s1,jm,300,(int)2);
    Activity *ap  = initAntiPredator_extended(state,new AntiPredator, mc,s1,&jm[NECK], 700
, 6.0);
    Activity *death = initDeath(state,new SleepActivity,mc,s1,jm);

eat->tag = 1;
    ap->tag = 2;
    death->tag = 3;
    sys->addActivity(forage);
    sys->addActivity(eat);
    sys->addActivity(ap);
    sys->addActivity(death);

sys->initInhibitionLinks();
    return sys;
}
``` misc.c++

```cpp
#include "misc.h"
#include "Activity.h"
#include "ActivityCollection.h"
#include "Action.h"
#include "Endogenous.h"
#include "State.h"
#include "MotorController.h"
#include "JointMotor.h"
#include "PrimitiveActivity.h"
#include "MiscReleasers.h"
#include "TemporalReleasers.h"

#include <stdio.h>
#define MAXRELEASER 50
define MAXENDO 50 extern int showState;

Activity *buildSearchActivity(State *state,char *sstring,int tag,MotorController *mc,Sensor *s1,
    JointMotor *jm,float wat, int ignore)
{
  /* Search */
  Activity *sa = new Activity;
  sa->initActivity(state,2,sstring,0,.01,NULL);

WanderReleaser *wr = new WanderReleaser(s1,wat);
  sa->addReleaser(wr);

/* add lower levels to Search */
  ActivityCollection *level2 = new ActivityCollection;
  sa->activityCollection = level2;
  if(showState)
    level2->showState = 1;

/* first wander (implemented as a general avoid)*/
  WanderReleaser *wrr = new WanderReleaser(s1,MAXRELEASER);
  WanderActivity *wa = (WanderActivity *)
    level2->addActivity(new WanderActivity);
  wa->initWander(state,0,"wander",0,.0,wrr);
  wa->activityCollection = mc;

wa->setUniformGain(1.0);

/* search (uses same releaser as parent */
  SearchActivity *ssa = (SearchActivity *)
    level2->addActivity(new SearchActivity);
  ssa->initActivity(state,1,"move-to-food",0,.0,
                    new SearchReleaser(s1,MAXRELEASER,tag, ignore));

ssa->activityCollection = mc;

ssa->setGainAt(1.5,0);
  ssa->setGainAt(1.4,2);
  ssa->setGainAt(2.0,3);
  ssa->setGainAt(3.0,4);

/* avoid */
  AvoidActivity *aa = (AvoidActivity *)level2->addActivity(new AvoidActivity);
  aa->initAvoid(state,2,"avoid",0,.0,new AvoidReleaser(s1,MAXRELEASER),jm);
  aa->activityCollection = mc;
  aa->setUniformGain(3.0);
  aa->setRecommender(1);
``` misc.c++

```cpp
  level2->initInhibitionLinks();

return sa;
}

Activity *buildGoHomeActivity(State *state,char *sstring,MotorController *mc,
    Sensor *s1,JointMotor *jm, Releaser *gra)
{
  /* Search */
  Activity *sa = new Activity;
  sa->initActivity(state,1,sstring,0,.01,gra);

/* add lower levels to Search */
  ActivityCollection *level2 = new ActivityCollection;
  sa->activityCollection = level2;
  level2->showState = showState;

GoHomeActivity *ssa = (GoHomeActivity *)
    level2->addActivity(new GoHomeActivity);
  ssa->initActivity(state,0,"go home",0,.0,(new  GoHomeReleaser(s1,10)));
  ssa->activityCollection = mc;

ssa->setGainAt(1.4,1);
  ssa->setGainAt(2.0,2);

/* avoid */
  AvoidActivity *aa = (AvoidActivity *)
    level2->addActivity(new AvoidActivity);
  aa->initAvoid(state,1,"avoid",0,.0,new AvoidReleaser(s1,MAXRELEASER),jm);
  aa->activityCollection = mc;
  aa->setUniformGain(6.0);
  aa->setRecommender(1);

/* find opening */
  FindOpeningActivity *foa = (FindOpeningActivity *)
    level2->addActivity(new FindOpeningActivity);
  foa->initActivity(state,2,"find opening",.02,.0,
                    new FindOpeningReleaser(s1,10,0));
  foa->interest->setRates(1,.01,0);
  foa->activityCollection = mc;

foa->setUniformGain(2.0);

/*
  GoNestActivity *gna = new GoNestActivity;
  gna->initActivity(state,3,
  "go to nest",.000,.01, new GoNestReleaser(s1,MAXRELEASER));
  gna->setUniformGain(1.0);
  gna->activityCollection = (void *)mc;
  level2->addActivity(gna);
  */
  level2->initInhibitionLinks();

return sa;
}

Activity *buildFleeActivity(State *state,char *sstring,MotorController *mc,
    Sensor *s1,JointMotor *jm, Releaser *gra)
{
  /* Search */
  Activity *sa = new Activity;
  sa->initActivity(state,1,sstring,0,.01,gra);

/* add lower levels to Search */
``` misc.c++

```
  ActivityCollection *level2 = new ActivityCollection;
  sa->activityCollection = level2;
  level2->showState = showState;

AntiPredatorReleaser *mr = new AntiPredatorReleaser ;
  int ptag = ((AntiPredatorReleaser *)gra)->tag;
  mr->initAntiPredatorReleaser (s1,MAXRELEASER/2.0, TRIGGERRELEASER,48,ptag );

FleeActivity *ssa = (FleeActivity *)
    level2->addActivity(new FleeActivity);
  ssa->initActivity(state,0,"flee",0,.0,mr);
  ssa->activityCollection = mc;

ssa->setGainAt(1.4,1);
  ssa->setGainAt(2.0,2);

/* avoid */
  AvoidActivity *aa = (AvoidActivity *)
    level2->addActivity(new AvoidActivity);
  aa->initAvoid(state,1,"avoid",0,.0,new AvoidReleaser(s1,MAXRELEASER),jm);
  aa->activityCollection = mc;
  aa->setUniformGain(6.0);
  aa->setRecommender(1);

level2->initInhibitionLinks();

return sa;
}

Activity *buildFollowActivity(State *state,char *sstring,int tag,MotorController *mc,Senso
r *s1,
    JointMotor *jm,float wat, int ignore)
{
  /* search (uses same releaser as parent */
  SearchActivity *ssa = (SearchActivity *)new SearchActivity;
  ssa->initActivity(state,0,"move-to-food",0,.0,
                    new SearchReleaser(s1,MAXRELEASER,tag, ignore));

ssa->activityCollection = mc;

ssa->setGainAt(1.5,1);
  return ssa;
}
``` misc.h

```
#ifndef MISC
#define MISC
#include "Activity.h"
#include "State.h"
#include "MotorController.h"
#include "JointMotor.h"
#include "Sensor.h"
#include "Releaser.h"

Activity *buildSearchActivity(State *state,char *sstring,
    int tag,MotorController *mc,Sensor *sl,JointMotor *jm,float wat, int ignore);
Activity *buildGoHomeActivity(State *state,char *sstring,MotorController *mc,
    Sensor *sl,JointMotor *jm, Releaser *gra);
Activity *buildFollowActivity(State *state,char *sstring,int tag,MotorController *mc,Sensor *sl,
    JointMotor *jm,float wat, int ignore);
Activity *buildFleeActivity(State *state,char *sstring,MotorController *mc,
    Sensor *sl,JointMotor *jm, Releaser *gra);
#endif
```

TemporalReleasers.c++

```cpp
#include "TemporalReleasers.h"
#include <stdlib.h>
include <stdio.h>
#include "Activity.h"
#include "Sensor.h"
#include "nexttypes.h"
#include "Wall.h"
#include "TextGauge.h"
extern TextGauge *tg1;
extern Gate *gate;

TemporalReleaser::TemporalReleaser()
{
  pname = NULL;
  sensor = NULL;
  minValue = 0;
  maxValue = 1e6;
} void TemporalReleaser::initTemporalReleaser(void *aSensor,float mv,int t,int p)
{
  Releaser::init(aSensor,mv);
  type = t;
  period = p;
  if(type == SUMMINGRELEASER){
    hist = new float[(int)period+1];
    next = 0;
    int i;
    for(i=0;i<(int)period;i++)
      hist[i] = 0;
  }
  else{
    hist = new float;
    if(type == AVGINGRELEASER)
        period = 1/period;
  }
} void TemporalReleaser::adjustValueFromHistoryAt(int t)
{
  int i,ip;

lastAdjustedAt = t;
  if(type == SUMMINGRELEASER){
    ip = period;
    hist[next] = value;
    next++;
    next = next % ip;
    for(value = 0,i=0;i<ip;i++)
      value += hist[i];
  }
  else if(type == AVGINGRELEASER){
    value = hist[0] *(1-period) + period*value;
    hist[0] = value;
  }
  else if(type == TRIGGERRELEASER){
    if(maxValueAt < t - period)
        hist[0] = value;
    else {
        hist[0] = MAX(hist[0], value);
        value = hist[0];
        maxValueAt = t;
    }
    // printf("value -> %f \n", value);
```

TemporalReleasers.c++

```
    }
} float TemporalReleaser::updateStateAt(int t)
{
  if((lastAdjustedAt != t)&&(type != STDRELEASER))
     adjustValueFromHistoryAt(t);
  Releaser::updateStateAt(t);
  return value;
} void MovementReleaser::initTemporalReleaser(void *aSensor,float mv,int type,int period)
{
   TemporalReleaser::initTemporalReleaser(aSensor,mv,SUMMINGRELEASER,period);
   pname = "MovementReleaser";
   maxValueAt = 0;
   tag = 100;
} float MovementReleaser::updateStateAt(int t)
{
   Creature *cmt = sensor->getClosestMovingCreature();
   Creature *p = (Creature *)sensor->parent;
   SbVec3f r;
   float dist;

if(cmt && cmt->tag != p->tag){
      r = p->bXa.r - cmt->bXa.r;
      dist = r.length();
      value = maxValue/(dist);
   }
   else
      value = minValue;
   TemporalReleaser::updateStateAt(t);
   return value;
} void AntiPredatorReleaser::initAntiPredatorReleaser(void *aSensor,float mv,int type,int period, int predtag)
{
   TemporalReleaser::initTemporalReleaser(aSensor,mv,SUMMINGRELEASER,period);
   pname = "AntiPredatorReleaser";
   maxValueAt = 0;
   tag = predtag;
} float AntiPredatorReleaser::updateStateAt(int t)
{
   Creature *p=NULL;
   targetInfo *pred = sensor->getClosestTargetWithTag(tag);
   if(pred){
      value = maxValue/(pred->range/4.0);
      closestPredator = pred->who;
   }
   else { closestPredator  = sensor->getClosestMovingCreature();
      p = (Creature *)sensor->parent;
      SbVec3f r;
      float dist;

if(closestPredator && closestPredator->tag == tag &&
         ((gate == NULL)||(gate && !(gate->isCaged(closestPredator))))){
```

TemporalReleasers.c++

```
        r = p->bXa.r - closestPredator->bXa.r;
        dist = r.length();
        value = maxValue/(dist/4.0);
    }
    else{
        closestPredator = NULL;
        value = minValue;
    }
 }
 TemporalReleaser::updateStateAt(tag);
 if(p && (p->tag == 700)&&value>minValue)
   printf("anti-predator -> %f \n", value);
 return value;
}
```

TemporalReleasers.h

```c
#ifndef TRELEASER
define TRELEASER define STDRELEASER 0
define AVGINGRELEASER 1
#define SUMMINGRELEASER 2
#define TRIGGERRELEASER 3
#include "Releaser.h"
#include "Activity.h"
class Sensor;
class Creature;

class TemporalReleaser:public Releaser {
 protected:
   int type;
   float *hist;
   int next;
   float period;
   int lastAdjustedAt;
   int maxValueAt;
   void adjustValueFromHistoryAt(int t);
 public:
   TemporalReleaser();
   virtual void initTemporalReleaser(void *aSensor,
                                     float mv,int type,int period);
   virtual float updateStateAt(int t);
};

class MovementReleaser: public TemporalReleaser{
 public:
   void initTemporalReleaser(void *aSensor,
                             float mv,int type,int period);
   float updateStateAt(int t);
};

class AntiPredatorReleaser: public TemporalReleaser{
 public:
   Creature *closestPredator;
   void initAntiPredatorReleaser(void *aSensor,
                                 float mv,int type,int period, int predTag);
   float updateStateAt(int t);
};

#endif
```

Sensor.c++

```cpp
#include <Inventor/actions/SoGetMatrixAction.h>
#include <Inventor/actions/SoGetBoundingBoxAction.h>
#include "nexttypes.h"
#include "Sensor.h"
#include "Creature.h"
#include "Food.h"
#include <math.h>
#include "Brio.h"
#include "List.h"
#include <Inventor/SbLinear.h>
#include <Inventor/SbViewportRegion.h>
#include <Inventor/nodes/SoCube.h>
#include "Person.h"

extern Brio *globalBrio;
extern int showTiming;
int sdebug = 0;
static int bboxtest = 0;
targetInfo personData;

void Sensor::initSensor(int sense, float cornerTolerance, float minr, float maxr)
{
    coneAngle = M_PI;

maxRange = maxr;
    minRange = minr;
    rad = 8.0;
    rayCount = 15;
    showActiveArea = 0;
    type = 1;
    parent = NULL;
    marker = NULL;
    cacheRays(sense);
    tstats = new Timestat("cast rays", 100);
    ignoreList = new List;
    cornerTol = cornerTolerance;
    return;
} void Sensor::cacheRays(int sense)
{
  float ang,delta;
  int j;

/* calculate ray delta */
  delta = coneAngle/(rayCount-1);

for(ang=(M_PI/2)-coneAngle/2,j=0;ang<=((M_PI/2)+coneAngle/2 + .1);
  ang+=delta,j++){

/* calc direction of ray */
    rayTargets[j].ld[sense] = -1*cos(ang);
    rayTargets[j].ld[2-sense] = sin(ang);
    rayTargets[j].ld[1] = 0;
  }
} void Sensor::setConeAngle(float ca)
{
    coneAngle = ca;
    return;
} void Sensor::setMaxRange( float ca)
```

Sensor.c++

```
{
    maxRange = ca;
    return;
} int Sensor::getRange(float *r)
{
    if(detected)
        *r = range;
    return detected;
} int Sensor::getBearing(float *r)
{
    if(detected)
        *r = bearing;
    return detected;
} void Sensor::setShowActiveArea(int yn)
{
    showActiveArea = yn;
    return;
} int Sensor::testForCornerAt(int i)
{
    if(i== (rayCount-2)|| (i==0)||
       !(rayTargets[i-1].who &&
         rayTargets[i].who &&
         rayTargets[i+1].who &&
         rayTargets[i+2].who))
        return 0;
    else{
        SbVec3f s1 = (rayTargets[i].rayPoint - rayTargets[i-1].rayPoint);
        SbVec3f s2 = (rayTargets[i+2].rayPoint - rayTargets[i+1].rayPoint);
        s1.normalize();
        s2.normalize();
        float tcos = s1.dot(s2);
        //printf("tcos %f \n", tcos);
        if(fabs(tcos)<.05){
            rayTargets[i].corner = 1;
            return i;
        }
        else{
            rayTargets[i].corner = 0;
            return 0;
        }
    }
} int Sensor::mapCorner(float &distToCorner)
{
    int i;
    Creature *dad = (Creature *)parent;
    int fndOne = 0, fndRange = 1e6, fi=0;
    for(i=1;i<rayCount-2;i++){
        fndOne = testForCornerAt(i);
        if(fndOne && rayTargets[fndOne].range<fndRange){
            SbLine l1, l2;
            l1.setValue(rayTargets[i-1].rayPoint,rayTargets[i].rayPoint);
            l2.setValue(rayTargets[i+1].rayPoint,rayTargets[i+2].rayPoint);
            SbVec3f p1, p2;
            l1.getClosestPoints(l2, p1, p2);
```

Sensor.c++

```
            dad->vecToBody(&p1);
            bXa.multVec(&p1);
            distToCorner = p1.length();
            if(distToCorner<fndRange){
                fi = fndOne;
                fndRange = distToCorner;
            }
        }
    }
    if(fi){ if((distToCorner - rayTargets[fi].range  -cornerTol)&&distToCorner<cornerTol){
            //printf("corner at %f %f \n", p2[0], p2[2]);
            }
/*
        else if(fabs(distToCorner-rayTargets[fi].range)-cornerTol){
            fi = 0;
            printf("false corner \n");
        }
*/
        }
    return fi;
} int Sensor::isInCorner()
{
    // changed corner tolerance to 1.9
    return (closestCorner && closestCornerDistance<cornerTol)?closestCorner:0;
} void Sensor::addMarker()
{
    SoShapeKit *marker = new SoShapeKit();
    SoCube *cube = new SoCube;
    cube->height =.3; cube->width= .3 ; cube->depth =.3;
    marker->setPart("shape",cube);

marker->set("transform {translation 0  0  5}");
    marker->set("material {ambientColor .0 .0 .8}");
    marker->set("material {diffuseColor 0 0 .8}");
    marker->set("material {specularColor .4 .4 .4}");
    marker->set("material {shininess .1}");

globalBrio->addAMarker(marker);
} void Sensor::moveMarkerTo(SbVec3f np)
{
  SoTransform *xf = SO_GET_PART(marker,"transform",SoTransform);
  xf->translation = np;
  return;
} targetInfo *Sensor::getClosestTarget()
{
  return (closestTarget<0)?NULL :&rayTargets[closestTarget];
} float Sensor::getClosestRangeBetween(int b, int e)
{
    float minD = 1.0e6;
    int i;
```

Sensor.c++

```
    for(i=b;i<e;i++){
        if(rayTargets[i].range <minD)
            minD = rayTargets[i].range;
    }
    return minD;
}
targetInfo *Sensor::getClosestMovingTarget()
{
  int i,mdo = -1;
  float md = 1e6;

if(rayCount){
    for(i=0;i<rayCount;i++){
      if((rayTargets[i].range < md)&&rayTargets[i].who->isMoving()){
        mdo = i;
        md = rayTargets[i].range;
      }
    }
  }
  return (mdo>-1)? &rayTargets[mdo] : NULL;
}

Creature *Sensor::getClosestMovingCreature()
{
  int i,mdo = -1;
  float md = 1e6;
  Creature *dad = (Creature *)parent;
  SbVec3f r;
  float dist;

Creature *pc;

for(i=0;i<globalBrio->creatureCount;i++){
    pc = globalBrio->creatures[i];
    if(pc != dad){
      if(pc->isMoving()){
        mdo = i;
        r = dad->bXa.r - pc->bXa.r;
        dist = r.length();
        md = (dist<md)?dist : md;
      }
    }
  }
  return ((mdo>-1)&& (md<maxRange*2))? globalBrio->creatures[mdo] : NULL;
} targetInfo *Sensor::getClosestTargetWithTag(int t)
{
  int i,mdo = -1;
  float md = 1e6;

if(rayCount){
    for(i=0;i<rayCount;i++){
      if((rayTargets[i].range < md)&&rayTargets[i].who->tag == t){
        mdo = i;
        md = rayTargets[i].range;
      }
    }
  }
  if((t == 900)&&(mdo<0))
  {
      float r;
      personData.who = getClosestBodyPart(&r);
```

Sensor.c++

```cpp
      if(personData.who){
          personData.range = r;
      }
      return (personData.who)?&personData : NULL;
  }
  return (mdo>-1)? &rayTargets[mdo] : NULL;
} targetInfo *Sensor::getBestTargetWithTag(int t)
{
  int i,mdo = -1;
  float md = 1e6, bestRatio=0, tmpRatio;
  Food *food;

if(rayCount){
    for(i=0;i<rayCount;i++){
      if(rayTargets[i].who && rayTargets[i].who->tag == t){
        food = (Food *)rayTargets[i].who;
        tmpRatio = food->foodValue/rayTargets[i].range;
        if(tmpRatio>bestRatio){
          bestRatio = tmpRatio;
          mdo = i;
          md = rayTargets[i].range;
        }
      }
    }
  }
  if((t == 900)&&(mdo<0))
  {
      float r;
      personData.who = getClosestBodyPart(&r);
      if(personData.who){
          personData.range = r;
      }
      return (personData.who)?&personData : NULL;
  }
  return (mdo>-1)? &rayTargets[mdo] : NULL;
}

Creature *Sensor::getClosestBodyPart(float *r)
{
    Person *p = (Person *)globalBrio->findCreatureWithTag(910);
    float md = 1.0e6, nd;
    int i, cp;
    if(p!= NULL){
        if(p->theBodyParts[0]->isExtended() &&
           !p->theBodyParts[1]->isExtended()){
            cp = 0;
            nd = (p->theBodyParts[0]->bXa.r - parent->bXa.r).length();
        }
        else if(p->theBodyParts[1]->isExtended() &&
           !p->theBodyParts[0]->isExtended()){
            cp = 1;
            nd = (p->theBodyParts[1]->bXa.r - parent->bXa.r).length();
        }
        else {
            for(i=0;i<2;i++){
                nd = (p->theBodyParts[i]->bXa.r - parent->bXa.r).length();
                if(nd<md){
                    md = nd;
                    cp = i;
                }
            }
        }
```

Sensor.c++

```cpp
        *r = nd;
        return  p->theBodyParts[cp] ;
    }
    else return NULL;
} void Sensor::castRays(float t)
{
    SbVec3f p,so,ld,lu;
    float delta,ang,len;
    Creature *creatureList[32];
    Creature **cl;
    int creaturesInRange = 0;

int i, infront,j;
    Creature *dad = (Creature *)parent;
    cl=(Creature **)globalBrio->creatures;
    const SbViewportRegion vp = globalBrio->currentViewer->getViewportRegion();
    if(bboxtest){
        SbVec3f m1,m2;

/* create a bounding box for the sensors range */
        m1 = bXa.r;
        m2 = bXa.r;

m2[2] += maxRange;
        m1[0] += -cos((M_PI/2)-coneAngle/2)*maxRange;
        m2[0] = -m1[0];
        m1[1] = -10;
        m2[1] = 10;
        SbBox3f bb = SbBox3f(m1,m2);
        SoGetMatrixAction *ma = new SoGetMatrixAction(vp);

ma->apply(dad->bodyTransform);
        bb.transform(ma->getMatrix());

/* find creatures in range */
        SoGetBoundingBoxAction *bbaction = new SoGetBoundingBoxAction(vp);

for(i=0;i<globalBrio->creatureCount;i++){
          if((cl[i] != dad) && (!ignoreList->find(cl[i]))){
            bbaction->apply(cl[i]->body);
            if(bb.intersect(bbaction->getBoundingBox())){
                creatureList[creaturesInRange++]=cl[i];
            }
          }
        } delete bbaction;
        delete ma;
    }
    else{
        for(i=0;i<globalBrio->creatureCount;i++){
          if((cl[i] != dad) && (!ignoreList->find(cl[i])))
            creatureList[creaturesInRange++]=cl[i];
        }
    }

//    printf("creatures in range %d \n",creaturesInRange);

/* convert sensor origin to world */
    lu = bXa.r;
    dad->vecToWorld(&lu);
    lu[1]=.1;
```

Sensor.c++

```
  /* calculate ray delta */
  delta = coneAngle/14;

/* for each ray */
  for(ang=(M_PI/2)-coneAngle/2,j=0;ang<=((M_PI/2)+coneAngle/2 + .1);
      ang+=delta,j++){ ld = rayTargets[j].ld;

dad->bXa.e.multVecMatrix(ld,ld);
    ld +=lu;

/* initialize ray info */
    rayTargets[j].who = NULL;
    rayTargets[j].range = 1e6;
    rayTargets[j].bearing = ang;
    rayTargets[j].color = 1;

/* now for each object in world */
    for(i=0;i<creaturesInRange;i++){
      if(creatureList[i]!= dad){
        if((infront = creatureList[i]->getIntersection(&p,&lu,&ld))>=0){
          //len = (p-lu).length();
          len = (p[0]-lu[0])*(p[0]-lu[0])+ (p[2]-lu[2])*(p[2]-lu[2]);

if(len<maxRange*maxRange && len<rayTargets[j].range){
            rayTargets[j].who = creatureList[i];
            rayTargets[j].range = len;
            rayTargets[j].rayPoint = p;
            rayTargets[j].color = globalBrio->getColor(p);
          }
          else if(len<rayTargets[j].range)
            rayTargets[j].color = globalBrio->getColor(p);
        }
      }
    }
    if(sdebug)
      printf("range on ray %f is %f \n",ang,rayTargets[j].range);
  }
  /* ok now summarize the information */
  range = 1e6;
  detected = 0;
  for(i=0;i<rayCount;i++){
    if(rayTargets[i].who){
      detected = 1;
      rayTargets[i].range = sqrt(rayTargets[i].range);
      if(rayTargets[i].range<range){
        closestTarget = i;
        range = rayTargets[i].range;
        bearing = rayTargets[i].bearing;
      }
    }
  }
  closestCorner = mapCorner(closestCornerDistance);
} void Sensor::updateStateAt(float t)
{
  if(Brio::showTiming) tstats->startTime();
  focusOfAttention = NULL;
  castRays(t);
  if(Brio::showTiming) tstats->endTime();
}
```

Sensor.h

```
#ifndef SENSOR
#define SENSOR
#include "Component.h"
#include "Creature.h"
#include <Inventor/nodekits/SoShapeKit.h>
#include "SensorDefs.h"

typedef struct _ts{
    Creature *who;
    float bearing;
    float range;
    int color;
    int corner;
    SbVec3f rayPoint;
    SbVec3f ld;
}targetInfo;

class List;

class Sensor :public Component
{
    public:
    float coneAngle;
    float maxRange;
    float minRange;
    float rad;
    int sensorType;
    float range;
    float bearing;
    int detected;
    int showActiveArea;
//     targetInfo rayTargets[16];
    targetInfo rayTargets[sensorMaxRays];             /* Foner 5 Jul 94, for puppet sens
or fan extension. */
    int rayCount;
    int closestTarget;
    SoShapeKit *marker;
    List *ignoreList;
    Creature *focusOfAttention;
    SbVec3f focusPt;
    int closestCorner;
    float closestCornerDistance;
    float cornerTol;

// methods
    void initSensor(int sense = 0, float cornerTolerance = 2.1, float minr = 2.0, float ma
xr = 30);
    void setConeAngle(float ca);
    void setMaxRange( float ca);
    int getRange(float *r);
    int getBearing(float *r);
    void setShowActiveArea(int yn);
    void castRays(float t);
    void updateStateAt( float t);
    void addMarker();
    void moveMarkerTo(SbVec3f np);
    targetInfo *getClosestMovingTarget();
    targetInfo *getClosestTarget();
    virtual targetInfo *getClosestTargetWithTag(int t);
    virtual targetInfo *getBestTargetWithTag(int t);
    Creature *getClosestMovingCreature();
    float getClosestRangeBetween(int b, int e);
    Creature *getClosestBodyPart(float *r);
    void cacheRays(int sense);
```

Sensor.h

```
    int isInCorner();
    int mapCorner(float &distToCorner);
    int testForCornerAt(int i);
};

#endif
``` forage.c++

```cpp
#include "m1.h"
#include "Activity.h"
#include "ActivityCollection.h"
#include "Action.h"
#include "Endogenous.h"
#include "State.h"
#include "MotorController.h"
#include "JointMotor.h"
#include "PrimitiveActivity.h"
#include "ForagingReleasers.h"
#include "MiscReleasers.h"
#include "TemporalReleasers.h"
#include "misc.h"
#include "forage.h"

#include <stdio.h>
#define MAXRELEASER 50
define MAXENDO 50 extern int showState;

Activity *initForageScratch(State *state,MotorController *mc,Sensor *s1,JointMotor *jm,int
 lowerHead)
{
  /* do top level */

Homeostasis *h = new Homeostasis;

/* Scratch */
  SleepActivity *scratch = new SleepActivity;
  scratch->lowerHead = lowerHead;
  ForageScratchReleaser *sr = new ForageScratchReleaser(s1,MAXRELEASER, 900);

scratch->initActivity(state,4,"scratch",.000,.02, sr);
  scratch->setUniformGain(2.0);
  scratch->activityCollection = (void *)mc;
  return scratch;
}

Activity *initForageBeg(State *state,Activity *e,void *mc,
    Sensor *s1,void *jm)
{
  Homeostasis *h = new Homeostasis;

e->initActivity(state,3,"beg",.000,.001,new ForageBegReleaser(s1,MAXRELEASER,900));

//   h->init(state,5,0,e);
//   h->setAutonomousRateFromFreq(.5);
//   e->setRateFromDuration(64.0);
//   e->addEndogenousVariable(h);

/* do next level */
  ActivityCollection *level1 = new ActivityCollection;
  e->activityCollection = level1;

PrepPreen *pp = (PrepPreen *)level1->addActivity(new PrepPreen);
  pp->initPrepPreen(state,0,"prep-preen",0,.0,
                    (new PrepPreenReleaser(s1,MAXRELEASER/2)),jm);
  pp->activityCollection = mc;

PreenActivity *pa = (PreenActivity *)level1->addActivity
    (new PreenActivity);
  pa->initPreenActivity(state,1,"prep",0,.0,
``` forage.h

```
#ifndef FORAGE
define FORAGE class State;
class Activity;
class MotorController;
class Sensor;
class Homeostasis;
class JointMotor;

Activity *initGoForaging(State *state,Activity *e,MotorController *mc,
    Sensor *sl,JointMotor *jm,int foodType, Homeostasis *h);

Activity *initReturnFromForaging(State *state,Activity *e,MotorController *mc,
    Sensor *sl,JointMotor *jm, Homeostasis *h);

#endif
``` forage.c++

```
                        (new PreenReleaser(s1,MAXRELEASER/2)),jm);
  pa->activityCollection = mc;

level1->initInhibitionLinks();

return e;
}

/* initGoForaging sets up the sub-tree for exploring for food and
 * picking it up. The root depends on 1 endogenous variable (h) which is
 * passed down from the parent. It also relies on a interest to provide
 * a finite duration to this phase. It does not adjust h.
 */

Activity *initGoForaging(State *state,Activity *e,MotorController *mc,
    Sensor *s1,JointMotor *jm,int foodType, Homeostasis *h)
{
  /* do top level */ e->initActivity(state,0,"forage_search",.00005,.001,new ForageReleaser(s1,MAXRELEASER,fo
odType));
  e->interest->autonomousRate = .0001;
  e->addEndogenousVariable(h);
  h->addAffectedBy(e,&e->effect);
  e->setGainAt(1.2,1);

/* do next level */
  ActivityCollection *level1 = new ActivityCollection;
  e->activityCollection = level1;

/* probe (only outside nest) */
  ProbeActivity *pa = (ProbeActivity *)level1->addActivity
      (new ProbeActivity);
  pa->initProbe(state,0,"probe",0,0,
                new ForageProbeReleaser(s1,MAXRELEASER,foodType),jm);
  pa->activityCollection = mc;
  pa->setUniformGain(2.0);
  pa->setGainAt(1,1);

/* pickup food */
  PickupActivity *ca = (PickupActivity *)level1->addActivity(new PickupActivity);
  ca->initActivity(state,1,"pick-up food",0,.02,
                new PickupReleaser(s1,jm,MAXRELEASER,foodType));
  ca->activityCollection = mc;

ca->setUniformGain(2.0);
  ca->setGainAt(4.0,3);

/* build generic search */
  Activity *sa = level1->addActivity(buildSearchActivity
                                     (state, "search-for-food",
                                      foodType,mc,s1,jm,MAXRELEASER*6, DONTCAREWHERE));

level1->addActivity(initForageBeg(state,new Activity,mc,s1,jm));

level1->addActivity(initForageScratch(state,mc,s1,jm,1));

level1->showState = showState;
  level1->initInhibitionLinks();

return e;
``` forage.c++

```
}
Activity *initReturnFromForaging(State *state,Activity *e,MotorController *mc,
    Sensor *s1,JointMotor *jm, Homeostasis *h)
{
  /* do top level */

/* The carry releaser indicates how full the cheeks are */
  e->initActivity(state,1,"return from",.000,.01,
    (new CarryReleaser(s1,MAXRELEASER*2,1)));

e->setGainAt(2.0,0);

ActivityCollection *level1 = new ActivityCollection;

e->activityCollection = level1;

/* Put down food at hoard */
  PutdownActivity *putDownActivity = (PutdownActivity *)
    level1->addActivity(new PutdownActivity);

PutDownReleaser *sr = new PutDownReleaser(s1,MAXRELEASER);

putDownActivity->initActivity(state,0,"put-down-food",.000,.01, sr);
  putDownActivity->setUniformGain(1.0);
  putDownActivity->activityCollection = (void *)mc;

h->addAffectedBy(putDownActivity,&putDownActivity->effect);

putDownActivity->setRateFromDuration(2.0);

/* go home behavior */
  GoHomeReleaser *gra = new GoHomeReleaser(s1,10);
  Activity *gha = (Activity *)buildGoHomeActivity(state, "return-to-hoard",
    (MotorController *)mc,(Sensor *)s1,(JointMotor *)jm,(Releaser *)gra);
  gha->addReleaser(new GoHoardReleaser(s1,MAXRELEASER, 300));

GoHoardActivity *gna = new GoHoardActivity;
  gna->initActivity(state,((ActivityCollection *)gha->activityCollection)->c,
  "go to hoard",.000,.01, new GoHoardReleaser(s1,MAXRELEASER, 300));
  gna->setUniformGain(2.0);
  gna->activityCollection = (void *)mc;
  ((ActivityCollection *)gha->activityCollection)->addActivity(gna);
  ((ActivityCollection *)gha->activityCollection)->initInhibitionLinks();

level1->addActivity(gha);
  level1->showState = showState;
  level1->initInhibitionLinks();

return e;
```

What is claimed is:

1. A system for facilitating real-time interaction between a user and a digitally represented visual environment within which the user's moving image is integrated, the system comprising:
   a. imaging means for digitizing, into an array of multichromatic pixels, the full-body pictorial image of a user and a background, the user being physically displaced from the imaging means by a depthwise distance;
   b. an isolator for separating the user's image from the background;
   c. wireless means for ascertaining the depthwise distance between the user and the imaging means;
   d. means for generating a visual display showing objects;
   e. an integrator for introducing the user's digitized image into the visual display such that the user's image occludes any overlapping objects having depth parameters greater than the user's depthwise distance, and is occluded by any overlapping objects having depth parameters less than the user's depthwise distance.

2. The system of claim 1 wherein the visual-display generation means comprises means for rendering objects on the visual display such that objects having depth parameters less than those of overlapping objects occlude the overlapping objects.

3. The system of claim 1 wherein the user's side-to-side position relative to the imaging means determines the side-to-side location, within the visual display, at which the integrator introduces the user's image.

4. The system of claim 1 further comprising:
   a. a two-dimensional display screen; and
   b. a localization module for ascertaining the user's three-dimensional location relative to the imaging means;
   wherein
   c. the visual-display generation means renders a graphical environment on the display screen in a manner that simulates three dimensions; and
   d. the integrator introduces the user's image at a location within the graphical environment determined by the user's three-dimensional location relative to the imaging means.

5. The system of claim 4 wherein the localization module determines the user's three-dimensional location based on recording, by the imaging means, of a ground plane and the user's image thereon, and transformation of the recording based on calibration of the imaging means.

6. The system of claim 1 wherein the isolator operates by means of vision-based background subtraction.

7. The system of claim 6 wherein the isolator comprises a processor for:
   a. analyzing digitized images of the background, without the user, to determine mean values for each background pixel; and
   b. scanning a current digitized image that includes the user in order to designate, as pixels representative of the user, pixels having values that differ significantly from the mean values of corresponding background pixels.

8. The system of claim 1 further comprising means for analyzing the user's image to identify feature regions corresponding at least to the user's hands, feet, head and center of mass.

9. The system of claim 7 wherein the user's image includes an edge contour and the feature-analysis means associates feature classifications with regions of high curvature along the contour.

10. The system of claim 8 wherein the feature-analysis means classifies features, each having a high-curvature region that itself has a centroid location positioned within a two-dimensional coordinate plane, based on the position of the centroid location.

11. The system of claim 10 wherein the feature-analysis means analyzes the centroid position relative to other portions of the edge contour.

12. The system of claim 10 wherein the feature-analysis means analyzes the centroid position relative to a bounding box.

13. The system of claim 1 further comprising a gestural decoder for analyzing the user's image to detect gestures.

14. The system of claim 13 further comprising means for analyzing the user's image to identify feature regions corresponding at least to the user's hands, feet and head, and wherein the gestural decoder compares successively digitized user images to detect specific movement patterns of at least one feature region.

15. The system of claim 1 further comprising means for generating, for presentation on the visual display by means of the integrator, agents having controllable positions and appearances, the generating means including means for updating the position and appearance of each agent based on (i) the location in the visual display where the user is introduced, and (ii) the location in the visual display where the agent is presented.

16. The system of claim 15 further comprising a location-tracking module that specifies, for each agent, the location in the visual display of the agent and its three-dimensional distance from the user and each displayed object.

17. The system of claim 15 further comprising a gestural decoder for analyzing the user's image to detect gestures, and wherein an agent is updated based further on detected gestures.

18. The system of claim 15 further comprising:
   a. a modeling database containing parameters specifying (i) a repertoire of activities, (ii) a range of permitted movements and appearances, (iii) an activity-selection model, and (iv) parameters each specifying an instantaneous importance associated with the activities, the parameters being variable over time; and
   b. an activity generator for controlling the appearance and position of agent based on (i) the location in the visual display where the user is introduced, (ii) the location in the visual display where the agent is presented and (iii) the contents of the modeling database.

19. The system of claim 18 wherein the modeling database further includes parameters specifying a set of motivational variables that themselves specify a numeric value associated with an agent activity and which may vary over time.

20. The system of claim 18 wherein the activity generator updates an agent based also on user gestures.

21. The system of claim 18 wherein the activity generator updates an agent based also on sounds made by the user.

22. The system of claim 18 wherein the modeling database further includes numeric values associated with each activity, each numeric value specifying an instantaneous importance associated with the activity.

23. The system of claim 22 wherein the modeling database further includes parameters specifying fatigue factors that reduce, over time, the numeric activity values associated with current activities.

24. The system of claim 22 wherein the activity generator periodically updates the values associated with each activity.

25. The system of claim 18 wherein the activity generator also produces sound.

26. The system of claim 1 wherein the image of a user digitized by the imaging means includes an edge contour, and further comprising:
   a. a modeling module for identifying regions of high curvature along the contour, and classifying at least some of the high-curvature regions as body features; and
   b. a gestural decoder for analyzing the classified features over time to detect gestures.

27. The system of claim 26 wherein the modeling module identifies a feature classification based on the position of a centroid location of the high-curvature region within a two-dimensional coordinate plane.

28. The system of claim 27 wherein the modeling module analyzes centroid position relative to other portions of the edge contour.

29. The system of claim 27 wherein the modeling module analyzes centroid position relative to a bounding box.

30. The system of claim 26 wherein the body features classified by the modeling module include hands, feet, head and center of mass, and wherein the gestural decoder compares successively digitized user images to detect movement of at least one feature region.

31. A method for facilitating real-time interaction between a user and a digitally represented visual environment within which the user's moving image is integrated, the method comprising the steps of:
   a. digitizing, into an array of multichromatic pixels, the full-body pictorial image of a user and a background;
   b. isolating the user's image from the background;
   c. wirelessly ascertaining a depthwise distance between the user and a reference point and associating with the user a depth parameter representative of the depthwise distance;
   d. generating, on a digital output device, a visual display showing objects having depth parameters associated therewith; and
   e. introducing the user's digitized image into the visual display such that the user's image occludes any overlapping objects having depth parameters greater than that of the user, and is occluded by any overlapping objects having depth parameters less than that of the user.

32. The method of claim 31 wherein the generation step further comprises the substep of rendering objects on the visual display such that objects having depth parameters less than those of overlapping objects occlude the overlapping objects.

33. The method of claim 31 wherein the user's side-to-side position relative to the imaging means determines the side-to-side location, within the visual display, at which the user's image is introduced.

34. The method of claim 31 wherein:
   a. the user is associated with a two-dimensional location as well as the depth parameter, thereby specifying an actual three-dimensional user location;
   b. the visual display is generated in a manner that simulates three dimensions; and
   c. the user's image is introduced at a location within the graphical environment determined by the the specified three-dimensional user location.

35. The method of claim 31 wherein the user is isolated by means of vision-based background subtraction.

36. The method of claim 35 wherein the user is isolated according to steps comprising:
   a. analyzing digitized images of the background, without the user, to determine mean values for each background pixel;
   b. scanning a current digitized image that includes the user to designate, as current pixels representative of the isolated user, pixels whose values differ significantly from the mean values of corresponding background pixels.

37. The method of claim 36 wherein each pixel has at least one color associated therewith and further comprising the steps of:
   a. for each background pixel, determining a mean luminance value of the at least one color associated with the background pixel;
   b. for each current pixel, determining a luminance value of the at least one color associated with the current pixel; and
   c. designating a current pixel as representative of the isolated user if any color luminance value associated with the current pixel differs from the corresponding mean color luminance value of the corresponding background pixel by at least a fixed threshold.

38. The method of claim 36 further comprising the step of designating a pixel as representative of the isolated user if its luminance value differs from a mean luminance value of the corresponding background pixel by at least a fixed luma threshold.

39. The method of claim 35 wherein the user is isolated according to steps comprising:
   a. identifying at least one foreground pixel of a current image based on difference in luminance between the foreground pixel and a mean luminance value derived from corresponding pixels from a plurality of previous images;
   b. examining eight pixels neighboring the foreground pixel to identify, based on a luminance difference between the neighboring pixel and a mean luminance value derived from corresponding pixels from a plurality of previous images, each of the eight pixels as a foreground pixel or a background pixel;
   c. repeating step (b) for each neighboring pixel identified as foreground; and
   d. repeating steps (b) and (c) until no further foreground pixels are identified.

40. The method of claim 31 further comprising the step of analyzing the user's image to identify feature regions corresponding at least to the user's hands, feet, head and center of mass.

41. The method of claim 40 further comprising the steps of identifying an edge contour around the user's image and associating feature classifications with regions of high curvature along the contour.

42. The method of claim 41 wherein the feature regions each have a high-curvature region that itself has a centroid location positioned within a two-dimensional coordinate plane, and the step of associating feature classifications is carried out based on the position of the centroid location.

43. The method of claim 42 further comprising the step of analyzing centroid position relative to other portions of the edge contour.

44. The method of claim 42 further comprising the step of analyzing centroid position relative to a bounding box.

45. The method of claim 31 further comprising the steps of:
   a. generating, for presentation on the visual display, agents having controllable positions and appearances;

b. analyzing the user's image to identify feature regions corresponding at least to the user's hands and feet;

c. comparing successively digitized user images to detect movement of at least one feature region;

d. recognizing gestures based on the detected movements; and e. responding in real time to the recognized gestures by updating at least one of the position and appearance of at least one agent on the display based on (i) the location in the visual display where the user is introduced, and (ii) current agent location.

46. The method of claim 45 further comprising the step of analyzing the user's image to detect gestures, and wherein an agent is updated based further on the detected gestures.

47. The method of claim 45 wherein an agent is updated based further on sounds made by the user.

48. The method of claim 45 wherein an agent is updated based further on an agent activity-selection model.

49. The method of claim 45 wherein an agent is updated based on a behavior model specifying a set of motivational variables that themselves specify a numeric value associated with an agent activity and which may vary over time.

* * * * *